United States Patent [19]
Andersen et al.

[11] Patent Number: 5,695,811
[45] Date of Patent: Dec. 9, 1997

[54] METHODS AND COMPOSITIONS FOR BONDING A CEMENT-BASED OVERLAY ON A CEMENT-BASED SUBSTRATE

[75] Inventors: Per Just Andersen; Simon K. Hodson, both of Santa Barbara, Calif.; Hamlin Jennings, Wilmette, Ill.; Anthony J. Kelzenberg, Plymouth, Minn.

[73] Assignee: E. Khashoggi Industries, Santa Barbara, Calif.

[21] Appl. No.: 257,811

[22] Filed: Jun. 7, 1994

Related U.S. Application Data

[60] Continuation-in-part of Ser. No. 50,958, Apr. 21, 1993, Pat. No. 5,505,987, which is a division of Ser. No. 834,109, Feb. 10, 1992, abandoned, which is a continuation-in-part of Ser. No. 418,027, Oct. 10, 1989, Pat. No. 5,232,496, and a continuation-in-part of Ser. No. 526,231, May 18, 1990, abandoned, said Ser. No. 257,811, is a continuation-in-part of Ser. No. 109,100, Aug. 18, 1993, abandoned.

[51] Int. Cl.$^6$ ........................................................ B05D 3/02
[52] U.S. Cl. ........................... 427/133; 427/299; 427/463; 427/427; 427/301
[58] Field of Search ............................... 427/136, 299, 427/301, 403, 427

[56] References Cited

U.S. PATENT DOCUMENTS

| | | |
|---|---|---|
| 299,571 | 6/1884 | Newton . |
| 358,288 | 2/1887 | Moore . |
| 423,796 | 3/1890 | Murdock . |
| 525,146 | 8/1894 | Haddock . |
| 1,421,888 | 7/1922 | Allen . |
| 1,589,598 | 6/1926 | Kessler . |
| 2,078,289 | 4/1937 | Sloan . |
| 2,277,203 | 3/1942 | Boult . |
| 2,315,732 | 4/1943 | Patch . |
| 2,432,971 | 12/1947 | Ruthman et al. . |
| 2,721,369 | 10/1955 | Burke . |
| 2,954,301 | 9/1960 | Szukiewicz . |
| 3,284,227 | 11/1966 | Gerton . |
| 3,439,450 | 4/1969 | Richards . |
| 3,468,993 | 9/1969 | Bierlich . |
| 3,526,172 | 9/1970 | Stuart . |
| 3,683,760 | 8/1972 | Silva . |
| 3,687,021 | 8/1972 | Hensley . |
| 3,690,227 | 9/1972 | Welty . |
| 3,853,417 | 12/1974 | Olsson . |
| 3,870,422 | 3/1975 | Medico, Jr. . |
| 3,917,781 | 11/1975 | Gabriel et al. . |
| 3,927,163 | 12/1975 | Gabriel et al. . |
| 4,072,786 | 2/1978 | Hinsche . |
| 4,185,141 | 1/1980 | Krejce et al. . |
| 4,225,247 | 9/1980 | Hodson . |
| 4,225,357 | 9/1980 | Hodson . |
| 4,272,198 | 6/1981 | Velikov et al. . |
| 4,310,486 | 1/1982 | Cornwell et al. ................ 427/427 |
| 4,349,398 | 9/1982 | Kearns et al. . |
| 4,427,610 | 1/1984 | Murray . |
| 4,533,393 | 8/1985 | Neuschaeffer et al. . |
| 4,552,463 | 11/1985 | Hodson . |
| 4,588,443 | 5/1986 | Bache . |
| 4,608,795 | 9/1986 | Neuschaeffer et al. . |
| 4,609,573 | 9/1986 | Omata et al. . |
| 4,637,860 | 1/1987 | Harper et al. . |
| 4,640,715 | 2/1987 | Heitzmann et al. . |
| 4,642,137 | 2/1987 | Heitzmann et al. . |
| 4,721,659 | 1/1988 | Tieckelmann . |
| 4,732,781 | 3/1988 | Babock et al. ................ 427/136 |
| 4,842,649 | 6/1989 | Heitzmann et al. . |
| 4,851,259 | 7/1989 | Shimada et al. . |
| 4,859,504 | 8/1989 | Rossiter . |
| 4,888,058 | 12/1989 | Rosenberg et al. . |
| 4,944,595 | 7/1990 | Hodson . |
| 4,997,484 | 3/1991 | Gravitt et al. . |
| 5,049,411 | 9/1991 | Sellstrom et al. ................ 427/136 |
| 5,049,412 | 9/1991 | Miller ................ 427/136 |
| 5,108,790 | 4/1992 | Babock ................ 427/136 |
| 5,120,574 | 6/1992 | Cogliano et al. ................ 427/136 |
| 5,232,496 | 8/1993 | Jennings et al. . |
| 5,269,845 | 12/1993 | Gronau et al. ................ 427/427 |
| 5,286,425 | 2/1994 | Babock et al. ................ 427/136 |

FOREIGN PATENT DOCUMENTS

WO 89/05284 6/1989 WIPO .

OTHER PUBLICATIONS

Anderson, *Effect of Organic Superpasticiizing Admixture and Their Components on Zeta Potential and Related Properties of Cement Materials*, Pennsylvania State University Press (May 1987).

Anderson, *Effects of W/C Ratio and Dispersion on the Pore Size Distribution of Cement Paste and Concrete*, MRL (Aug. 1988).

Eriksen et al., *Foam Stability Experiments on Solutions Containing superplasticizing– and air–Entraining Agents for Concrete*, The Technological Institute, Dept. of Building Technology, Taastrup, Denmark 45–54 (1985). (no mo).

Litvan, *Air Entrainment in the Presence of Superplasticizers*, ACI Journal (Jul.–Aug. 1983).

Litvan et al., *Particulate Admixture for Exhanced Freeze–thaw Resistance of Concrete*, Cement and Concrete Research, vol. 8, 53–60 (1978). (no mo.).

Shilstone, Sr., *Interpreting the Slump Test*, (Nov. 1988).

(List continued on next page.)

*Primary Examiner*—Janyce Bell
*Attorney, Agent, or Firm*—Workman Nydegger & Seeley

[57] ABSTRACT

Novel methods and compositions are disclosed for bonding a hydrating cement-based overlay onto a cement-based substrate. An integral bond is created between the overlay and the substrate by maximizing capillary suction through properly preparing the substrate and designing the overlay. The integral bond has an interface strength at least substantially similar to the substrate strength. The substrate is prepared to optimize the capillary suction by cleaning and optimal water saturation. Properly designing the overlay for optimal capillary suction involves optimizing the water/cement ratio of each layer of the overlay. A low water/cement ratio is generally optimal. In addition to incorporating a low amount of water, the water to cement ratio is minimized through the use of dispersants and mixing techniques. The design of the overlay can also include silica fume to increase the strength of the interface bond.

53 Claims, 26 Drawing Sheets

OTHER PUBLICATIONS

Skalny et al., *Low Water to Cement Ratio Concretes*, Cement and Concrete Research, vol. 3, 29–40 (1973). (no mo.).

Young, *Macro-defect-Free Cement: A Review*, Mat Res. Sox. Sump. Proc., vol. 179 (1991). (no mo.).

*A New Extrusion Technology*, National Science Foundation Center for Science, vol. 6, No. 1 (Spring 1994). (no mo.).

J.M. Bukowski et al., *Reactivity and Strength Development of $CO_2$ Activated Non-Hydraulic Calcium Silicates*, Cement and Concrete Research, vol. 9, pp. 57–68, 1979. (no mo.).

J. Bensted, *Hydration of Portland Cement*, pp. 324–331 (no date).

G. M. Bruere, *Importance of mixing Sequence When using Set-Retarding Agents With Portland Cement*, Nature, pp. 32–33, Jul. 6, 1963.

Michael A. Taylor and Bengt B. Broms, *Shear Bond Strength Between Coarse Aggregate and Cement Paste or Mortar*, Journal of the American Concrete Institute, pp. 939–957, Aug. 1964.

Kenneth M. Alexander, John Wardlaw and D. J. Gilbert, *Aggregate-Cement Bond, Cement Paste Strength and the Strength of Concrete*, Journal of the American Concrete Institute, pp. 59–81, Aug. 1964.

J. Norman Maycock and Jan Skalny, *Carbonation of Hydrated Calcium Silicates*, Cement and Concrete Research, vol. 4, pp. 69–76, 1974. (no mo.).

M.F. Pistilli, C.F. Peterson, S.P. Shah, *Properties and Possible Recycling of Solid Waste From Ready-Mix Concrete*, Cement and Concrete Research, pp. 249–259, 1975. (no mo.).

Proceedings of the Fifth Mineral Waste Utilization Symposium, pp. 8–15, Apr. 13–14, 1976.

I. Odler and H. Dorr, *Early Hydration of Tricalcium Silicate*, Cement and Concrete Research, pp. 277–283, 1979. (no mo.).

F.M. Lea et al., *The Cement Aggregate Bond*, The Chemistry of Cement and Concrete, pp. 265–266, 1971. (no mo.).

B.T. Unwalla, *Recycled Materials For Making Concrete*, The Indian Concrete Journal, vol. 53, p. 229, Sep. 1979.

Bibliography file, *HRIS Selections Pertaining to: Use of Recycled Portland Cement Concrete as Aggregate*, May 1981.

Cynthia Spigelman, *Limited Bibliography No. 376A*, Construction Technology Laboratories, Apr. 30, 1985.

N.B. Singh, A.K. Singh, and S Prabha Singh, *Effect of Citric Acid on the Hydration of Portland Cement*, Cement and Concrete Research, vol. 16, pp. 911–919, 1986. (no mo.).

Katzutaka Suzuki et al., *Formation and Carbonation of C-S-H In Water*, Cement and Concrete Research, vol. 15, pp. 213–224, 1985. (no mo.).

*Guidelines for Unbonded Concrete Overlays*, Technical Bulletin TB-005.OD, 1990. (no mo.).

*Guidelines for Bonded Concrete Overlay*, Technical Bulletin TB-007.OC, 1990. (no mo.).

*Guidelines for Concrete Overlays of Existing Asphalt Pavements*, Technical Bulletin TB-009.OD, 1990. (no mo.).

METHODS AND COMPOSITIONS FOR BONDING A CEMENT-BASED OVERLAY ON A CEMENT-BASED SUBSTRATE

RELATED APPLICATIONS

This patent application is a continuation-in-part of U.S. application Ser. No. 08/050,958, filed Apr. 21, 1993, in the names of Hamlin M. Jennings, Ph.D., Anthony J. Kelzenberg, and Simon K. Hodson, and entitled "Compositions and Processes for Improving the Bond Between Hydrating Cement-Based Materials and Existing Cement-Based Substrates, now U.S. Pat. No. 5,505,987" which is a divisional of U.S. application Ser. No. 07/834,109, filed Feb. 10, 1992, in the names of Hamlin M. Jennings, Ph.D., Anthony J. Kelzenberg, and Simon K. Hodson, and also entitled "Compositions and Processes for Improving the Bond Between Hydrating Cement-Based Materials and Existing Cement-Based Substrates" (now abandoned), which is a continuation-in-part of U.S. application Ser. No. 48,027 filed Oct. 10, 1989, now U.S. Pat. No. 5,232,496, issued Aug. 3, 1993, to Hamlin M. Jennings, Ph.D., and Simon K. Hodson, and entitled "Process For Producing Improved Building Material And Product Thereof," and U.S. application Ser. No. 07/526,231 filed on May 18, 1990, in the names of Hamlin M. Jennings, Ph.D., and Simon K. Hodson, and entitled "Hydraulically Bonded Cement Compositions And Their Methods of Manufacture And Use" (now abandoned). The present application is also a continuation-in-part of U.S. application Ser. No. 08/109,100, filed Aug. 18, 1993, now abandoned in the names of Per Just Andersen, Ph.D., and Simon K. Hodson, and entitled "Design Optimized Compositions and Processes For Microstructurally Engineering Cementitious Mixtures". For purposes of disclosure, the foregoing references are incorporated herein by specific reference.

BACKGROUND

The Field of the Invention

The present invention relates to methods and hydraulic cement compositions for bonding a newly hydrating hydraulic cement-based overlay onto the surface of generally large, rigid, porous substrates, particularly existing hydraulic cement-based substrates such as concrete. The present invention has specific application, for example, in the resurfacing and topping of existing concrete and asphalt highways, roads, and surfaces of other large structures.

The Relevant Technology

Hydraulic cements have been used for thousands of years as the bonding and hardening agent in mortars and concretes. Typical hydraulic cement-based materials are formed by mixing hydraulic cement with water and one or more aggregates, which are either simultaneously or subsequently blended into the mixture. When water is added to hydraulic cements, the existing minerals in the cement either decompose or combine with water, and a new phase (such as a calcium-silicate-hydrate structure) forms throughout the mixture. The cement paste fraction (i.e., hydraulic cement and water) hardens and then cures to bind the aggregates together, thereby forming concrete.

As used in the specification and claims, the term "cement paste" includes a fluid mixture of cement and water. Cement paste includes an aqueous phase of water and dissolved minerals together with unhydrated hydraulic cement particles. Generally, in a cement paste, the hydration reaction has commenced, but it has not been completed. Typical cement paste will have a water to cement ratio in the range from about 0.1 to about 1, with a preferred water to cement ratio in the range of from about 0.15 to about 0.7.

One of the most important uses of hydraulic cement compositions is in concrete. As used in the specification and claims, the term "concrete" is broadly defined as a rigid, strong building material made by mixing a cement paste with an aggregate (such as sand, gravel, other geologic materials, metals, and/or metallic alloys). The cement paste acts as a "glue" to bind the aggregate particles together in the concrete. The physical properties of concrete vary depending upon the cement composition, the choice of aggregates, and the processing techniques.

Concrete is commonly used to construct driveways, sidewalks, foundations, floors, roads, walls, supports, and other structures (hereinafter collectively referred to as "concrete substrates", "existing concrete substrates", or "concrete surfaces"). Despite careful selection of cement and aggregates, virtually all concrete surfaces crack, chip, spall, or experience damage. Failures in concrete and damage to its surfaces may be assigned to one or more of three common causes: (a) unsuitable materials; (b) errors in preparation, placing, and curing; and (c) exposure to natural or artificial destructive agents (e.g., the environment and loads placed on the concrete surfaces).

Such failures in concrete surfaces are apparent in the infrastructure of the United States. Although much of the country's infrastructure remains structurally sound, the useability of the infrastructure is often diminished due to surface deterioration. From potholes in pavements to the cracking in the interstate highways to the severe spalling of bridges, the failure of all sound structures begins at the surface. Once a concrete surface has been damaged, it is critical to quickly repair it in order to reduce the severity and rate of future damage or deterioration. The techniques currently used for repairing damaged structures, such as patching, filling, resurfacing with asphalt coatings, or new structural overlays with bonding agents, have proven to be either inadequate, very expensive or both. In fact, the cost to repair the damage to the nation's infrastructure damage has been estimated to be as much as three trillion dollars ($3,000,000,000), if present technology is used.

Because of this prohibitive outlay, the U.S. government has set aside funds to explore new techniques or processes designed to make road and bridge repair easier and less expensive. Accordingly, pursuant to the Intermodal Surface Transportation Efficiency Act of 1991, 23 U.S.C. §307, enacted on Dec. 18, 1991, the U.S. government has appropriated approximately fifteen million dollars ($15,000,000) for research, along with up to sixty-three million dollars ($63,000,000) for road testing, of new technology pertaining to bonding new concrete layers over older, existing concrete surfaces.

Damage to concrete surfaces generally arises from mechanical and chemical causes such as freeze/thaw cycles, alkali/silica reactivity, poor design, incorrectly selected aggregate materials, surface rigidity, and physical surface forces. Repairing a concrete surface damaged by such mechanical and chemical causes involves applying a material onto the concrete surface, which preferably has strength similar to the surface being repaired and which will adhere to the concrete surface. The materials applied to the concrete surfaces needing repair are however often damaged by the same causes which damage existing concrete surfaces. Satisfactory long-term repair has not consistently been achieved by repairing damaged concrete surfaces by prior art methods for patching, filling, or resurfacing with thin or thick coatings, resulting in the need for repeated repairs which is a further cost.

Materials applied to concrete surfaces needing repair typically result in an insufficient degree of adhesion between the repair material and the surface needing repair. Application of hydraulic cement compositions to repair concrete surfaces generally yields a bond having inadequate interface bond strength or a "cold joint" between the concrete surface and the repair material. The cold joint is formed since the two cement compositions have set at different times.

Cold joints are also formed during the formation of monolithic structures, reconstruction of separated or damaged roads, the conditioning of a dam experiencing a fissure, or the construction or repair of many other concrete structures since the cement mixtures are poured at different times into blocks which are side-by-side or on top of each other. One reason for pouring different concrete blocks or segments over time when forming large concrete structures is that a concrete block cannot be poured in its entirety at the same time due to a lack of continuous cement delivery or availability during construction. Where the initial concrete block has begun to set and harden, the strength of the bond between the concrete block and the adjoining subsequent additions of cement or concrete is less than the interior strength of either the new cement (or concrete) overlay and the "old" concrete substrate, thereby resulting in a cold joint.

Cement compositions may also be set at different times during the formation of layered concrete structures. Typically, pavements and concrete structures consist of more than one layer in order to bring the surface up to an appropriate final grade. A subsequent addition of cement on top of a set (or partially set) concrete layer is necessary in this process in order to level the concrete structure. However, this usually results in the creation of a cold joint between the adjacent layers that form the concrete structure.

Studies on the bond between the hydraulic cement compositions set at different times have been made by measurements of shearing or tensile strength, as determined by micro-hardness measurements across the interface and by microscopic examination of the interface. One useful method of measuring the shearing or tensile strength is the Slant Shear Test for Latex Bonding as described by the standard C1042 of the American Society for Testing and Materials (ASTM). In almost all cases, the strength of the bond is less than that of the adjoining cement composition. It has also been discovered that the bond strength, as a proportion of the strength of the body of the substrate of the set cement, appears to decrease as the water-cement ratio of the cement paste increases. There are many products on the market for repairing damaged concrete surfaces. Historically, concrete has been repaired by applying new concrete or mortar to the damaged area. This technique has not proven to be a successful long-term solution to the problem, because new concrete or mortar does not typically form a strong integral bond between the two surfaces. The term "integral bond" as used in this specification and the appended claims refers to a bond between the new cement paste overlay and the existing concrete surface which is substantially as strong as either of these two adjacent component structures.

More recently, latex, epoxy-type, or other organic materials have been used as additives to concrete. It was hoped that the latex cements with appropriate aggregates would solve the problems of traditional concrete repair compositions. Latex cements are fast setting and strong, but they are also very expensive, thereby making them impractical for large projects such as resurfacing interstate highways. Further, these latex cements unfortunately fail with age and with heavy use.

From the foregoing, it will be appreciated that what is needed in the art are novel methods and compositions for bonding a newly hydrating cement-based overlay onto an existing cement-based substrates, such that a newly hydrating cement-based overlay may be placed adjacent or onto the surface of an existing cement-based or asphalt substrate in order to form an integral bond therebetween.

It would be a significant advancement in the art to provide novel methods and compositions for bonding a newly hydrating cement-based overlay onto an existing cement-based substrate such that the strength and physical characteristics of the resulting structure are improved and may withstand greater stresses and loads than previously known in the art.

In particular, it would be a significant advancement in the art to provide novel methods and compositions for bonding a newly hydrating cement-based overlay onto an existing cement-based substrate without the use of latex, epoxies, or other organic binders.

It would yet be another significant advancement in the art to provide novel methods and compositions for bonding a newly hydrating cement-based overlay onto an existing cement-based substrate such that the hydrating cement-based overlay may be used for repairing defects such as spalls, cracks, or chips in the surfaces of existing concrete surfaces, like driveways, sidewalks, or roads.

Also, it would be an advancement to provide novel methods and compositions for bonding a newly hydrating cement-based overlay onto an existing cement-based substrate such that laminate layers applied at different times will not result in the formation of a cold joint therebetween.

Further, it would be an advancement in the art to provide novel methods and compositions for bonding a newly hydrating cement-based overlay and an existing cement-based substrate in a manner which is economically feasible for the large-scale repair of the national infrastructure, thereby enabling large areas to be quickly repaired and returned to their original strength and utility.

Such methods and compositions are disclosed and claimed herein.

BRIEF SUMMARY AND OBJECTS OF THE INVENTION

The present invention is directed to novel methods and compositions for bonding a newly hydrating cement-based overlay onto the surfaces of existing cement-based substrates. More particularly, the present invention is directed to processes and compositions for obtaining a strong integral bond between existing cement-based substrates requiring repair (such as cement, mortar, concrete, aggregate rock, geological materials) and new hydrating cement-based overlay. The present invention is particularly applicable to the resurfacing and repair of existing concrete highways, roads, and other structures of the Nation's deteriorating infrastructure.

The method of the present invention involves the application of a two layer overlay to a porous substrate. The layer contacting the existing porous substrate is the "grout interface layer" and the layer forming the new surface is a "concrete overlay layer". These result in a substantially mechanically and chemically integral bond between the interfacing surfaces of the overlay and the substrate. The overlay can also be a plurality of alternating grout and concrete layers.

The process can be employed in a variety of ways. It is believed that the process can be used as a paint-like protective coating on structures, as a thin-bonded overlay, as a concrete repair kit, as an economical resurfacing material for extremely large surfaces such as interstate highways, as a glue between the existing surfaces of two concrete structures, or to eliminate cold-joints in monolithic structures.

According to the present invention, the strength of the interface bond between the overlay and the cement-based substrate is a function of controlled moistening of the substrate and the diffusion of hydration products within the overlay into the substrate. The intervening bonding layer is characterized by the presence of a mixture of crystalline and amorphous noncrystalline material in which the bond strength between the existing cement-based substrate surface and the newly hydrating cement-based overlay is significantly improved. In fact, in most cases, the bond interface will be stronger than either the substrate or the overlay.

The bond so formed does not comprise organic binders and is as strong as, if not stronger than, bonds formed using prior art bonding agents. Thus, a structurally sound bond is formed between the newly hydrating cement-based overlay and a surface of an existing cement-based substrate without the substantial cost and/or complicated procedures required when using the prior art bonding methods.

To design an appropriate overlay that achieves maximum adhesion to the existing substrate, the existing substrate is analyzed to determine the characteristics of the substrate such as the mix design, strength, modulus of elasticity and porosity. Based on the substrate characteristics, the concrete overlay is designed to have high strength, high fracture energy, high toughness, high durability, freezing point depression of pore water, good freeze-thaw stability, low permeability, low diffusion capabilities, low bleeding, low separation, optimal rheology and a low water to cement ratio.

It has been determined that maximizing capillary suction of the substrate surface maximizes the strength of the interface bond. Maximum capillary suction yields maximum adhesion as the overlay material, including hydration products drawn into the pores of the substrate which, after hardening, forms a network of hardened root-like extensions which mechanically anchor the overlay. Maximum capillary suction would also be expected to increase the chemical unity of the newly hydrating overlay and existing substrate because of the increase and intimate contact between the two materials.

The capillary suction is maximized by properly designing the grout interface layer and the concrete overlay layer. The optimal mix design for the thin overlay is determined after the substrate has been analyzed and is also based on the expected climatic conditions when the overlay is to be applied. The optimal mix design for the overlay incorporates the optimal amount of water necessary to create maximum capillary suction within the substrate. It is generally desirable to minimize the water to cement ratio, however; the optimal ratio will vary based primarily on the porosity of the substrate, the degree of water saturation and climatic conditions. In addition to incorporating a low amount of water, the water to cement ratio is minimized through the use of dispersants and mixing techniques. The design of the overlay can also include silica fume to increase the strength of the interface bond. In addition to a high interface bond strength, the thin overlay is designed to have a superior strength, toughness and durability including freeze/thaw stability.

The optimal water to cement ratio for a particular substrate can be empirically determined by varying the amount of liquid in overlay mixtures applied to a portion of the substrate needing repair or a simulated substrate designed to have comparable qualities to the substrate needing repair and then utilizing a compression test to measure the strength of the interface bond strength formed between the substrate and the overlay cast on the substrate. The mixture having the optimal water to cement ratio will have an interface bond strength at least substantially similar to the substrate strength.

The grout interface layer is prepared in a grout mixer or a high energy, high shear mixer and placed on the surface of the substrate previously exposed by cleaning and which has been appropriately moistened. High energy mixed cement paste is prepared in a specialized mixer which imparts excellent properties of the cement paste. Such specialized high energy, high shear mixers are discussed in greater detail below and are available from E. Khashoggi Industries, located in Santa Barbara, Calif. Incorporation of silica fume in the grout interface layer increases the strength of the interface bond as the hydration products of the silica fume enter into the pores of the substrate and react very quickly, partly due to the high surface area of the silica fume and the ability to react with the hydroxyl ions in the mixture. The interface grout layer can also be scrubbed into the surface of the substrate. The thickness of the interface grout layer is preferably no greater than about 5 mm, and may be much less.

The concrete overlay layer is preferably applied to the interface grout layer shortly after the interface grout layer has been applied to the substrate. The concrete overlay layer is prepared by mixing techniques similar to the mixing techniques to prepare the interface grout layer. Due to the combined use of the high energy, high shear mixing techniques, silica fume, a low water to cement ratio and a dispersant, the size of the pores in the concrete overlay layer and the interface grout layer are very fine, thereby resulting in freezing point depression of pore water, good freeze-thaw stability, low permeability and low diffusion capabilities. The thickness of the concrete overlay layer is preferably no greater than about 10 cm, and may be much less. The concrete overlay layer includes aggregates which have a diameter no greater than about one-half to one-third the thickness of the concrete overlay and are selected to provide high durability.

Maximizing the capillary suction of the substrate can also be achieved by saturating the substrate to an optimal degree before the application of the overlay. The optimal degree of water saturation is achieved when the interface bond strength has at least substantially similar strength as the substrate. Over saturating the substrate greatly reduces the capillary suction, while under saturating the substrate causes the water to be sucked out of the overlay, thereby resulting in poor interface bond strength.

The optimal degree of water saturation can be empirically determined and is generally a function of the porosity of the substrate. The optimal degree of water saturation is generally achieved by partially saturating the substrate such that the saturation is as deep as possible but yet not completely filling the pores. The optimal degree of water saturation can also be empirically determined by varying the degree of water saturation applied to a portion of the substrate needing repair or a simulated substrate designed to have comparable qualities to the substrate needing repair and then utilizing a compression test to measure the strength of the interface bond strength formed between the substrate and the overlay cast on the substrate.

To maximize the capillary suction of the substrate and increase the ability of the overlay to mechanically interlock with the porous substrate surface, the surface of the substrate should be exposed by cleaning the surface. The surface area of the substrate in contact with the overlay can also be increased by forming expansion joints or planing existing expansion joints, which also creates a vertical contact between the overlay and the substrate.

The bond interface formed between the surface of the cement-based substrate and the newly hydrating cement-based overlays of the present invention can be characterized by the presence of a crystalline and an amorphous noncrystalline microstructure, low void fractions, and without the inclusion of latex, epoxies, or other organic binders. The bond interface resulting from the present invention is also characterized by a mechanical and chemical integrity equal to, or greater than, either the existing substrate or the concrete overlay when subjected to appropriate stresses.

The application of the present invention to the repair, rehabilitation, renovation, and reconstruction of our Nation's infrastructure is very significant. By overlaying or topping the old structure with a higher strength, higher durability, higher freeze/thaw stability, greater toughness, thin section, the ultimate service life can be extended much beyond the original design and cost specification. A structurally sound "twenty-year" road can be given an additional fifty-year life or more with a minimal cost of repair. Because the overlay section can be made very dense, very strong, and as thin as economically feasible, it becomes the lowest cost means of repair and service life enhancement.

Additionally, the integral bond may be formed between two substrates to act as a glue, which is particularly useful in construction projects involving large concrete blocks which cannot be simultaneously cast.

It is, therefore, an object of the present invention to provide novel methods and compositions for bonding a newly hydrating cement-based overlay on an existing cement-based substrates such that a newly hydrating cement-based overlay may be placed adjacent or onto the surface of an existing cement-based substrate or asphalt substrate in order to form an integral bond therebetween.

Another important object of the present invention is to provide novel methods and compositions for bonding a newly hydrating cement-based overlay onto an existing cement-based substrate such that the strength and physical characteristics of the resulting structure is improved and may withstand greater stresses and loads than previously known in the art.

In particular, an object of the present invention is to provide novel methods and compositions for bonding a newly hydrating cement-based overlay onto an existing cement-based substrate without the use of latex, epoxies, or other organic binders.

It is another important object of the present invention to provide novel methods and compositions for bonding a newly hydrating cement-based overlay onto an existing cement-based substrate such that the hydrating cement-based overlay may be used for repairing defects such as spalls, cracks, or chips in the surfaces of existing concrete surfaces, like driveways, sidewalks, or road surfaces.

Also, an important object of the present invention is to provide novel methods and compositions for bonding a newly hydrating cement-based overlay and an existing cement-based substrate such that laminate layers applied at different times will not result in the formation of a cold joint therebetween.

It is a further important object of the present invention to provide novel compositions and processes for bonding a hydrating cement-based overlay onto an existing cement-based substrate in a manner which is economically feasible for the large-scale repair of the national infrastructure, thereby enabling large areas to be quickly repaired and returned to their original strength and utility.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1:
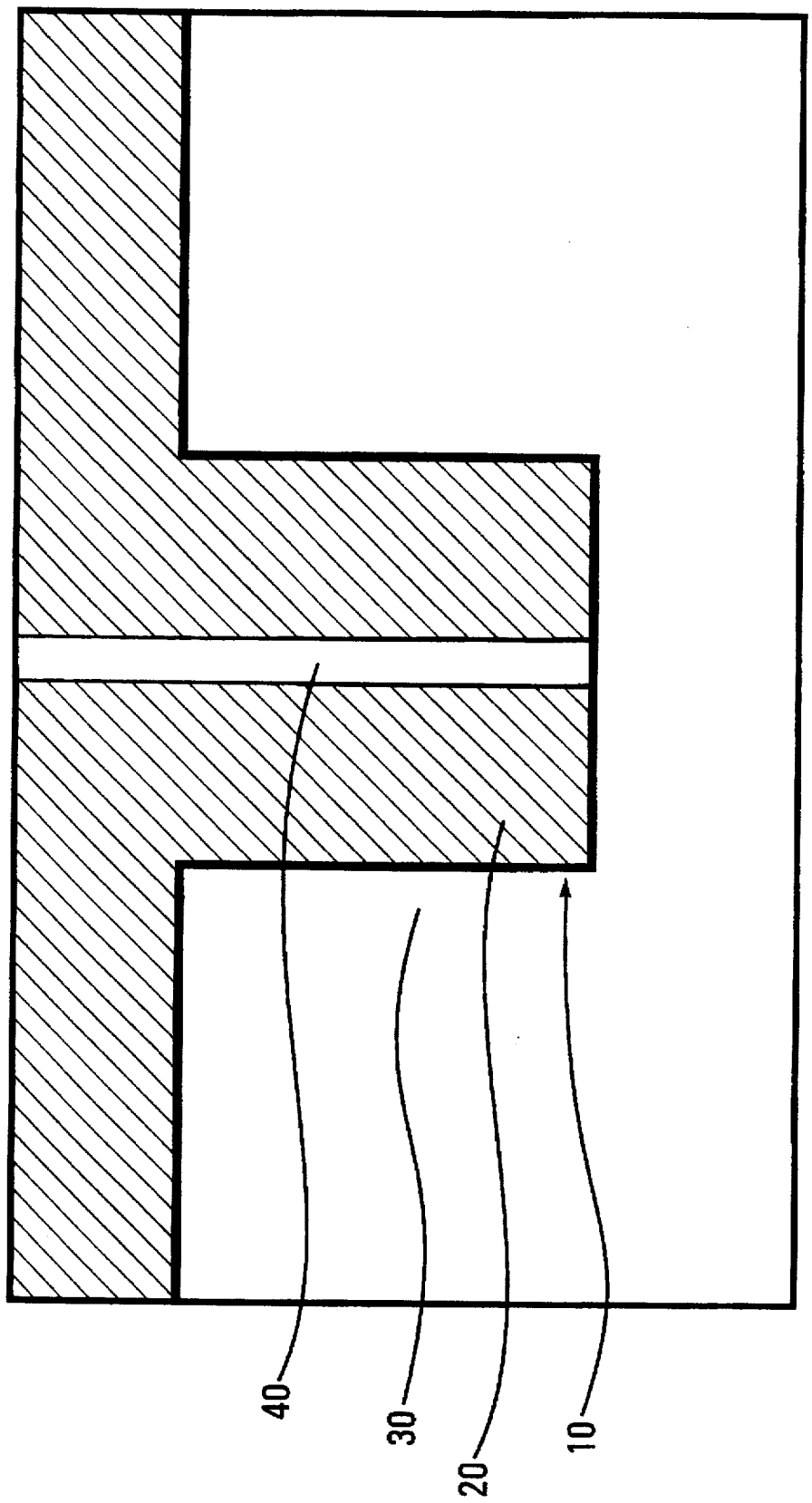
FIG. 1 is a cross section of a new expansion joint cut into the overlay in the area of a planed original expansion joint.

The present invention is directed to novel compositions and processes for bonding hydrating hydraulic cement-based mixtures onto porous substrates, particularly cured cement-based substrates such as concrete. The present invention provides for improved cement-based compositions and processing techniques for manufacturing or repairing concrete structures with improved properties, such as strength and durability. More particularly, the present invention is directed to novel compositions and processes for bonding hydrating cement-based mixtures as a thin overlay onto a cement-based substrate, such as concrete highway surfaces and concrete bridge decks.

The terms "overlay", "thin overlay", "thin-bonded overlay", and "cement-based overlay" as used in the specification and claims, refer to an interface grout layer applied to a substrate and a concrete overlay layer applied onto the interface grout layer. The term "thin" as utilized in this specification and the appended claims is meant to distinguish the overlay of the present invention from prior art overlays which can be 10 cm thick or greater. The thickness of the interface grout layer is preferably not greater than about 5 mm, and the thickness of the concrete overlay layer is preferably no greater than about 10 cm, although the actual thickness of the overlay may vary according to the economics of the repair in question.

The terms "hydrating thin overlay" and "hydrating cement-based mixtures of the thin overlay" are utilized interchangeably to refer to the materials of the present invention being applied before hydration. The term "hydration," as used in the specification and claims, is intended to describe the chemical reactions that take place between the cement and water. The term "cement-based mixtures" as used in the specification and the appended claims refers to mixtures comprising cement-based materials and water. The term "hydration products" as used in the specification and the appended claims refers to the products resulting from hydrating cement-based materials or silica fume.

An integral bond is formed between the thin overlay and the substrate after hydration of the thin overlay. The term "integral bond", as used in the specification and claims, refers to a bond having at least substantially similar strength as the substrate. Often the bond strength will exceed the strength of either the existing substrate or the concrete overlay.

The area of the integral bond between the substrate and the thin overlay, more particularly the interface grout layer, is referred to in this specification and the appended claims as the "bond interface". The bond interface of the present invention is thinner than the prior art bond interfaces between substrates and cement-based overlays. The bond interface of the present invention may be as thin as about 1 mm or less. An objective determination of the thickness of the bond interface of the present invention, which may be recognized by those skilled in the art, is that the bond overlay is essentially coated onto or painted over the surface of the existing cement-based substrate.

The integral bond is formed within the pores of the substrate which can be characterized as "macropores" and "micropores" or "capillary pores". The term "macropores," as used in the specification and the appended claims refer to voids generally visible to the naked eye or under magnification of less than about 10×. Macropores are generally formed as a result of poor compaction of the hydrating cement-based mixtures. The terms "micropores" and "capillary pores", as used in the specification and the appended claims, refer to voids not generally visible by the naked eye, but needing magnification of about 50× or greater to be evaluated. "Micropores,", are formed as a result of the production of water capillaries during hydration.

An integral bond is created between the overlay and the substrate by maximizing the "capillary suction" within the substrate. The term "capillary suction" as used in the specification and the appended claims refers to the phenomenom of liquids being drawn into the capillary pores of a substrate as a consequence of surface tension and the thermodynamic tendency of liquids to minimize their surface area which creates a pressure differential between atmospheric pressure and the pressure within the pore.

The capillary suction within the substrate is maximized by properly preparing the substrate and designing the overlay. Capillary suction within the substrate combines with gravity and diffusion to pull the hydrating cement-based mixture and hydration products of the overlay into the pores of the substrate. After the hydrating cement-based mixture penetrates into the macropores of the substrate surface and the hydration products penetrate and diffuse into the micropores, a network of hardened root-like extensions is formed which mechanically anchor the overlay to the substrate after hardening.

The optimal mix design for the thin overlay is determined after the substrate has been analyzed and is also based on the expected climatic conditions when the overlay is to be applied. The optimal mix design for the overlay incorporates the optimal amount of water necessary to create maximum capillary suction within the substrate. It is generally desirable to minimize the water to cement ratio: however, the optimal ratio will vary based primarily on the porosity of the substrate, the degree of water saturation and climatic conditions. In addition to incorporating a low amount of water, the water to cement ratio is minimized through the use of dispersants and mixing techniques. The design of the overlay can also include silica fume to increase the strength of the interface bond. In addition to a high interface bond strength, the thin overlay is designed to have a superior strength, toughness and durability including freeze/thaw stability.

The optimal water to cement ratio for a particular substrate can be empirically determined by varying the amount of liquid in overlay mixtures applied to a portion of the substrate needing repair or a simulated substrate designed to have comparable qualities to the substrate needing repair and then utilizing a compression test to measure the strength of the interface bond strength formed between the substrate and the overlay cast on the substrate. The mixture having the optimal water to cement ratio will have an interface bond strength at least substantially similar to the substrate strength.

Properly preparing the substrate to maximize the capillary suction within the substrate is achieved primarily by cleaning the substrate surface and moistening the substrate with an aqueous solution before the application of the thin overlay. Cleaning the surface of the substrate removes dirt and debris which block the hydrating thin overlay and the hydration products from entering the capillary pores and from bonding directly with the surface of the substrate. Additionally, the surface of most substrates tends to be rough and irregular which mechanically interlocks the hydrating thin overlay after the overlay has flowed into and hydrated in an interlocking position with the surface of the substrate. The surface area of the substrate in contact with the overlay can also be increased by forming expansion joints or planing existing expansion joints, which also creates a vertical contact between the overlay and the substrate.

Moistening the substrate increases the bond strength between the thin overlay and the substrate because the moisture within the pores of the substrate creates capillary suction which combines with gravity and diffusion to pull the hydrating cement-based mixture and hydration products of the overlay into the pores of the substrate. The optimal degree of moistening or water saturation for a particular substrate can be emperically determined by varying the amount of liquid applied to a portion of the substrate needing repair or a simulated substrate designed to have comparable qualities to the substrate needing repair and then utilizing a compression test to measure the strength of the interface bond strength formed between the substrate and the overlay cast on the substrate. The amount of liquid applied to a substrate resulting in an interface bond strength at least substantially similar to the substrate strength is the optimal degree of water saturation. The optimal degree of water saturation is also generally achieved by partially saturating the substrate such that the saturation is as deep as possible but yet not completely filling the pores.

The terms "interface grout layer", "interface grout", "grout", "interface paste", and "paste", are used interchangeably in the specification and the appended claims to refer to a cement paste comprising a hydraulic cement binder and water which is applied to the substrate surface. The grout may also comprise silica fume and a dispersant. The interface grout layer is applied to the surface of the substrate after the substrate has been sufficiently saturated.

The constituent materials of the interface grout are mixed together with the optimal amount of water necessary to maintain capillary suction within the pores of the water saturated substrate. The hydraulic cement binder and the silica fume react very quickly, creating large volumes of hydration products that penetrate and diffuse into the capillary pores of the substrate, thereby forming a very strong integral bond between the existing substrate and the interface grout layer. Superior adhesion also results from the rheology of the interface grout layer in a fresh unhardened state, as the grout can conform to the rough and irregular surface of the substrate thereby interlocking with the surface and adhering to the surface upon hardening.

The "concrete overlay layer" or "concrete overlay" are used interchangeably in the specification and the appended claims to refer to a material comprising a hydraulic cement binder, water and aggregates which is applied to the substrate surface or preferably onto the interface grout layer. The concrete overlay may also comprise silica fume and a dispersant. The constituent materials of the concrete overlay are preferably mixed together with the optimal amount of water necessary to maintain capillary suction of the substrate to assure good adhesion. High quality aggregates are utilized to assure long term durability and life expectancy of the new surface in resisting mechanical and chemical degradation.

Maintaining a low water to cement ratio in both the interface grout and the concrete overlay provides low shrinkage, low bleeding, and a minimum of internal defects in the thin overlay. Furthermore, the combined use of silica fume, a low water to cement ratio, and a dispersant leads to the formation of a very fine capillary pore system in the hardened interface grout and the concrete overlay that result in freezing point depression of pore water, good freeze-thaw stability, low permeability, and low diffusion capabilities.

I. Substrates and Uses of the Overlay

The present invention may be employed with porous substrates, such as hydraulic cement-based substrates, asphalt, ceramics such as bricks, and natural geological substances such as stone or aggregates. The present invention has particular application where the substrate is an existing set or cured concrete material.

The present invention may be employed to bring a hard stable material, such as concrete or any other porous substrate, as defined above, in contact with an overlay which is still forming such that an integral cohesive and adhesive bond is formed therebetween that is not a weak point, or a point of discontinuity. An interface bond between the overlay and the substrate having an interface bond strength which is not at least substantially similiar to the substrate strength is a weak point or point of discontinuity which leads to failure when stress is applied to the final structure.

The methods and compositions can be used in a variety of ways to improve the usefulness and durability of old concrete structures. The term "old concrete" is a term commonly employed in the art to describe concrete that has been set and allowed to cure for a significant period of time. Examples of old concrete include existing sidewalks or road surfaces, interstate highways, bridges, floors, and similar structures.

The primary use of the present invention is in the repair of damaged existing cement-based substrates, such as by weathering, earthquake, old age, or over stressing. Such substrates can be repaired in large scale projects such as the resurfacing of extremely large surfaces such as interstate highways or as a concrete repair kit for smaller surfaces. The overlay can also be applied as a paint-like protective coating on structures. Additionally, the overlay can be applied as a glue or mortar between two concrete structures to form a laminate.

The methods and compositions can also be used to improve the usefulness and durability of asphalt structures, brick and mortar structures, and structures comprised of aggregates. Asphalt structures such as roads can receive an overlay of the present invention to provide a new surface which is firmly anchored to the asphalt. Capillary suction can be maximized within the porous asphalt by the methods and compositions of the present invention to create a bond interface between the asphalt and overlay having at least substantially similar strength as the asphalt substrate. Similarly, the overlay can be applied to a structure comprised of aggregates having interstices between the aggregates which create sufficient porosity for the overlay to be applied and enter into the interstices. The overlay can also be utilized as a high strength mortar between bricks by creating optimal capillary suction in the brick surfaces contacting the overlay.

Prior art overlays can be formed having sufficient strength; however, the prior art hydraulic cement-based overlays have not resulted in a desirable interface bond strength. Similarly, an undesirable interface bond strength or a "cold joint" arises in monolithic applications when a cement-based material is poured and allowed to set, then another cement-based material is placed adjacent, or upon, the first cement-based material which is setting or has already set. A cold joint will occur anytime after initial set, which typically occurs from about three to about four hours after manufacture.

Cold joints are a frequent result in construction projects requiring a cement-based material to be formed and then placed in contact with another cement-based material. An example of the occurrence of a cold joint is provided by a roadway constructed of more than one block of cement paste, mortar and/or concrete. More than one block may be necessary due to a shortage of cement or the size of the roadway. Because the blocks set at different points of time, a cold joint is formed between any such blocks.

Often, highways or other substrate surfaces need to be graded or leveled; however, the substrate comprising the highway may have set or begun to set and the addition of further substrate to level off the substrate surface results in the formation of a cold joint between the two layers. The cold joint between the layers provides minimal or no mechanical integrity between the two surfaces.

The overlay can be applied to act as a mortar or glue to eliminate the formation of a cold joint between two cement-based materials which will set at different times. The overall strength of the structure is thereby improved. In the past, the presence of cold joints required the use of latex, epoxies, or other special additives, to form a bond between the cement surfaces of varying set ages. The present invention, however, may now be employed to create an integral bond between adjacent blocks of cement without the use of latex, epoxies, or other organic binders.

The present invention can similarly be used to integrally bond an inexpensive surface upon a high quality substrate, a further savings in the cost of forming a high quality structure. Such a laminate also allows one to place a coating upon the surface of a composition for aesthetic reasons, when such a coating was not desired at the time the composition was formed. Thus, the present invention can be employed to improve the bond between two surfaces such that the new laminated composition possesses high structural strength at a reduced cost and may selectively allow one to choose an aesthetically pleasing configuration.

II. The Composition of the Interface Grout Layer and the Concrete Overlay of the Thin Overlay A. The Interface Grout Layer.

The interface grout layer is applied to the substrate as a hydrating mixture of hydraulic cement, water, silica fume, and a dispersant.

The preferred hydraulic cement binder incorporated into the mixture forming the interface grout layer is Portland gray cement. Portland gray cement is in the family of cements known as hydraulic cements, which are inorganic cements that form hydration reaction products with water. The family of hydraulic cements are within the scope of this invention and are to be distinguished from other cements such as polymeric organic cements. The term "powdered hydraulic cement," as used in this specification and the appended claims, includes cement clinker and crushed, ground, and milled clinker in various stages of pulverizing and in various particle sizes.

Examples of typical hydraulic cements known in the art include the broad family of portland cements (including ordinary portland cement without gypsum), calcium aluminate cements (including calcium aluminate cements without set regulators, e.g., gypsum), plasters, silicate cements (including β-dicalcium silicates, tricalcium silicates, and mixtures thereof), gypsum cements, phosphate cements, and magnesium oxychloride cements. The term "hydraulic cement" also includes other cements, such as dicalcium silicate, which can be made hydraulic under hydrating conditions within the scope of the present invention.

Often, hydraulic cement compositions are formed by mixing powdered hydraulic cement and water, which is commonly referred to as "cement paste." Typically, hydraulic cement compositions are incorporated to form products by mixing the hydraulic cement and water, either simultaneously or subsequently, with some sort of aggregate blended into the mixture. As indicated previously, mortar and concrete are examples of hydraulic cement compositions formed by mixing hydraulic cement, water, and some sort of aggregate.

The term "hydraulic cement compositions," as used herein, is broadly defined in terms of hydration. The preferred embodiment of the present invention practices hydraulic cement compositions as being cement-based materials which are in the hydration state any time prior to the initial set of the hydraulic cement paste composition.

The present invention may include other types of hydraulic cement compositions such as those discussed in copending U.S. patent application Ser. No. 07/981,615, filed Nov. 25, 1992 in the names of Hamlin M. Jennings, Ph.D., Per Just Andersen, Ph.D., and Simon K. Hodson, and entitled "Methods of Manufacture And use For Hydraulically Bonded Cement," which is a continuation-in-part of U.S. patent application Ser. No. 07/856,257, filed Mar. 25, 1992 in the names of Hamlin M. Jennings, Ph.D. and Simon K. Hodson, and entitled "Hydraulically Bonded Cement Compositions and Their Methods of Manufacture and Use" (now abandoned), which was a file wrapper continuation of U.S. patent application Ser. No. 07/526,231 filed on May 18, 1990, in the names of Hamlin M. Jennings, Ph.D. and Simon K. Hodson, and entitled "Hydraulically Bonded Cement Compositions And Their Methods Of Manufacture And Use," wherein (also abandoned). In these applications powdered hydraulic cement is placed in a near net position and compacted prior to the addition of water for hydration. For purposes of disclosing the use of such compositions, the forgoing patent applications are incorporated by specific reference.

Additional types of hydraulic cement compositions include those wherein carbon dioxide is mixed with hydraulic cement and water. These hydraulic cement compositions are known for their structural integrity. Such hydraulic cement compositions are discussed in U.S. Pat. No. 5,232,496, issued Aug. 3, 1993 in the names of Hamlin M. Jennings, Ph.D. and Simon K. Hodson, and entitled "Process For Producing Improved Building Material And Product Thereof," wherein water and hydraulic cement are mixed in the presence of a carbon source selected from the group consisting of carbon dioxide, carbon monoxide, carbonate salts, and mixtures thereof.

As indicated above, water is essential to hydrating cement-based materials within the scope of the present invention. The hydration reaction between the cement-based materials and water yields reaction products which impart strength to the grout and the concrete overlay. The water is preferably clean and from a public waterworks. Use of other water may necessitate testing for the presence of detrimental substances such as humus or chlorine.

Silica fume, also referred to as microsilica or condensed silica fume, is another constituent material of the interface grout. Silica fume is extremely fine with particles less than 1 μm in diameter and with an average diameter of about 0.1 μm, about 100 times smaller than average cement particles. The silica fume is small enough in diameter to penetrate into the macropore and micropore systems of a concrete surface. The ability of the silica fume and hydration products of the silica fume to penetrate into the pore systems results in a very strong integral bond between the thin overlay system and the existing concrete surface.

The silica fume is typically used as a slurry that preferably has a solids content of 50 percent by weight. The silica fume should be sufficiently dispersed by means of vibration prior to mixing. The silica fume is preferably in a pre-dispersed slurry form, an example of which is Force 10000 available from W. R. Grace, Inc. located in Baltimore, Md.

Dispersants are also constituent materials of the interface grout. The term "dispersant" is used hereinafter to refer to the class of materials which can be added to reduce the viscosity and yield stress of the mixtures utilized to form the grout and the concrete overlay, including water reducers and high range water reducers. A more detailed description of the use of dispersants may be found in the Master's Thesis of Andersen, P. J., "Effects of Organic Superplasticizing Admixtures and Their Components on Zeta Potential and Related Properties of Cement Materials" (1987). For purposes of disclosure, the above-referenced article is incorporated herein by specific reference.

Dispersants generally work by being adsorbed onto the surface of the cement particles and/or into the near colloid double layer of the cement particles. This creates a negative charge around the surfaces of particles, causing them to repel each other. This repulsion of the particles adds "lubrication" by reducing the "friction" or attractive forces that would otherwise cause the particles to have greater interaction. Because of this, less water can be added initially while maintaining the workability of the mixtures.

A preferred dispersant is sulfonated naphthalene-formaldehyde condensate, an example of which is WRDA 19, which is available from W. R. Grace, Inc. Other dispersants which would work well include sulfonated melamine-formaldehyde condensate, lignosulfonate, and acrylic acid.

B. The Concrete Overlay Layer.

The concrete overlay layer is applied to the interface grout layer as a hydrating mixture of cement-based materials, water, silica fume, dispersant, and aggregates. The concrete overlay differs from the interface grout by the incorporation of aggregates. The aggregates are incorporated into the concrete overlay to provide a strong, durable, tough and dense surface having low porosity. The design of the overlay concrete forms a very fine capillary pore system in the hardened concrete overlay that results in good freeze-thaw stability, low permeability and diffusion capabilities.

In accordance with the standards of the American Society for Testing and Materials (ASTM), the aggregates utilized within the concrete overlay can be divided into two groups: coarse aggregates and fine aggregates. A coarse aggregate is a material consisting of rock clasts that are mainly larger than 2 mm in diameter. A fine aggregate is a material consisting of mineral grain or rock fragments that are mainly smaller than 2 mm in diameter.

Coarse aggregates within the scope of this invention are generally crushed rocks or natural gravel. The coarse aggregates within the scope of this invention conforms to the lithology, size and shape requirements set forth hereinbelow. The coarse aggregates are preferably but not limited to fresh, well-crystallized, medium-grained plutonic or highly metamorphosed rock in accordance with the Descriptive Nomenclature for Constituents of Natural Mineral Aggregates ASTM C294 and the Guide for Petrographic Examination of Aggregates for Concrete ASTM C295. Granitic aggregate is the preferred coarse aggregate. It is preferable not to utilize sedimentary rocks.

The coarse aggregates are preferably not highly weathered or otherwise altered. Additionally, the coarse aggregates preferably have textures which are not mylonitic or cataclastic in accordance with ASTM C294 and ASTM C295.

The content of micro-crystalline rock clasts, which are rocks clasts having a mean grain size less than 1 mm, in coarse aggregates preferably does not exceed 1% by volume of the total coarse aggregates in accordance with ASTM C294 and ASTM C295. The content of coarsely-crystalline rock clasts, which are rocks clasts having a mean grain size greater than 5 mm, in coarse aggregates preferably does not exceed 5% by volume of the total coarse aggregates in accordance with ASTM C294 and ASTM C295. The content of foliated clasts, which are rocks having rod-like and/or plate-like minerals in a planar arrangement, in coarse aggregates preferably does not exceed 5% by volume of the total coarse aggregates in accordance with ASTM C294 and ASTM C295. The content of low density clasts, which are rocks having a density less than 2.6 g/cm$^3$, in coarse aggregates preferably does not exceed 5% by volume of the total coarse aggregates. The content of very low density clasts, which are rocks having a density less than 2.5 g/cm$^3$, in coarse aggregates preferably does not exceed 0.5% by volume of the total coarse aggregates in accordance with the Test Method for Lightweight Pieces in Aggregate ASTM C123 and the Test Method for Specific Gravity and Absorption of Fine Aggregate ASTM C128.

The absorption of the coarse aggregates preferably does not exceed 1% as determined by the Test Method for Specific Gravity and Absorption of Coarse Aggregate ASTM C127. The coarse aggregates preferably do not contain alkali-silica reactive material in accordance with the Test Method for Potential Alkali Reactivity of Cement-Aggregate Combinations (Mortar-Bar Method) ASTM C227, the Test Method for Potential Reactivity of Aggregates (Chemical Method) ASTM C289, ASTM C294 and ASTM C295.

The content of pyrite, pyrrhotite, and other sulfide minerals in coarse aggregate preferably does not exceed 0.5% by volume. Chemically unstable minerals (e.g., soluble sulfates) must not be present in accordance with ASTM C294 and ASTM C295.

The coarse aggregates within the scope of this invention have sizes and shapes as set forth hereinbelow. The maximum dimension of coarse aggregate clasts preferably do not exceed 10 mm, and at least 90% by volume of the clasts preferably have maximum dimensions of less than 8 mm as determined by the Test Method for Sieve Analysis of Fine and Coarse Aggregates ASTM C136. The proportion of material in the coarse aggregate with particle sizes of less than 0.075 mm preferably does not exceed 1.0% by volume as determined by the Test Method for Materials Finer than 75 m (No. 200) Sieve in Mineral Aggregates by Washing ASTM C117. If the "undersize particles" in coarse aggregate are (1) of the same geological origin as the coarse aggregate itself and (2) constitute less than 5.0% by volume of the aggregate, they may be included as coarse aggregate in accordance with ASTM C136, ASTM C294, and ASTM C295. Otherwise, they must be treated as fine aggregate and included with fine aggregate for the purposes of this specification. At lest 70% of the coarse aggregate shall be "cubic-shaped."

The fine aggregates of this invention are natural or manufactured quartzose sand conforming to the lithology, size and shape requirements set forth hereinbelow.

The fine aggregates are preferably composed of mainly mono-crystalline, mono-mineralic quartz grains in accordance with ASTM C294 and ASTM C295. The content of particles other than mono-crystalline quartz is preferably less than 20% by volume in accordance with ASTM C294 and ASTM C295. The content of micro-crystalline rock fragments in fine aggregate preferably does not exceed 10% by volume in accordance with ASTM C294 and ASTM C295. The content of free mica (biotite or white mica) in the fine aggregate preferably does not exceed 1% by volume in accordance with ASTM C294 and ASTM C295. The content of low density clasts in the fine aggregates preferably does not exceed 5% by volume of the total fine aggregates. The content of very low density clasts in fine aggregates preferably does not exceed 0.5% by volume of the total fine aggregates in accordance with ASTM C123 and ASTM C128. The fine aggregate used preferably does not contain alkali-silica reactive material. The following phases are considered potentially alkali reactive and are preferably avoided: chert, opal, chalcedony, cristobalite, tridymite, intermediate to siliceous volcanic glasses, and some quartz in highly metamorphosed rocks in accordance with ASTM C227, ASTM C289, ASTM C294, and ASTM C295. The content of pytite, pyrrohitite, and other reactive sulfide minerals in fine aggregate preferably does not exceed 0.5% by volume. Chemically unstable minerals (e.g., soluble sulfates) and alkali-carbonate reactive minerals are preferably absent from the fine aggregate in accordance with ASTM C294 and ASTM C295.

The fine aggregate preferably has a nominal mass-weighted average particle size of the approximately 1.3 mm. The maximum dimensions of the "oversize" fine aggregate particles is preferably not larger than 3 mm and these particles preferably do not exceed 5.0% by volume of the fine aggregate in accordance with ASTM C136. The proportion of material in the fine aggregate with a particle size of less than 0.075 mm preferably does not exceed 3.0% by volume.

In addition to conventional aggregates used in the cement industry, a wide variety of other aggregates, including fillers, inert fibers (such as polypropylene fibers), strengtheners, including metals and metal alloys (such as stainless steel, calcium aluminate, iron, copper, silver, and gold), balls, filings, pellets, powders, fibers (such as graphite, silica, alumina, fiberglass, polymeric, organic fibers, and such other fibers typically used to prepare various types of composites), may be combined with the hydraulic cements within the scope of the present invention.

It is also within the scope of the present invention to include set hydraulic cement compositions as examples of aggregates. Examples of hydraulic cement compositions include, but are not limited to, ground-up concrete, mortar, or cement. It will be readily appreciated that this provides a use for old concrete materials from obsolete structures, which are currently filling the limited landfill areas. Moreover, due to more restrictive environmental legislation, many ready-mix concrete suppliers are often obligated to find adequate means of handling, recycling, and marketing their waste solids. The present invention sets forth a use for such waste solids.

For many uses, it is preferable to include a plurality of differently sized and graded aggregates capable of filling interstices between the aggregates and the hydraulic cement so that greater density (and hence, greater strength) can be achieved. In such cases, the differently sized aggregates would typically have particle sizes in the range from as small as about 5 μm to as large as about 5 cm. (Of course, different purposes for the resulting concrete will dictate the preferred properties of the concrete and the appropriate size of aggregates to be used.) It is within the skill of one in the an to know generally which aggregates are to be used to achieve the desired characteristics in the final cement or concrete article or structure.

Additionally, calcium chloride and calcium propionate and other common acceleration admixtures can be utilize to increase acceleration of the hydrating concrete overlay layer.

III. Application of the Overlay

The primary steps utilized in the present invention include analyzing the substrate to tailor the thin overlay, cleaning the surface of the substrate, moistening the surface the substrate, preparing the interface grout, applying the interface grout, preparing the concrete overlay and applying the concrete overlay. In additional embodiments of the present invention, a plurality of layers of hydrating cement-based compositions are applied to the surface of a substrate. The application of the layers of hydrating cement-based compositions can be simultaneous or sequential.

A. Analyzing the Substrate to Tailor the Overlay.

The existing cement-based structure is analyzed to tailor design the interface grout and the concrete overlay. The primary design criteria are high interface bond strength, superior overlay strength and superior durability.

The evaluation of the existing cement-based structure begins with a visual inspection of the surface either on site or from representative photographs. Following the visual inspection of the existing cement-based structure, representative core samples are drilled from the concrete, each core preferably being 20 cm in height and having a diameter of 10 cm. The necessary number of samples depends on the magnitude of the construction project and on the severity of degradation/deterioration of the surface of the existing cement-based structure.

The core samples are subjected to a macroscopic and microscopic analysis. The macroscopic analysis gives information about all macroscopic features including identification of any signs of cracks or deleterious breakdown mechanisms (such as sulfate attack, acid attack, alkali-silica reactivity), sand to coarse aggregate ratio, concrete mix design, degree of compaction and the quality of the existing surface. As part of the macroscopic analysis the total porosity and the specific gravity of the concrete is determined according to the Test Method for Specific Gravity, Absorption, and Voids in Hardened Concrete ASTM C642. Selected samples are used to determine the compressive strength and Young's modulus in accordance with the Test Method for Compressive Strength of Cylindrical Concrete Specimens ASTM C39 and the Test Method for Static Modulus of Elasticity and Poisson's Ratio of Concrete in Compression ASTM C469.

Selected core samples are subjected to thin section analysis which includes the sectioning and gluing of representative core sample sections onto an object glass plate followed by impregnation of the microstructure with a florescent epoxy under vacuum. After hardening of the epoxy, the sections are ground to a final thickness of 20 microns. The sections are then analyzed with the use of petrographic microscope to analyze the microscopic features such as bleeding, segregation, micro cracks, plastic shrinkage, cement type, degree of hydration, water to cement ratio, pozzolanic admixtures, signs of deterioration due to chemicals or alkali-silica reactivity, and types of sand and coarse aggregates.

The macroscopic, microscopic and fracture mechanical analyses provide a comprehensive evaluation of the overall present quality of the existing concrete, including information on the actual mix design used, the mechanical strength and the total porosity. The information obtained from the evaluation forms the basis for a complete tailored design of the thin-bonded overlay, which ensures the formation of a strong integral bond between the overlay and the exiting concrete. Tailoring the design of the overlay based on the evaluation can be achieved utilizing models that simulate particle packing, rheology, compressive strength, elasticity, and total porosity of the overlay. Such models are disclosed in copending U.S. application Ser. No. 08/109,100, filed Aug. 18, 1993, in the names of Per Just Andersen, Ph.D., and Simon K. Hodson, and entitled "Design Optimized Compositions and Processes For Microstructurally Engineering Cementitious Mixtures", which is incorporated herein by specific reference.

The analysis of the substrate can also be utilized with the technology disclosed in the above referenced U.S. patent application Ser. No. 08/109,100 to design simulated substrates for experimental use having characteristics such as porosity, strength, and elasticity modulus, comparable to the actual substrate needing repair. The characteristics of the substrate needing repair are first determined as described hereinabove primarily by the thin section analysis, mechanical testing to determine the strength and elasticity modulus, and displacement analysis to determine porosity. After the characteristics of the substrate are determined, simulated substrates can then be designed utilizing the technology disclosed in the above referenced U.S. patent application Ser. No. 08/109, 100. Additionally, a simulated substrate can be designed when sufficient information is available regarding the components of the substrate from sources such as the substrate owner or builder.

The simulated substrate can be utilized or the actual substrate can be utilized to imperically determine the optimal water to cement ratio and the optimal degree of water saturation. Examples of the present invention are described hereinbelow which indicate the method for empirically determining the optimal water to cement ratio and the optimal degree of water saturation. The examples also establish the relationship between maximizing capillary suction and achieving maximum adhesion between the overlay and the substrate.

As explained hereinabove, the optimal water to cement ratio for a particular substrate can be empirically determined by varying the amount of liquid in overlay mixtures applied to a portion of the substrate needing repair or a simulated substrate designed to have comparable qualities to the substrate needing repair and then utilizing a compression test to measure the strength of the interface bond strength formed between the substrate and the overlay cast on the substrate. The mixture having the optimal water to cement ratio will have an interface bond strength at least substantially similar to the substrate strength.

The optimal degree of moistening or water saturation for a particular substrate can be empirically determined by varying the amount of liquid applied to a portion of the substrate needing repair or a simulated substrate designed to have comparable qualities to the substrate needing repair and then utilizing a compression test to measure the strength of the interface bond strength formed between the substrate and the overlay cast on the substrate. The amount of liquid applied to a substrate resulting in an interface bond strength at least substantially similar to the substrate strength is the optimal degree of water saturation.

B. Cleaning the Surface of the Substrate and Planing of Existing Expansion Joints.

The methods of the present invention for bonding the hydrating thin overlay onto the surface of a cement-based substrate further includes the step of cleaning the surface of the existing cement-based substrate. The surface is cleaned to remove dirt and debris from the surface of the substrate, which could otherwise block the hydrating thin overlay from bonding with the surface of the substrate.

Removing dirt and debris results in greater contact between the hydrating thin overlay and the substrate as the thin overlay can directly bond to the surface of the substrate, thereby improving the bond. In addition to increasing the surface area contact between the hydrating thin overlay and the substrate, exposing the surface of the substrate by cleaning the surface enables the hydrating thin overlay to mechanically interlock with the varied features of the surface. The surface of most substrates, even substrates which are essentially flat, tend to be rough and have irregular features. The hydrating thin overlay can flow around and into the varied features of the surface such that it will be mechanically interlocked with the varied surface features after the thin overlay has hardened. By removing dirt and debris, the hydrating thin overlay can better flow around and into the varied surface features resulting in a stronger bond.

Additionally, cleaning the surface of the substrate enables the hydrating thin overlay and the hydration products of the hydrating thin overlay to flow into the pores of the substrate. The portion of the hydrating thin overlay and the resulting hydration products that penetrates into the pores and sets within the pores forms a network of root-like extensions which mechanically anchor the thin overlay to the substrate.

The surface can be cleaned through a variety of ways known to those skilled in the art including blasting with water or sand in accordance with established standards or by an alternative method. The surface can also be cleaned by physically brushing off debris from the surface of the substrate.

The strength of the bond of the thin overlay to the substrate can also be increased by increasing the vertical contact area of the thin overlay with the substrate. One method of increasing the vertical contact area involves forming expansion joints in the substrate or planing and cleaning existing expansion joints in the substrate.

For substrates having existing expansion joints, the expansion joints are preferably planed and cleaned. The cross section view of FIG. 1 depicts a planed and cleaned expansion joint generally at 10 that has received a hydrating thin overlay 20 into the planed and cleaned expansion joint 10 thereby providing increased vertical contact area between the thin overlay 20 and the substrate 30. A new expansion joint 40 has been cut into the thin overlay 20 within the area of the planed and cleaned expansion joint 10 after the thin overlay 20 filled the area of the planed and cleaned expansion joint 10 and hardened.

Prior to placing the thin overlay on a substrate, expansion joints are opened and planed to a width of 5 cm to each side of the original expansion joint and to the depth of 10 cm. Expansion joints can also be created having similar dimensions in substrates without existing expansion joints. The original expansion joints are preferably thoroughly cleaned to remove any dirt or polymer that has been used to seal the original expansion joints. The position of the original expansion joints should be sufficiently marked to enable the cutting of new expansion joints into the hardened thin overlay along the same position as the original expansion joints. By widening the expansion joint, the thin overlay is given a vertical contact area with the old concrete at or near the end of the existing expansion joints where the overlay otherwise might tend to bend up during the passage of a heavy load. By widening the expansion joint 5 cm to each side, a new expansion joint need not lie in the position of the original joint, but can be placed anywhere within the widened area of the original joint. The new expansion joint can be vertical or angled as needed.

C. Moistening the Substrate.

The method of the present invention further includes the step of moistening the substrate which increases the bond strength between the thin overlay and the substrate. As described hereinabove, it is desirable for a portion of the thin overlay to penetrate into the pores of the substrate and set within the pores to form a network of root-like extensions which mechanically anchor the thin overlay. The ability of the hydrating overlay to penetrate into the pores of the substrate is enhanced by sufficiently moistening the substrate to create capillary suction within the pores of the substrate. Capillary suction within the pores can combine with gravity to pull the hydrating cement-based components and hydration products of the overlay into the pores of the substrate. It is desirable for the hydrating cement-based mixture of the overlay to flow as deep into the pores of the substrate as possible, thereby forming long root-like extensions to securely anchor the overlay to the substrate.

Generally, substrates, such as cement, mortar, or concrete, are porous in nature. Upon the introduction of a liquid to the substrate surface, the liquid is absorbed by the substrate such that there no longer exists any quantity of liquid at the surface of the substrate. To maintain a desired water level within porous substrates, compensation must be made for the absorptive nature of such substrates.

In the present invention, the preferred substrate is concrete which is generally porous. The optimal degree of water saturation is generally achieved by partially saturating the substrate such that the saturation is as deep as possible but yet not completely filling the pores. The surface is preferably soaked to ensure complete saturation to a minimum depth of 2.5 cm. The watering frequency is determined by the porosity of the concrete and climatic conditions. At the time of placing the overlay, the concrete substrate should be optimally saturated but surface dry without puddles on the surface. The moistening step is preferably accomplished by the direct application of an aqueous liquid at the surface of the cement-based substrate before the application of the interface grout.

Application of a hydrating cement-based material to a dry concrete surface results in the absorption of a certain amount of liquid in the hydrating cement-based mixture by the interior of the concrete substrate surface. Such an absorption can result in an insufficient amount of liquid to create and maintain capillary suction which leads to a low bond strength. Additionally, an insufficiently moist substrate can result in an amount of liquid remaining at the bond interface between the surface of the concrete and the hydrating cement-based mixture that is insufficient to adequately hydrate the new cement or concrete material. Inadequate hydration due to an insufficient amount of water at the bond interface can lead to low interface bond strength, lack of cohesion, major air inclusions and no internal cohesion to assure that the overlay maintains integrity.

Alternatively, a hydrating cement-based mixture having a sufficiently high amount of water to completely hydrate the mixture and to compensate for the absorptive tendencies of the cement-based substrate can be applied to the surface of the cement-based substrate. The result of such a mixture would be controlled capillary suction within the capillary pores of a premoistened substrate. Additionally, a low water to cement ratio creates less difficulty in controlling the activation and composition of the resulting product, and in assuring consistency in the properties of the resulting product.

The amount of moisture present at the surface of the cement-based substrate is that amount necessary to create capillary suction and in some cases to complete or to initiate a hydration reaction. Depending on the nature of the project and the weather, it may be desirable to permit the surface to dry or to squeegee the surface to eliminate puddles or droplets of water. The term "squeegee" as used throughout this specification is defined to mean to smooth, wipe, or treat with a squeegee. A squeegee is defined in *Webster's Ninth New Collegiate Dictionary* as a blade of leather or rubber or the equivalent set on a handle and used for spreading, pushing, or wiping liquid material on, across, or off a surface. Generally, squeegeeing can be defined as physically working enough water onto a surface to create a dampened state, but removing excess water from the surface such that droplets of moisture are not present.

As described hereinabove, the optimal degree of moistening or water saturation for a particular substrate can also be imperically determined by varying the amount of liquid applied to a portion of the substrate needing repair or a simulated substrate designed to have comparable qualities to the substrate needing repair and then utilizing a compression test to measure the strength of the interface bond strength formed between the substrate and the overlay cast on the substrate. After the optimal degree of water saturation is determined, the amount of water to be applied and the frequency of the application can be determined. Additionally, the climatic conditions expected when the overlay is to be placed onto the substrate should be considered when calculating the amount of water to be applied and the frequency of the application of the water.

D. Preparing and Applying the Interface Grout.

The method of the present invention further comprises the step of preparing the hydrating cement-based mixture of the interface grout. The interface grout is prepared by mixing the hydraulic cement, water, microsilica fume, and dispersant. Mixing is preferably accomplished by use of a high shear grout mixer including a high speed, high shear mixer of the type referred to hereinbelow.

The use of a high speed, high shear mixer results in a more homogeneous mixture, which results in a product with higher strength. Suitable high speed, high shear mixers are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material." For purposes of disclosure, the forgoing patents are incorporated herein by specific reference. High speed mixers within the scope of these patents are available from E. Khashoggi Industries of Santa Barbara, Calif., the assignee of the present invention.

High speed, high shear mixers are capable of achieving a high degree of hydration of the hydrating cement-based mixtures through the use of intense homogenous mixing of cement and water in a short period of time. The result is a material of improved strength, handling characteristics, and overall performance. The material has fewer random entrapped air voids, a greater homogeneity of hydrated compounds, fewer partial or incomplete hydrated compounds, and a more fully developed homogenous structure.

The use of the high speed, high shear mixer for mixing is a preferred embodiment of the present invention because its use results in a consistent and reproducible cement paste with predetermined, high quality properties. Moreover, the use of the high speed mixer is preferred as it breaks apart and thoroughly disperses the cement resulting in a reduction of clumps. Nevertheless, other types of mixing techniques known in the art may be employed.

The inventors have found that the use of hydrating cement-based mixtures obtained by the use of the high energy mixer for making the interface grout results in good fluidity of the cement-based mixtures at extremely low water to cement ratios. It is believed that the cement paste manufactured in a high energy mixer aids in the bonding process of the present invention. Essentially, the high shearing action of the high energy mixer breaks up and disperses paste agglomerates. The application of cement paste manufactured in a high energy mixer to old concrete surfaces results in a bond interface therebetween which is stronger than a bond interface formed between concrete surfaces and cement compositions not manufactured in a high energy mixer.

Additionally, the atmosphere above the mixer can be saturated with a gas such as carbon dioxide during the mixing process, which causes an early false setting and increases the viscosity of the mixture.

The interface grout is preferably prepared immediately before the grout is due to be applied to the substrate surface. The grout is preferably mixed in an on-site power driven mixer which can typically provide sufficient shear with a high number of rotations per minute (e.g., at least 1000 revolutions per minute). The cement, silica fume slurry and water are initially added to the mixer and preferably mixed for a period of two minutes. The dispersant is then added and the mixture is preferably mixed for an additional 6 minutes. The mixture will appear dry during the first four minutes, but thereafter will fluidize and appear liquid. The mixture appears dry initially as the water is reacting with the components to form hydration products. As the hydration products are formed, the total surface area for the adsorption of the dispersant increases resulting in greater electrostatic repulsion thereby fluidizing the mixture and minimizing the amount of water necessary for the desired workability. Until placing, the mixed grout is kept in a separate container while being slowly stirred to prevent segregation. The maximum amount time the grout should be stored is preferably no more than one hour, depending on the prevailing climatic conditions.

The workability of the flesh grout should allow coverage of the substrate surface. To ensure that the grout interface mixture can be pumped and placed, the fluidity of the mixture is preferably determined after mixing, and thereafter each quarter of an hour after mixing. The workability is preferably determined by utilizing the Specification for Flow Table for Use in Tests of Hydraulic Cement ASTM C230. In accordance with the above method, the test specimen of grout is molded on a table to a specified size and shape in a mold. The mold has the shape of a cone with standardized size of 69.88 mm top i.d. by 101.6 mm base i.d. by 25.4 mm in height. With the mold removed, the table with mortar cone is dropped 15 times. Upon completion of the test, the increase in average diameter of three readings is measured. The average diameter of the grout cone testing should be more than 10 cm and less than 20 cm.

The hydraulic cement binder is preferably included within the range from about 900 kg of binder per $m^3$ of the total mixture to about 1500 kg of binder per $m^3$ of the total mixture, is more preferably included within the range from about 1000 kg of binder per $m^3$ of the total mixture to about 1400 kg of binder per $m^3$ of the total mixture, and is most preferably included within the range from about 1100 kg of binder per $m^3$ of the total mixture to about 1300 kg of binder per $m^3$ of the total mixture.

The water to cement ratio is preferably within the range from about 0.1 to about 0.5, more preferably within the range from about 0.15 to about 0.4, and most preferably within the range from about 0.2 to about 0.3.

The microsilica is preferably included in the mixture in the range from about 5% to about 40% by weight of the cement. The microsilica is more preferably included within the range from about 10% to about 30% by weight of the cement. The microsilica is most preferably included within the range from about 15% to about 25% by weight of the cement.

The dispersant is preferably included in the mixture in an amount no greater than about 6% by weight of the cement. The dispersant is more preferably included within the range from about 1% to about 5% by weight of the cement. The dispersant is most preferably included within the range from about 2% to about 4% by weight of the cement.

The methods of the present invention for bonding a hydrating cement-based mixture onto a substrate surface further preferably includes the step of applying the hydrating interface grout mixture onto the surface of a cement-based substrate. The grout is preferably applied to the surface by pumping and subsequently spreading the grout onto the surface with a squeegee in combination with a plate vibrator. Automated systems for pumping and spreading the grout on the surface in an even layer with a constant thickness may be utilized. The grout is applied with a thickness of preferably not greater than about 5 mm, more preferably not greater than 2 mm and most preferably not greater than 1 mm.

The grout may also be scrubbed or worked into the surface. Scrubbing can be accomplished through a variety of ways known to those skilled in the art. In the present invention the hydrating cement paste can be brush scrubbed, squeegeed or troweled on and "into" the surfaces of the existing substrate. The surface of the substrate is not directly scrubbed as the hydraulic cement-based mixture of the grout interface is scrubbed into the surface of the cement-based substrate.

It is believed by the inventors that the application of the hydrating grout mixture or cement paste to the surfaces of the cement-based substrates reduces the presence of air at the bond interface. The presence of air, which can create void fractions, is a cause for low bond strength at the bond interface. This step, therefore, leads to an increased bond strength at the bond interface since void fractions are decreased or eliminated.

E. Preparing and Applying the Concrete Overlay.

The method of the present invention further comprises the step of preparing the hydrating cement-based mixture of the concrete overlay. The concrete overlay is prepared by mixing the hydraulic cement, water, aggregates, microsilica fume, and dispersant.

The hydrating cement-based mixture of the concrete overlay is preferably prepared immediately before the grout is due to be applied to the substrate surface. Mixing is preferably accomplished by use of a high shear grout mixer including a high speed, high shear mixer of the type referred to hereinabove. The cement, sand, silica fume slurry and water are initially added to the mixer and preferably mixed for a period of two minutes. The dispersant is then added and the mixture is preferably mixed for an additional 6 minutes. The mixture will appear dry during the first four minutes, but thereafter will fluidize and appear liquid. The mortar is then transferred to a concrete mixer to be mixed with coarse aggregate for an additional 2 minutes. The concrete mixer is preferably a batch-type mixer capable of mixing the constituent materials into a uniform mass. The mixer is also preferably able to discharge the batch completely. The maximum amount time the concrete overlay should be stored is preferably no more than one hour, depending on the prevailing climatic conditions. Additionally, the atmosphere above the mixer can be saturated with a gas such as carbon dioxide during the mixing process, which causes an early false setting and increases the viscosity of the mixture.

The workability of the flesh concrete overlay preferably allows proper placing and compaction on top of the interface grout with a concrete paver. The concrete overlay preferably has a slump lower than 18 cm, more preferably lower than 10 cm, and most preferably lower than 5 cm as determined in accordance with the test Method for Slump of Hydraulic Cement Concrete ASTM C143. Additionally, utilizing a concrete overlay with a very low slump enables the structure to be quickly returned to usefulness. For example, a concrete overlay with a slump around zero can support light traffic shortly after or immediately after being applied.

The hydraulic cement binder is preferably included within the range from about 300 kg of binder per $m^3$ of the total mixture to about 600 kg of binder per $m^3$ of the total mixture, is more preferably within the range from about 350 kg of binder per $m^3$ of the total mixture to about 550 kg of binder per $m^3$ of the total mixture, and is most preferably within the range from about 400 kg of binder per $m^3$ of the total mixture to about 500 kg of binder per $m^3$ of the total mixture.

The water to cement ratio is preferably included within the range from about 0.1 to about 0.5, more preferably within the range from about 0.15 to about 0.4 and most preferably within the range from about 0.2 to about 0.3.

The microsilica is preferably included in the mixture in the range from about 5% to about 40% by weight of the cement. The microsilica is more preferably included within the range from about 10% to about 30% by weight of the cement. The microsilica is most preferably included within the range from about 15% to about 25% by weight of the cement.

The dispersant is preferably included in the mixture in an amount no greater than about 6% by weight of the cement. The dispersant is more preferably included within the range from about 1% to about 5% by weight of the cement. The dispersant is most preferably included within the range from about 2% to about 4% by weight of the cement.

The fine aggregate is preferably included within the range from about 500 kg per $m^3$ of the total mixture to about 1200 kg per $m^3$ of the total mixture, and is more preferably included within the range from about 600 kg per $m^3$ of the total mixture to about 1100 kg per $m^3$ of the total mixture, and is most preferably included within the range from about 700 kg per $m^3$ of the total mixture to about 1000 kg per $m^3$ of the total mixture.

The coarse aggregate is preferably included within the range from about 500 kg per $m^3$ of the total mixture to about 1200 kg per $m^3$ of the total mixture. More preferably within the range from about 600 kg per $m^3$ of the total mixture to about 1100 kg per $m^3$ of the total mixture. Most preferably within the range from about 700 kg per $m^3$ of the total mixture to about 1000 kg per $m^3$ of the total mixture.

The method of the present invention further includes the step of applying the concrete overlay to the interface grout layer. The concrete overlay is applied to the interface grout before the interface grout can dry, as drying of the interface grout will have a detrimental effect on the established interface bond. The concrete overlay is preferably placed on the interface grout within one minute after the interface grout has been applied. A conventional concrete paver can be utilized to ensure good compaction, good surface finish and an even thickness. The concrete overlay is applied with a thickness of preferably not greater than about 10 cm, more preferably not greater than 5 cm and most preferably not greater than 2 cm.

F. Curing the Thin Overlay and Post-Treatment.

The casting and curing of the thin overlay is preferably executed to protect against harmful influences from the environment during curing. To protect against surface evaporation, a curing compound is preferably added to the surface immediately following the paving operation. To further reduce evaporation, immediately following the application of a curing compound the concrete surface is preferably covered with plastic or another appropriate material for 24 hours. The cast concrete is also preferably protected against water erosion.

The maximum temperature during casting and hardening preferably should not exceed 50° C. If the climatic conditions lead to higher temperatures, the plastic should preferably be covered by wet burlap that is continuously moistened. Following the stripping of the plastic after 24 hours, the concrete should preferably be kept wet with water for a period of 7 days. Traffic can be allowed on the surface as soon as sufficient strength has been obtained.

Twenty-four hours after placing of the thin overlay, the positions of the old expansion joints can be located and new expansion joints can be cut with a saw. The new expansion joint should be cut to about the same width and to about the same depth into the old concrete substrate as the old joint. The new expansion joint can be injected with a self-hardening elastomeric polymer that allow a smoother transition between the individual sections.

Additionally, for repaired road surfaces, a skid resistant texture can be added to the overlay according to the requirements of local authorities, either while the concrete is fresh or after hardening. After hardening, the texture should not be created until after seven days of curing or when about 75% of the final compressive strength is obtained in the thin overlay.

Characterization of the Bond Interface between the Thin Overlay and the Substrate The bond interface formed between the surface of the cement-based substrate and the hydrating cement-based mixture has significant mechanical and chemical integrity with the existing surface of the cement-based substrate. By use of the term "mechanical and chemical integrity," it should be understood that the bond formed between the existing surface of the cement-based substrate and the hydrating cement-based mixture is as structurally sound as (if not stronger than) either the existing substrate or the cement-based thin overlay after it has cured for a period of time. As a result of the bond strength, when stresses are applied to the area about the bond interface, the cement based substrate and the thin overlay are as likely to break as the bond between the substrate and the thin overlay.

As explained above, some of the factors determining the mechanical and chemical integrity of the bonding interface include the cleaning of the substrate surface to expose the surface and the moistening of the substrate to create capillary suction at the surface of the substrate. As a result of cleaning the substrate surface, the hydrating thin overlay bonds with a greater surface area of the substrate surface and can more effectively interlock mechanically with the varied surface features of the substrate surface. Additionally, exposing the substrate surface enhances the effect of the capillary suction created by moistening the substrate. Capillary suction draws the hydrating cement-based mixture of the overlay deep into the pores of the substrate to form a network of root-like extensions to securely anchor the overlay. Additionally, the capillary suction of the moisture within the pores of the substrate works synergistically with the cement-based mixtures of the present invention having a low water to cement ratio to better draw the hydrating cement-based mixtures of the present invention into the pores.

Another factor effecting the mechanical and chemical integrity of the bonding interface is the mechanical strength in the set and hardened condition, a strength due to the cohesion of the particles of cement in the bond and to their adhesion to the bonding surfaces. The quality and strength of the bond depends upon the conditions employed in the bond formation. Importantly, the mechanical integrity of the bond interface is maintained when subjected to stresses. The stresses may be shear, tensile, compression, and the like.

Mechanical strength tests play an important part in determining the quality and strength of the bond. Strength tests typically take three different forms. A specimen may be subjected to tension, compression, or bending tests. Whereas these tests are commonly employed, other types of strength tests known to those skilled in the art may also be employed such as the Slant Shear Test for Latex Bonding ASTM C1042.

An additional factor effecting the mechanical and chemical integrity of the bonding interface is the increased surface area between the substrate and the grout forming the bond interface compared to the prior art. The prior art bonding interfaces are characterized by void spaces or macropores and in many cases a crack is evident between the two surfaces. The elimination of these characteristics increases the contact between the surface areas resulting in a stronger and more homogenous bond.

In traditional cement bonds, the air voids within two millimeters of the bond interface in the new cement material have a typical size greater than about 0.5 mm. Also the percent of total air within 5 mm of the bond interface is much greater in the prior art bonded materials. It is anticipated that most prior art bonds would have a volume of greater than about 5% air voids.

An analysis of the typical void size in the integral bonds of the present invention show that greater than 90% of all voids are less than 0.10 mm in diameter. Furthermore, the total air content of the interface grout is less than that of the prior art cement. In the present invention, the size of the macropores and trapped air are decreased or eliminated as a result of the rheology of the mixture and the process of the invention.

The low void fractions present at the bond interface, or in other words, the elimination of the macropores and the decreased size of the micropores, is due to the presence of crystalline and amorphous noncrystalline materials at the bond interface. The reduction of void fractions at the bond interface due to the presence of amorphous materials is contrary to prior art attempts at reducing void fractions. Previously, others have removed large pores at the bond interface by eliminating any air trapped therein. These prior attempts did not remove trapped air and replace the void with an amorphous microstructure as does the present invention. It is believed that the microsilica reacts with any calcium hydroxide present at that the bond interface to form the amorphous noncrystalline material which has a reduced number of void fractions normally present at the bond interface.

Moreover, the bond interface between the existing surface of the cement-based substrate and the hydrating cement-based materials can further be characterized by micro-cracks which cross the bond interface but are not propagated parallel to the bond interface. This result is important to indicate that the bond is not the nearest plane susceptible to breaking. Most prior art bonds can be characterized by micro-cracks which are propagated parallel to the bond interface, indicating that the bond is susceptible to breaking.

Additionally, the bond interface between the existing surface of the cement-based substrate and the hydrating cement-based mixtures can further be characterized by a low water/cement ratio when compared to the surface of the cement composition comprising the bond interface. Generally, most prior art bond interfaces are not characterized as such. The lower water/cement ratio at the bond interface has the effect of putting the interface matrix in compression with respect to the surface of the cement composition. This effect reduces the "curling up" tendencies and stresses that normally occur in prior art bond interfaces.

Moistening the substrate and applying a thin overlay with a low water to cement ratio are also believed to chemically contribute to the strength of the bond. The moist substrate and the low water to cement ratio of the thin overlay, particularly the interface grout layer, decreases the separation or bleeding of the water within the mixtures and increases the gel characteristics of the mixtures. As a result, the bond interface is more homogenous and stronger.

Maximum capillary suction due to optimal moistening of the substrate and applying a thin overlay to the substrate having a low water to cement ratio would be expected to increase the chemical unity of the newly hydrating overlay and existing substrate because of the increase and intimate contact between the two materials. To understand the chemical effect of moistening the substrate and applying a thin overlay with a low water to cement ratio, the chemistry of hydration must be understood. The chemistry of hydration is extremely complex and can only be approximated by studying the hydration of pure cement compounds. For simplicity in describing cement hydration, it is often assumed that the hydration of each compound takes place independently of the others that are present in the cement mixture. In reality, cement hydration involves complex interrelated reactions of each compound in the cement mixture.

With respect to portland cement, the principal cement components are dicalcium silicate and tricalcium silicate. Portland cement generally contains smaller amounts of tricalcium aluminate (3CaO.Al$_2$O$_3$) and tetracalcium aluminum ferrite (4CaO.Al$_2$O$_3$.FeO). The hydration reactions of the principal components of portland cement are abbreviated as follows:

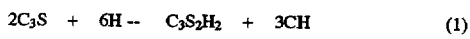
2C$_3$S + 6H → C$_3$S$_2$H$_2$ + 3CH  (1)
tricalcium water C—S—H calcium
silicate              hydroxide

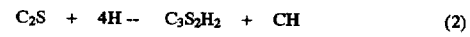
C$_2$S + 4H → C$_3$S$_2$H$_2$ + CH  (2)
dicalcium
silicate

C$_3$A + 26H + 3CSH$_2$ → C$_6$AS$_3$H$_{32}$  (3)
tricalcuim    calcium    ettringite
aluminate    sulfate
              dihydrate

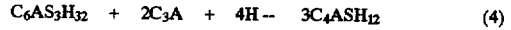
C$_6$AS$_3$H$_{32}$ + 2C$_3$A + 4H → 3C$_4$ASH$_{12}$  (4)
ettringite

C$_4$AF + 26H + 3CSH$_2$ → C$_6$AFS$_3$H$_{32}$ + C  (5)
tetracalcium
aluminum
ferrite

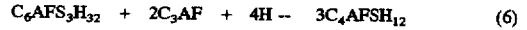
C$_6$AFS$_3$H$_{32}$ + 2C$_3$AF + 4H → 3C$_4$AFSH$_{12}$  (6)

where dicalcium silicate is 2CaO.SiO$_2$, tricalcium silicate is 3CaO.SiO$_2$, calcium hydroxide is Ca(OH)$_2$, water is H$_2$O, S is sulfate, and C—S—H ("calcium silicate hydrate") is the principal hydration product. (The formula C$_3$S$_2$H$_2$ for calcium silicate hydrate is only approximate because the composition of this hydrate is actually variable over a wide range 0.9<C:S<3.0). It is a noncrystalline material which forms extremely small particles in the size of colloidal matter less than 0.1 μm in any dimension. It will be appreciated that there are many other possible hydration reactions that occur with respect to other hydraulic cements and even with respect to portland cement.

On first contact with water, C and S dissolve from the surface of each C$_3$S grain, and the concentration of calcium and hydroxide ions rapidly increases. The pH rises to over 12 in over a few minutes. The rate of this hydrolysis slows down quickly but continues throughout a dormant period. Normally, after several hours, the hydration products (CH and C—S—H) start to form, and the reaction again proceeds rapidly. Dicalcium silicate hydrates in a similar manner, but is much slower because it is a less reactive compound than C$_3$S. For additional information about the hydration reactions, reference is made to F. M. Lea, *Chemistry of Cement and Concrete* at 177–310 (3d. ed. 1978). Silica fume also reacts to form a C—S—H product.

It has been observed that the better the contact between individual cement particles both before and during hydration, the better the hydration product and the better the strength of the bond between the particles. Hence, the positioning of cement particles in close proximity to each other before and during hydration plays an important role in the strength and quality of the final cement composite.

The bond interface formed between the surface of the cement-based substrate and the hydrating cement-based mixture can be further characterized by the absence of organic binders, such as latex and epoxies. Such organic binders tend to be to impermeable to water and form a barrier to the capillary suction within a porous water saturated substrate thereby preventing the binder from being anchored as the overlay of the present invention is anchored. The formation of bonds between two surfaces through the use of epoxies also has a tendency to become unbonded upon the application of stresses. This result is undesirable because the surfaces required to be bonded will constantly be under repair.

The formation of bonds between two surfaces through the use of epoxies is undesirable for an additional reason. The incorporation of epoxies into a bond interface can be expensive; they are simply not economically practical for large projects. The high cost represented by their use, when compared to the use of the relatively inexpensive materials utilized, according to the processes outlined by the present invention, make the use of epoxies undesirable.

Still further, the formation of bonds between two surfaces through the use of epoxies is undesirable due to the solubility of organic epoxies. Because they are soluble, the epoxies present in formed bonds will dissolve in the presence of a soluble agent, usually water, and withdraw from the bond area. The withdrawal of the epoxies from the bond area will result in increased void fractions at the bond area, which correspondingly will result in a weakened bond between the two surfaces.

The present invention employs a process which comprises the step forming a bond between a surface of a substrate and an interface grout which is mechanically stable over a long period of time, is water insoluble, and eliminates any discontinuity thus allowing the two laminate pieces to form a monolithic structure. Indeed, the presence of extra water merely goes to continue the hydration process which may take many years to reach its maximum cured potential.

Thus, in light of the undesirability of using epoxies, it can be seen that the compositions and processes of the present invention for improving the bond between hydrating cement-based mixtures and the surfaces of cement-based substrates which do not require the use of epoxies, or other bonding agents is novel.

V. Examples of the Preferred Embodiments

The methods and compositions for bonding a cement-based thin overlay on a cement-based substrate within the scope of the present invention will be further clarified by a consideration of the following examples, which are intended to be purely exemplary of the use of the invention and should not be viewed as a limitation on any claimed embodiment.

Examples 1–3 illustrate that a simulated substrate can be designed to have properties, such as porosity and strength, comparable to the properties of the actual substrate. Examples 4–19 illustrate that maximum adhesion between a substrate and an overlay is achieved by creating optimal capillary suction within the porous substrate to firmly anchor the overlay to the substrate. Examples 4–19 include prior art overlays as comparison examples and overlays of the present invention to illustrate the effect of capillary suction. Example 20 illustrates the effect of incorporating an optimal amount of air entraining agents into a cement-based mixture on the fracture energy of the overlay. Example 21 is an empirical determination of optimal water to cement ratio for an overlay. Examples 22 and 23 are an empirical determination of the optimal degree of water saturation. The remaining examples are hypothetical examples of the methods and compositions of the present invention.

The common parameters of the experiments of Examples 4–19 are listed hereinbelow. The experiments described in Examples 4–19 utilized a concrete overlay layer having either a low water to cement ratio or a high water to cement ratio. The concrete overlay layers having a low water to cement ratio are referred to as low water content/high strength overlay layers and concrete overlay layers having a high water to cement ratio are referred to as high water content/low strength overlay layers.

The concrete overlay layers having a low water to cement ratio utilized in the experiments described in Examples 4, 7, 8, 10, 12, 13, 15, 16, 18 were formed from a mixture containing the following components:

| Portland Cement | 20.0 kg |
| Silica Fume Slurry | 8.0 kg |
| Total Water | 6.624 kg |
| Dispersant | 0.960 kg |
| Sand | 40.0 kg |
| Air | 1.5% by volume |

The portland cement, silica fume slurry, sand, and water were mixed together in a high speed, high shear mixer for about 2 minutes. The dispersant was then added and the mixture was mixed for an additional 6 minutes. The resulting low water content/high strength overlays had a water to cement ratio of 0.24 and had a test strength of 69 MPa.

The concrete overlay layers having a high water to cement ratio utilized in the experiments described in Examples 5, 7, 9, 11, 14, 17, 19 were formed from a mixture containing the following components:

| Portland Cement | 20.0 kg |
| Silica Fume Slurry | 8.0 kg |
| Total Water | 14.548 kg |
| Sand | 40.0 kg |
| Air | 0.4% by volume |

The portland cement, silica fume slurry, sand, and water were mixed together in a high speed, high shear mixer for about 8 minutes. The resulting high water content/low strength overlays had a water to cement ratio of 0.52 and had a test strength of 45 MPa.

Examples 8–9 and 16–17 describe experiments utilizing a grout interface layer. The grout interface layers described in Examples 8–9 and 16–17 were formed from a mixture containing the following components:

| Portland Cement | 20.0 kg |
| Silica Fume Slurry | 8.0 kg |
| Total Water | 6.920 kg |
| Dispersant | 0.700 kg |
| Air | 2.0% by volume |

The portland cement, silica fume slurry, and water were mixed together in a high speed, high shear mixer for about 2 minutes. The dispersant was then added and the mixture was mixed for an additional 6 minutes. The grout interface layer had a water to cement ratio of 0.25 and had a test strength of 67 MPa.

The experiments described in Examples 4–19 also involve varying amounts water applied to substrates. Substrates are either optimally saturated substrates, dry substrates and wet substrates having too much water. The experiments also vary the use of interface layers between a concrete overlay and a substrate to provide evidence of the effect of capillary suction. The comparision examples also include the use of latex and epoxy interface layers. Additionally, concrete overlay layers are applied directly to the substrate.

The interface strength between a substrate and an overlay was measured by the Slant Shear Test for Latex Bonding ASTM C1042. To enable compression testing by the Slant Shear Test, a substrate core having a diameter of 10 cm and a height of 20 cm was prepared with one end angled and the overlay was cast on the angled end. Measuring the interface strength with the varied parameters of Examples 4–19 reveals the significance of creating optimal capillary suction by varying the degree of saturation of the substrate, the water content of the concrete overlays, and varying the content of the interface layer.

EXAMPLE 1

Evidence of the ability to design a simulated substate is provided by the experiments of this example. Simulated substrates were designed utilizing the technology disclosed in U.S. application Ser. No. 08/109,100, filed Aug. 18, 1993, in the names of Per Just Andersen, Ph.D., and Simon K. Hodson, and entitled "Design Optimized Compositions and Processes For Microstructurally Engineering Cementitious Mixtures" (herein referred to as "the '100 application").

Figure 2:
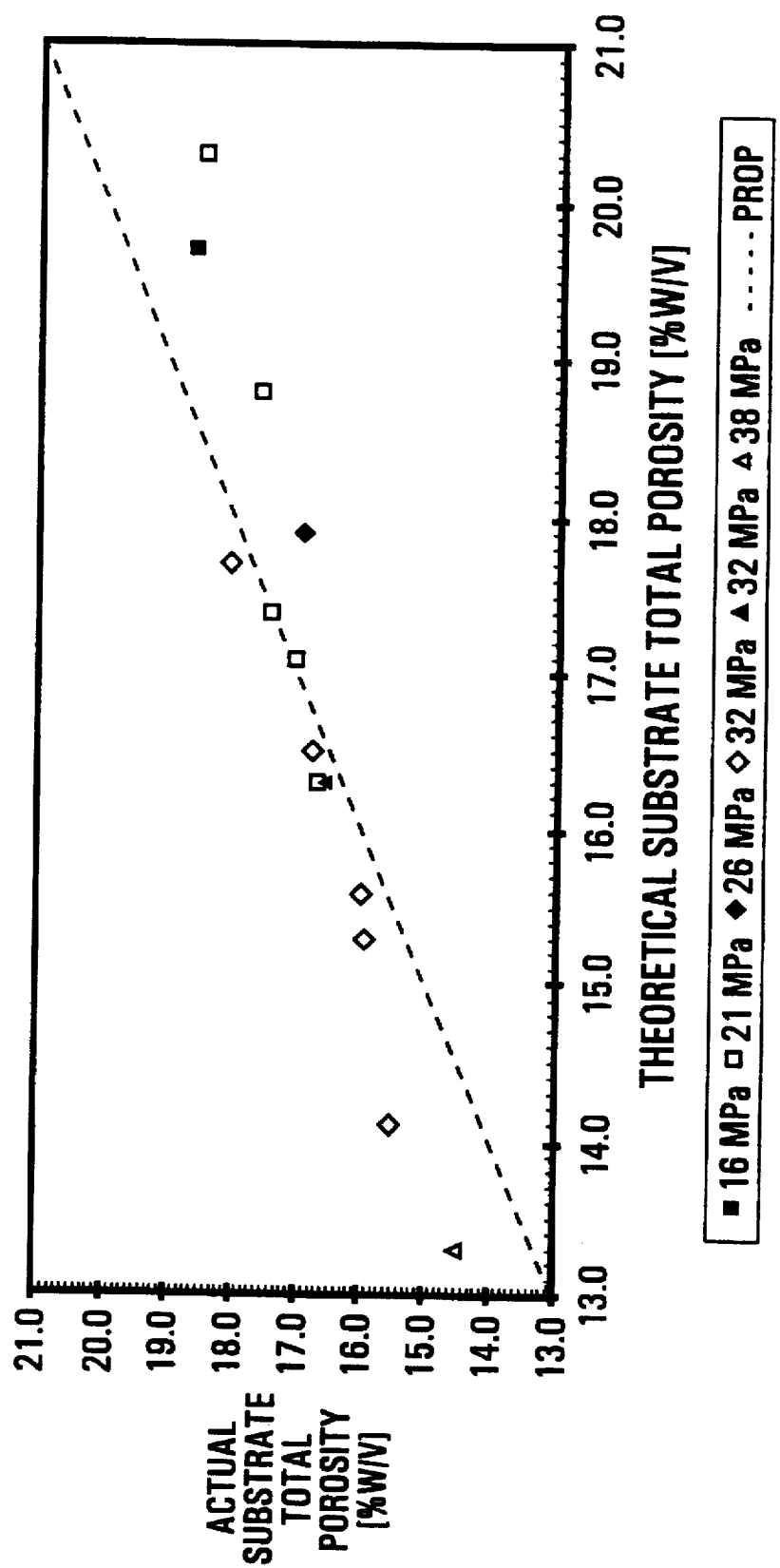
FIG. 2 is a graph demonstrating the accuracy of the simulated substrate design by comparing the actual substrate total porosity of the simulated substrate versus the theoretical substrate total porosity.

FIG. 2 shows the accuracy of the design by comparing the actual substrate total porosity of the simulated substrate versus the theoretical substrate total porosity, the design objective. The substrates were designed with varying strengths as indicated by the different symbols, namely, a shaded square designating a substrate having a strength of 16 MPa, an unshaded square designating 21 MPa, a shaded diamond designating 26 MPa, an unshaded diamond designating 32 MPa, a shaded triangle designating 32 MPa, and an unshaded triangle designating 38 MPa.

The dotted line in FIG. 2 illustrates the points at which the actual and theoretical substrate total porosity is equal. As shown by the dotted direct relationship line, the actual measured porosity of the simulated substrates is very close to the theoretical substrate total porosity.

EXAMPLE 2

Evidence of the ability to design a simulated substate is also provided by the experiments of this example. Simulated substrates were designed utilizing the technology disclosed in the '100 application.

Figure 3:
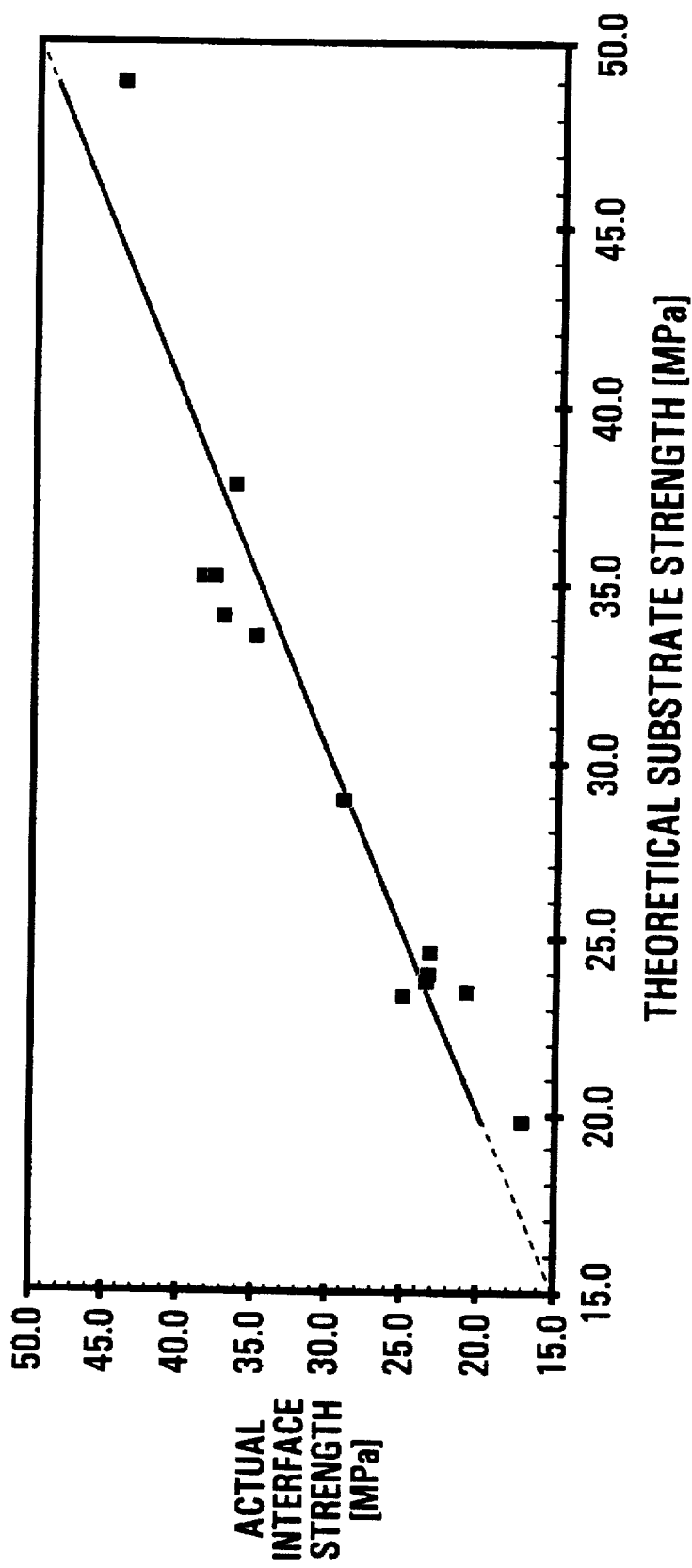
FIG. 3 is a graph demonstrating the accuracy of the simulated substrate design by comparing the actual substrate strength of the simulated substrate versus the theoretical substrate strength.

FIG. 3 shows the accuracy of the design by comparing the actual substrate strength of the simulated substrate versus the theoretical substrate strength, the design objective in MPa. As shown by the direct relationship line, the actual measured strength of the simulated substrates was very close to the theoretical substrate strength. The substrates were designed with varying strengths, however, each substrate had a strength very close to the theoretical substrate strength. The equivalence between the actual substrate strength and the theoretical substrate stength provides further evidence of the ability to accurately design a substrate.

EXAMPLE 3

The experiments of this example provide evidence of the ability to design simulated substates having different properties, such as porosity, while having other properties, such as strength, which remain constant. Simulated substrates were designed utilizing the technology disclosed in the '100 application.

Figure 4:
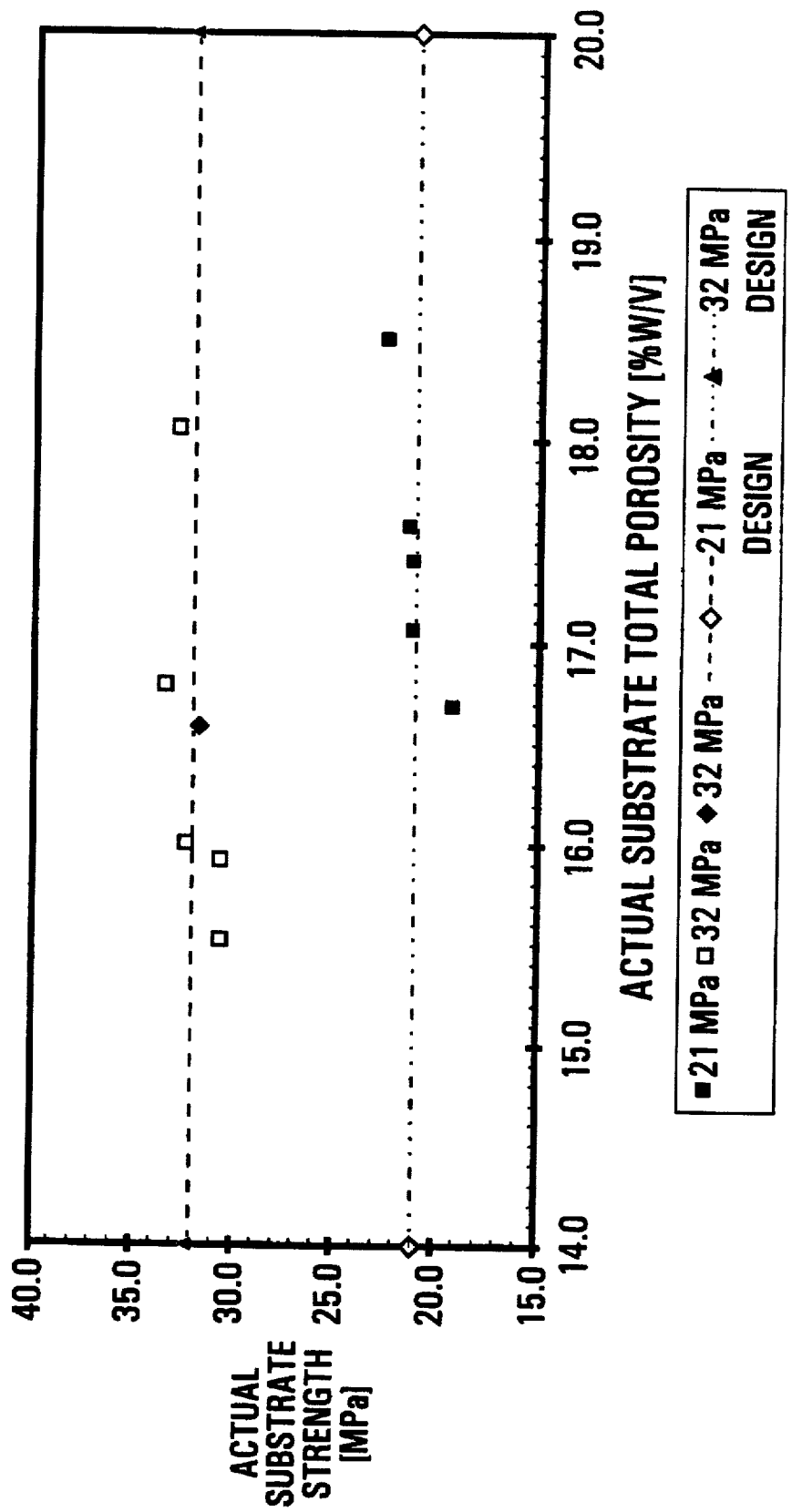
FIG. 4 is a graph demonstrating that substrates can be designed having different properties such as porosity while having other properties, such as strength, which are the same.

Two groups of five substrates were designed to illustrate this capability. One group of substrates had a strength of approximately 21 MPa, each substrate having a different porosity. The other group of substrates had a strength of approximately 32 MPa and each substrate also had a different porosity. The results of the experiments are shown in FIG. 4, wherein the group of substrates having a strength of 21 MPa are represented by an unshaded square and the group of substrates having a 32 MPa are represented by a shaded square. The results shown clearly indicate that substrates can be designed having different properties, such as porosity, while having other properties, such as strength, which remain constant.

EXAMPLE 4

The overlay of this comparision example comprised a concrete overlay layer having a low water to cement ratio and no interface layer. The low water content/high strength overlay was applied to two groups of dry substrates. The two groups of substrates having the same characteristics as the two groups of Example 3. Each substrate within one group had a strength of approximately 21 MPa and a different porosity while each substrate in the other group had a strength of approximately 32 MPa and a different porosity. The porosity of each substrate was designed to be varied within each group from about 10% to about 18% by volume of the substrate. Trends identifiable in one group were also identifiable in the other group. The experiments described in Examples 5-13, 14, 18 and 19 were performed utilizing similar test groups wherein two groups of five substrates are utilized having the same characteristics as the two groups of Example 3.

Figure 5:
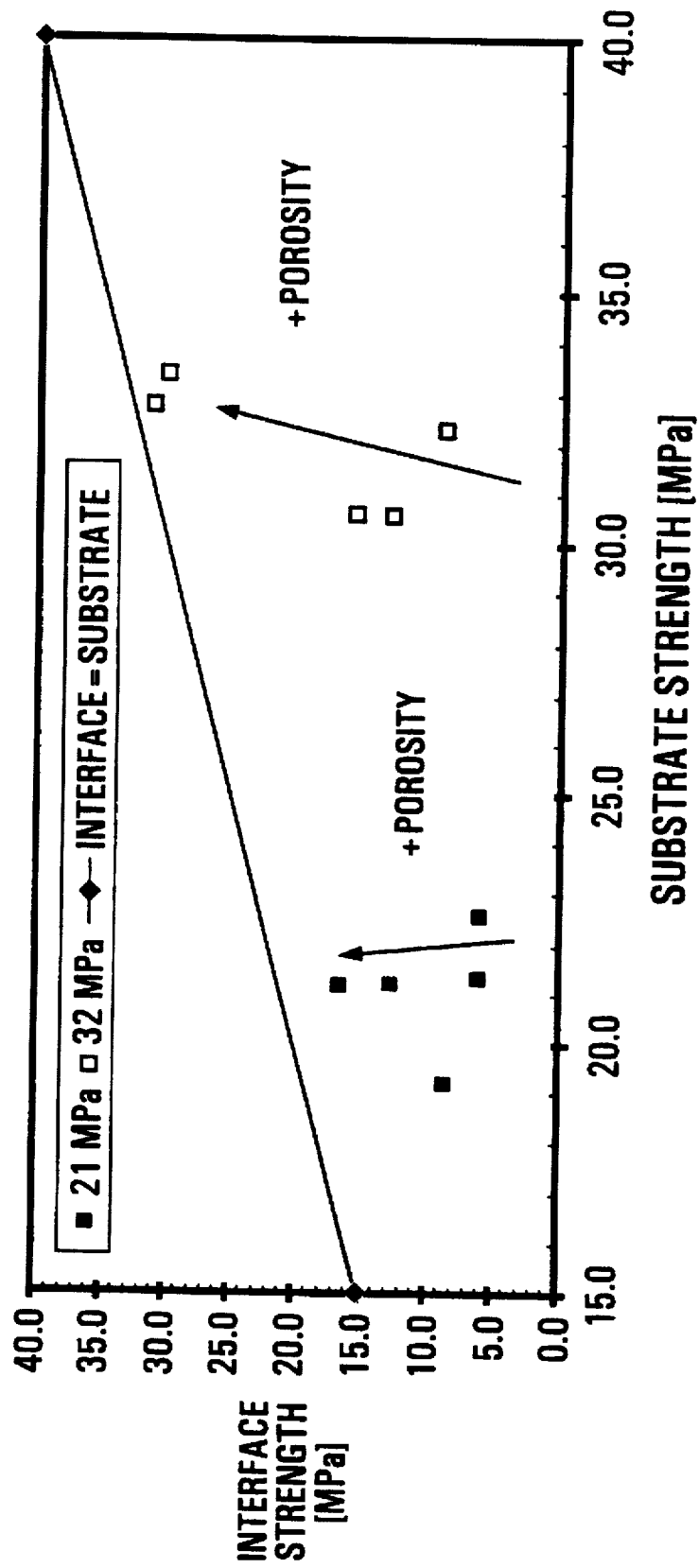
FIG. 5 is a graph comparing the interface strength to substrate strength for a low water content/high strength overlay applied to a dry substrate with no interface layer.

The results of the experiment are shown in the graph of FIG. 5 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The interface strength between the overlay and the substrate was less than the substrate strength for each overlay.

Figure 6:
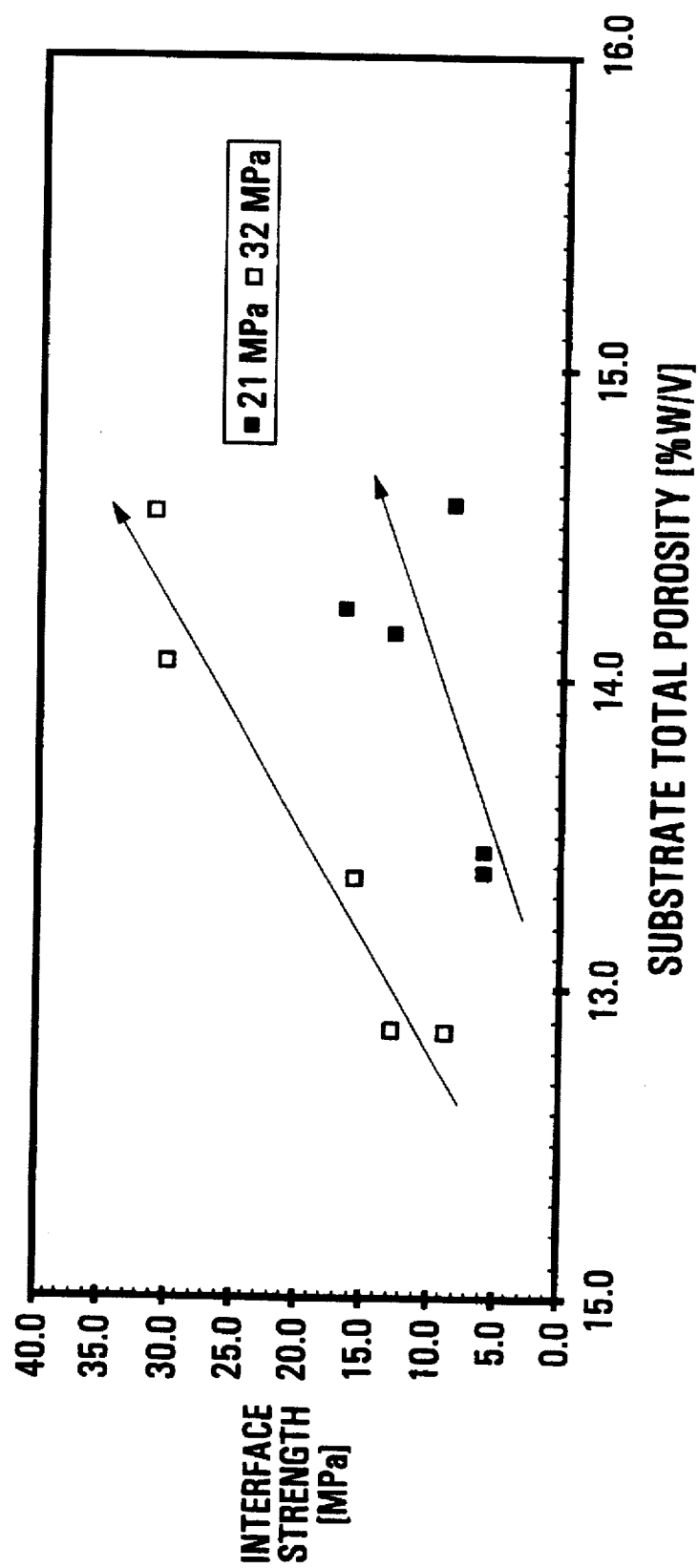
FIG. 6 is a graph comparing the interface strength to substrate total porosity for the low water content/high strength overlay applied to a dry substrate with no interface layer as shown in FIG. 5.

The direction of the arrows in FIG. 5 indicates the trend of increasing porosity of the substrates within each group. The substrates with a high porosity had a greater interface strength than the substrates with a low porosity. This trend is better illustrated in FIG. 6 which is a graph comparing the interface strength to the substrate total porosity with arrows indicating the trend of increasing porosity within each group. The substrates having a strength of approximately 21 MPa are again designated by shaded squares and the substrates having a strength of approximately 32 MPa are designated by unshaded squares.

The results indicate that the greater the porosity of the substrate the greater the adhesion is between a substrate and an overlay. The results also indicate that a low water content/high strength overlay applied to a dry substrate yield an interface bond having less strength than the strength of the substrate, which means that in the compression test the bond was broken with much less stress than would be needed to fracture the substrate. The increase in interface strength with the increased substrate porosity also indicates the significance of capillary suction since capillary suction increases with increased porosity.

EXAMPLE 5

The overlay of this example comprised a concrete overlay layer having a high water to cement ratio and no interface layer. The high water content/low strength overlay was applied to two groups of dry substrates. One substrate group had a strength of 21 MPa and the other group had a strength of 32 MPa. The porosity of each substrate was designed to be varied within each group from about 10% to about 18% by volume of the substrate.

Figure 7:
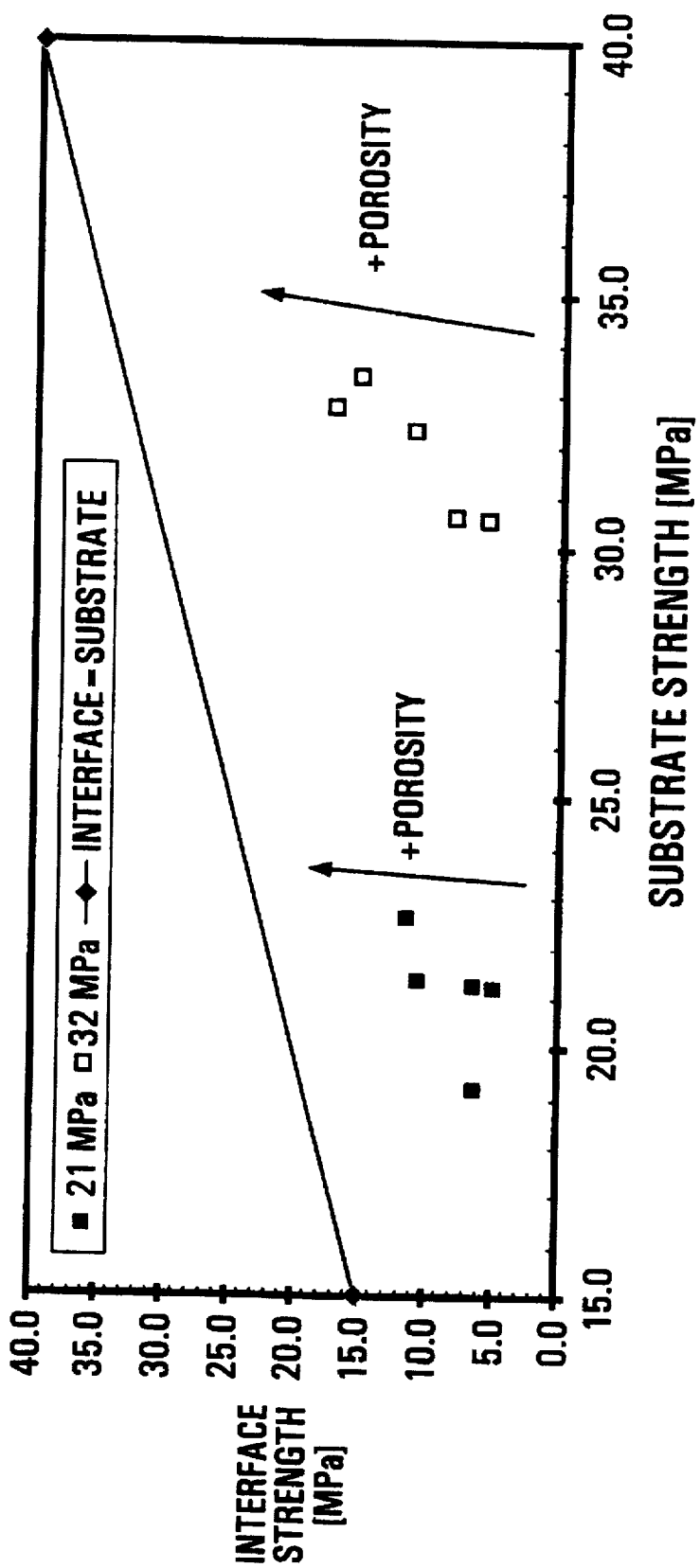
FIG. 7 is a graph comparing the interface strength to substrate strength for a high water content/low strength overlay applied to a dry substrate with no interface layer.

The results of the experiment are shown in the graph of FIG. 7 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. In all instances, the interface strength between the overlay and the substrate was less than the substrate strength for each overlay.

Figure 8:
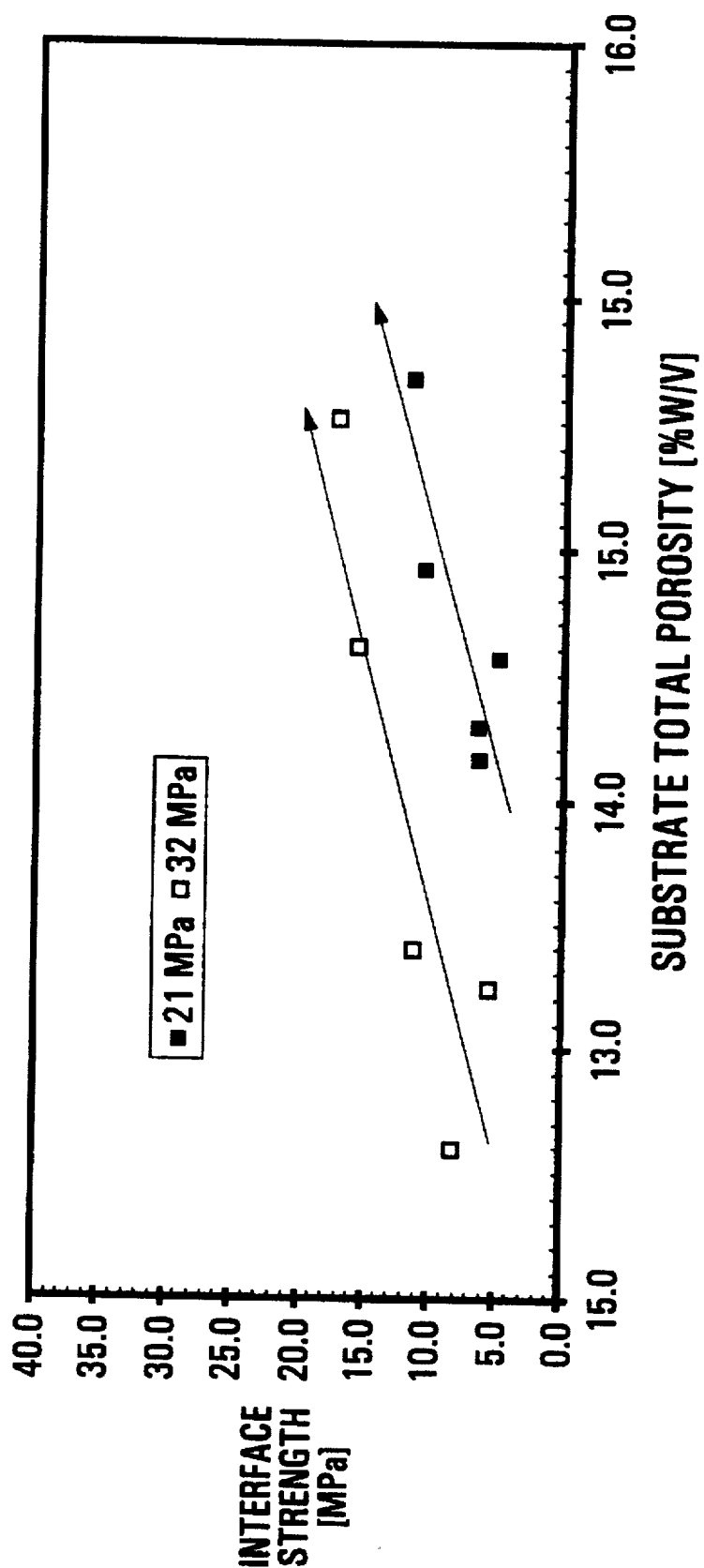
FIG. 8 is a graph comparing the interface strength to substrate total porosity for the high water content/low strength overlay applied to a dry substrate with no interface layer as shown in FIG. 7.

The direction of the arrows in FIG. 7 indicates the trend of increasing porosity of the substrates within each group. The substrates with a high porosity had a greater interface strength than the substrates with a low porosity. This trend is better illustrated in FIG. 8 which is a graph comparing the interface strength to the substrate total porosity with arrows indicating the trend of increasing porosity within each group. The substrates having a strength of approximately 21 MPa are again designated by shaded squares and the substrates having a strength of approximately 32 MPa are designated by unshaded squares.

As in Example 4, the results again indicate that the greater the porosity of the substrate the greater the adhesion is between a substrate and an overlay. The interface bond strength between the dry substrates and the low water content/high strength overlays of the experiments in Example 4 were, however, higher than the interface bond strength achieved between the dry substrates and the high water content/low strength overlays of this example. The lower interface strength results from the dilution of hydration products entering the capillary pores of the substrate due to the high water to cement ratio of the high water content/low strength overlay.

EXAMPLE 6

The overlay of this example comprised a concrete overlay layer having a low water to cement ratio with a latex interface layer. The low water content/high strength overlay was applied to two groups of dry substrates. One substrate group had a strength of 21 MPa and the other group had a strength of 32 MPa. The porosity of each substrate was designed to be varied within each group from about 10% to about 18% by volume of the substrate.

Figure 9:
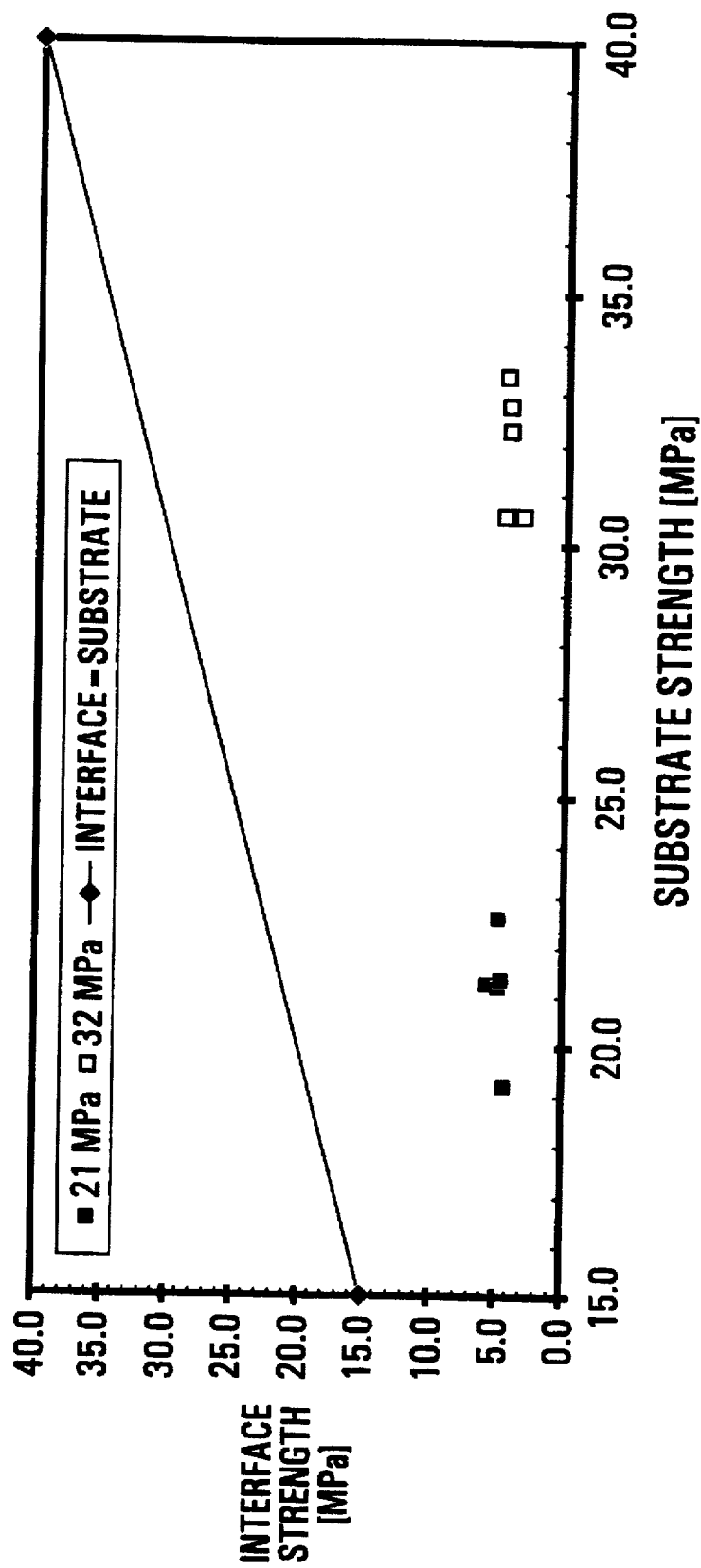
FIG. 9 is a graph comparing the interface strength to substrate strength for a low water content/high strength overlay applied to a dry substrate with a latex interface layer.

The results of the experiment are shown in the graph of FIG. 9 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The interface strength between the overlay and the substrate was significantly less than the substrate strength for each overlay.

Figure 10:
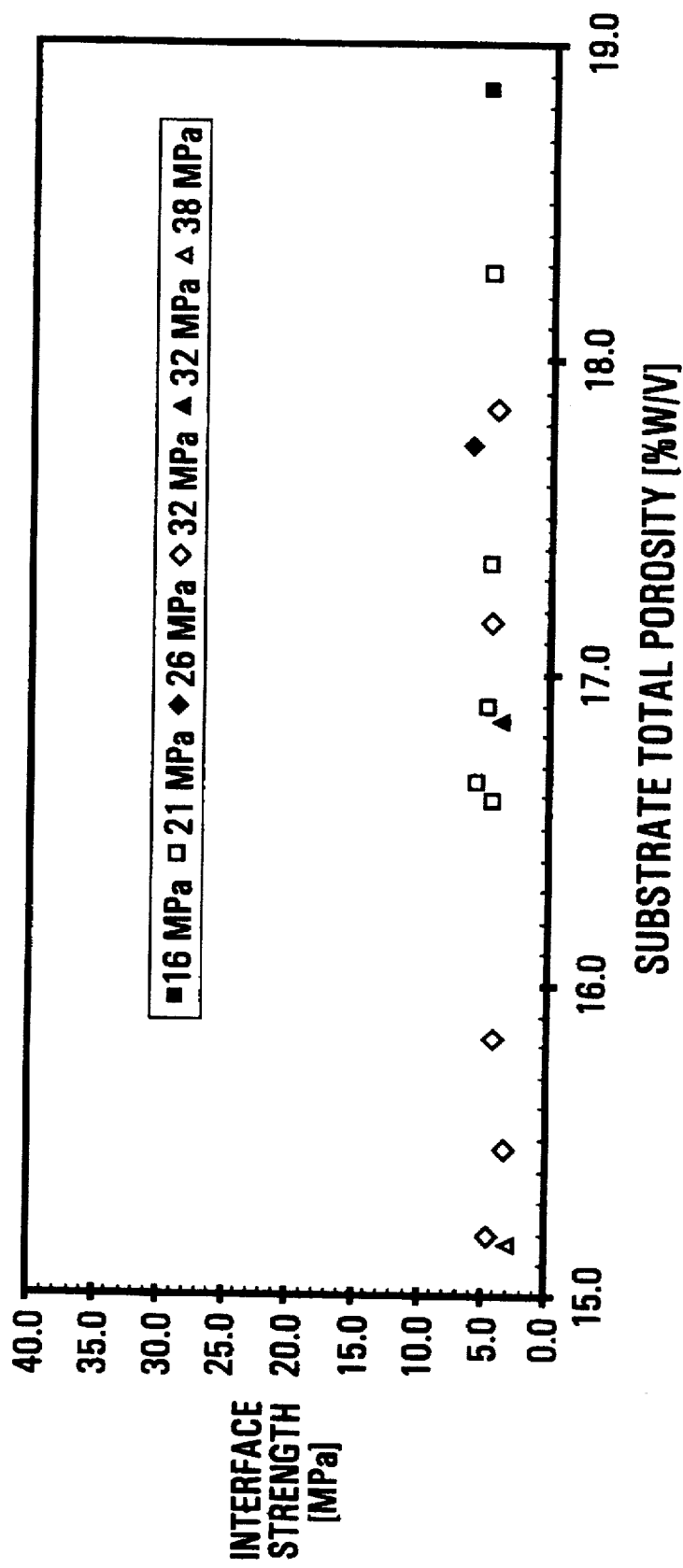
FIG. 10 is a graph comparing the interface strength to substrate total porosity for the low water content/high strength overlay applied to a dry substrate with a latex interface layer as shown in FIG. 9.

The porosity of the substrates had no effect on the interface strength between the substrate and the overlay. This trend is also illustrated in FIG. 10 which is a graph comparing the interface strength to the substrate total porosity wherein a low water content/high strength overlay is applied on a latex interface layer to dry substrates having various strengths. A shaded square designating a dry substrate having a strength of 16 MPa, an unshaded square designating 21 MPa, a shaded diamond designating 26 MPa, an unshaded diamond designating 32 MPa, and a shaded triangle designating 32 MPa, an unshaded triangle designating 38 MPa.

The interface strengths obtained by a low water content/ high strength overlay and a latex interface layer on a dry substrate were significantly lower than the interface strengths achieved without an interface layer as in Examples 4 and 5. The lower interface strength results from the impermeability of the latex layer which substantially blocks the flow of water and hydration products into the capillary pores of the substrate and minimizes the capillary suction.

EXAMPLE 7

The overlay of this example comprised a concrete overlay layer having a high water to cement ratio with a latex interface layer. The high water content/low strength overlay was applied to two groups of dry substrates. One substrate group had a strength of 21 MPa and the other group had a strength of 32 MPa. The porosity of each substrate was designed to be varied within each group from about 10% to about 18% by volume of the substrate.

Figure 11:
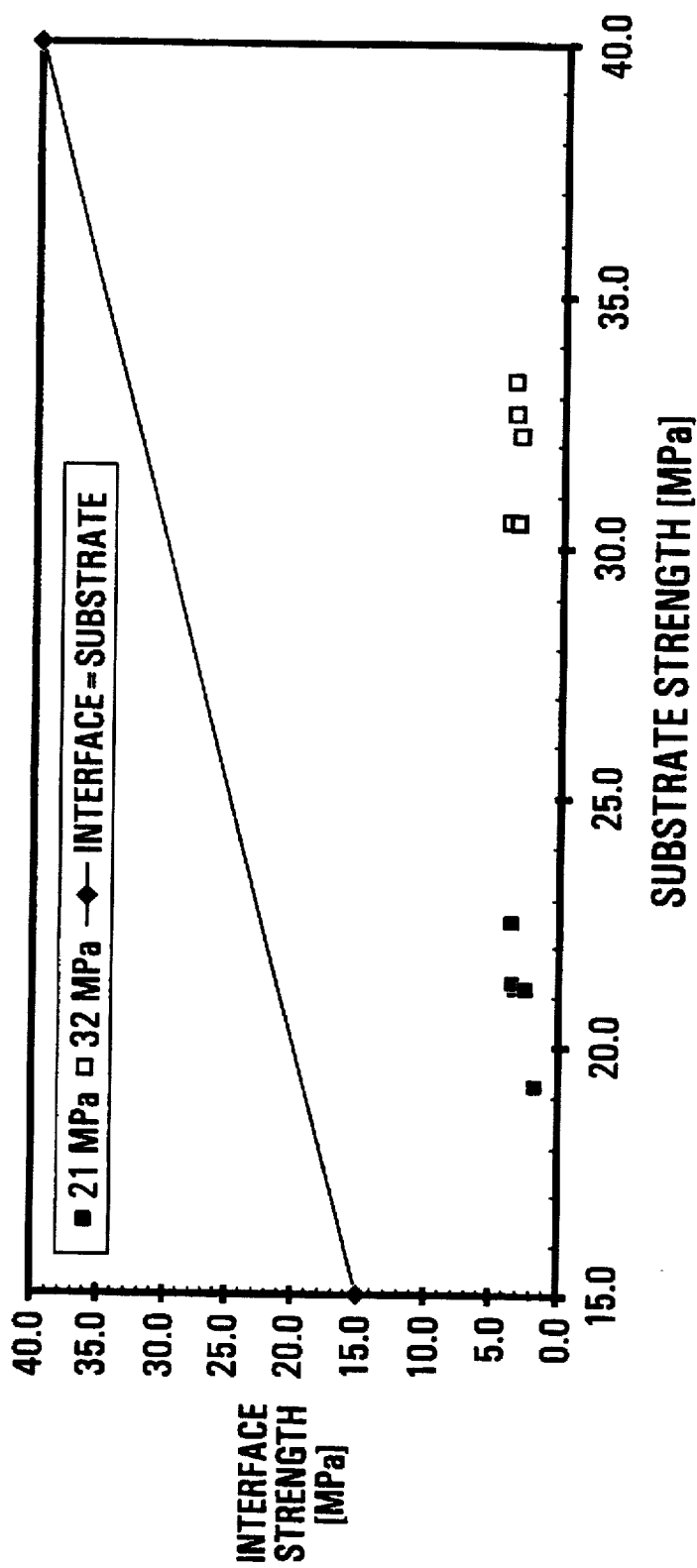
FIG. 11 is a graph comparing the interface strength to substrate strength for a high water content/low strength overlay applied to a dry substrate with a latex interface layer.

The results of the experiment are shown in the graph of FIG. 11 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The interface strength between the overlay and the substrate was significantly less than the substrate strength for each overlay.

As in the experiments of Example 6, the porosity of the substrates had no effect on the interface strength between the substrate and the overlay. The interface strengths obtained by a high water content/low strength overlay and a latex interface layer on a dry substrate were comparable to the interface strengths obtained in the experiments of Example 6 by a high water content/low strength overlay and a latex interface layer on a dry substrate. The comparability of the interface strengths achieved in the experiments of this example and Example 6 supports the conclusion that the impermeability of the latex layer substantially blocks the flow of water and hydration products into the capillary pores of the substrate and minimizes the capillary suction.

EXAMPLE 8

The overlay of this example comprised a concrete overlay layer having a low water to cement ratio and a grout interface layer containing silica fume. The low water content/high strength overlay was applied to two groups of dry substrates. One substrate group had a strength of 21 MPa and the other group had a strength of 32 MPa. The porosity of each substrate was designed to be varied within each group from about 10% to about 18% by volume of the substrate.

Figure 12:
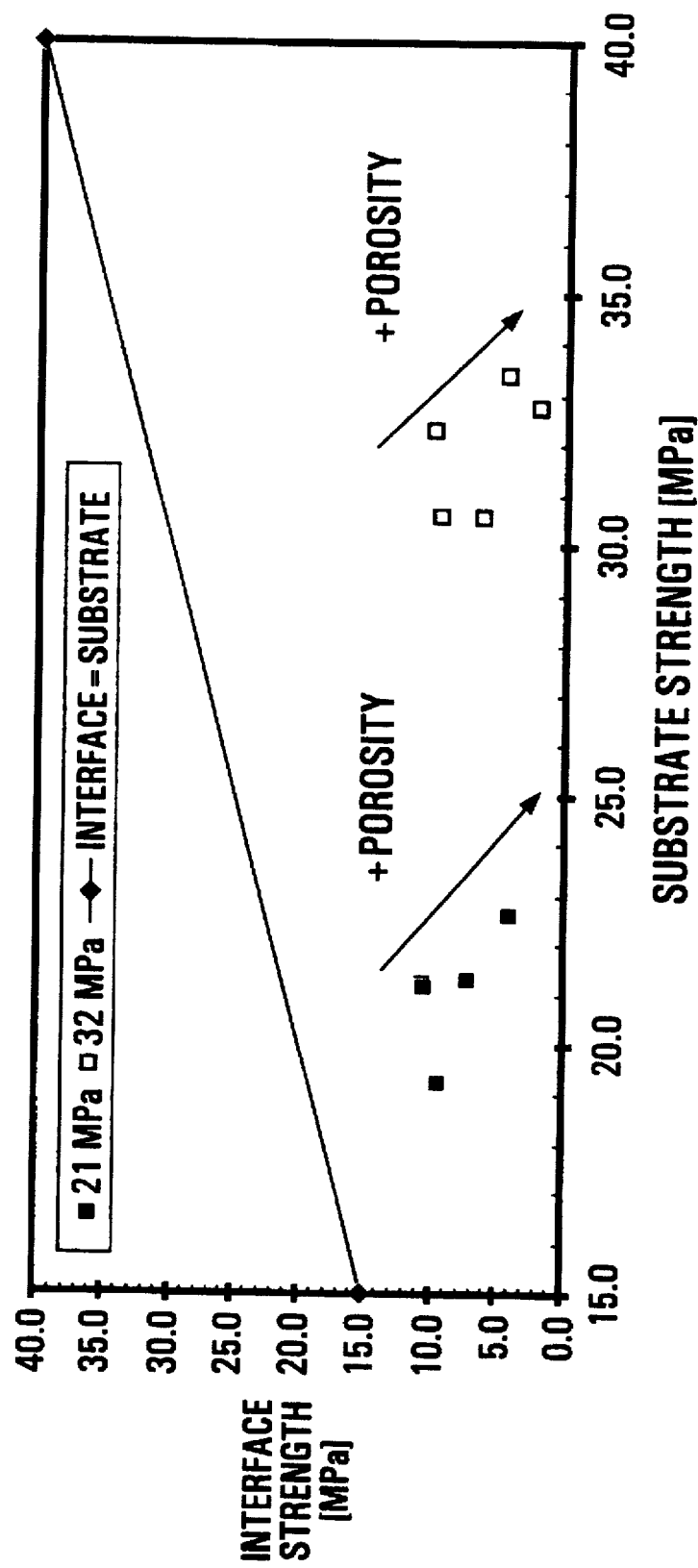
FIG. 12 is a graph comparing the interface strength to substrate strength for a low water content/high strength overlay applied to a dry substrate with a grout interface layer containing silica fume.

The results of the experiment are shown in the graph of FIG. 12 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The interface strength between the overlay and the substrate was less than the substrate strength for each overlay.

Figure 13:
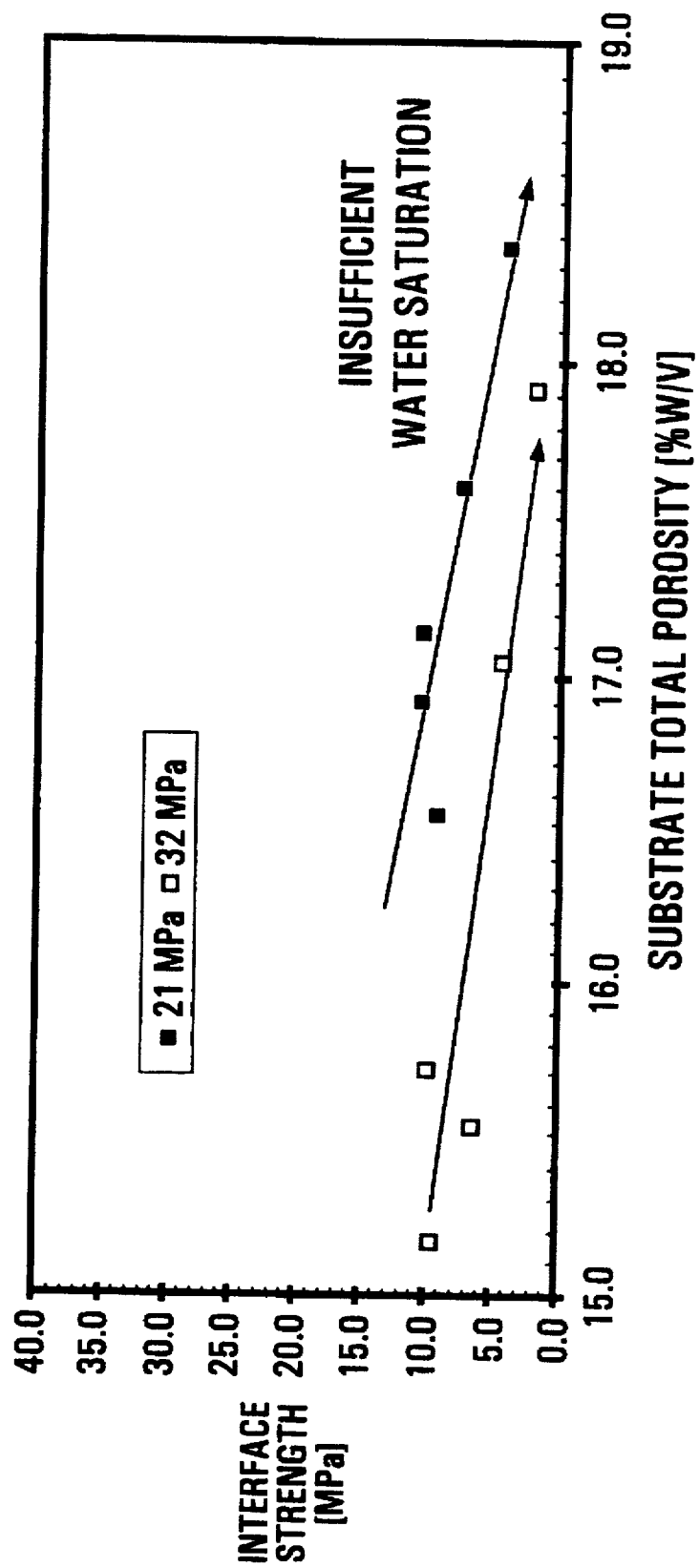
FIG. 13 is a graph comparing the interface strength to substrate total porosity for the low water content/high strength overlay applied to a dry substrate with a grout interface layer containing silica fume as shown in FIG. 12.

The direction of the arrows in FIG. 12 indicates the trend of increasing porosity of the substrates within each group. The substrates with a high porosity had a lower interface strength than the substrates with a low porosity. This trend is better illustrated in FIG. 13 which is a graph comparing the interface strength to the substrate total porosity with arrows indicating the trend of increasing porosity within each group. The substrates having a strength of approximately 21 MPa are again designated by shaded squares and the substrates having a strength of approximately 32 MPa are designated by unshaded squares.

The adhesion was weaker for the more porous substrates than for the less porous substrates which indicates that the low water content/high strength overlay had an insufficient amount of water to enter into the capillary pores of the substrate and anchor the overlay. Additionally, as the porosity increased the water was sucked out of the overlay eliminating cohesion and adhesion.

EXAMPLE 9

The overlay of this example comprised a concrete overlay layer having a high water to cement ratio and a grout interface layer containing silica fume. The high water content/low strength overlay was applied to two groups of dry substrates. One substrate group had a strength of 21 MPa and the other group had a strength of 32 MPa. The porosity of each substrate was designed to be varied within each group from about 10% to about 18% by volume of the substrate.

Figure 14:
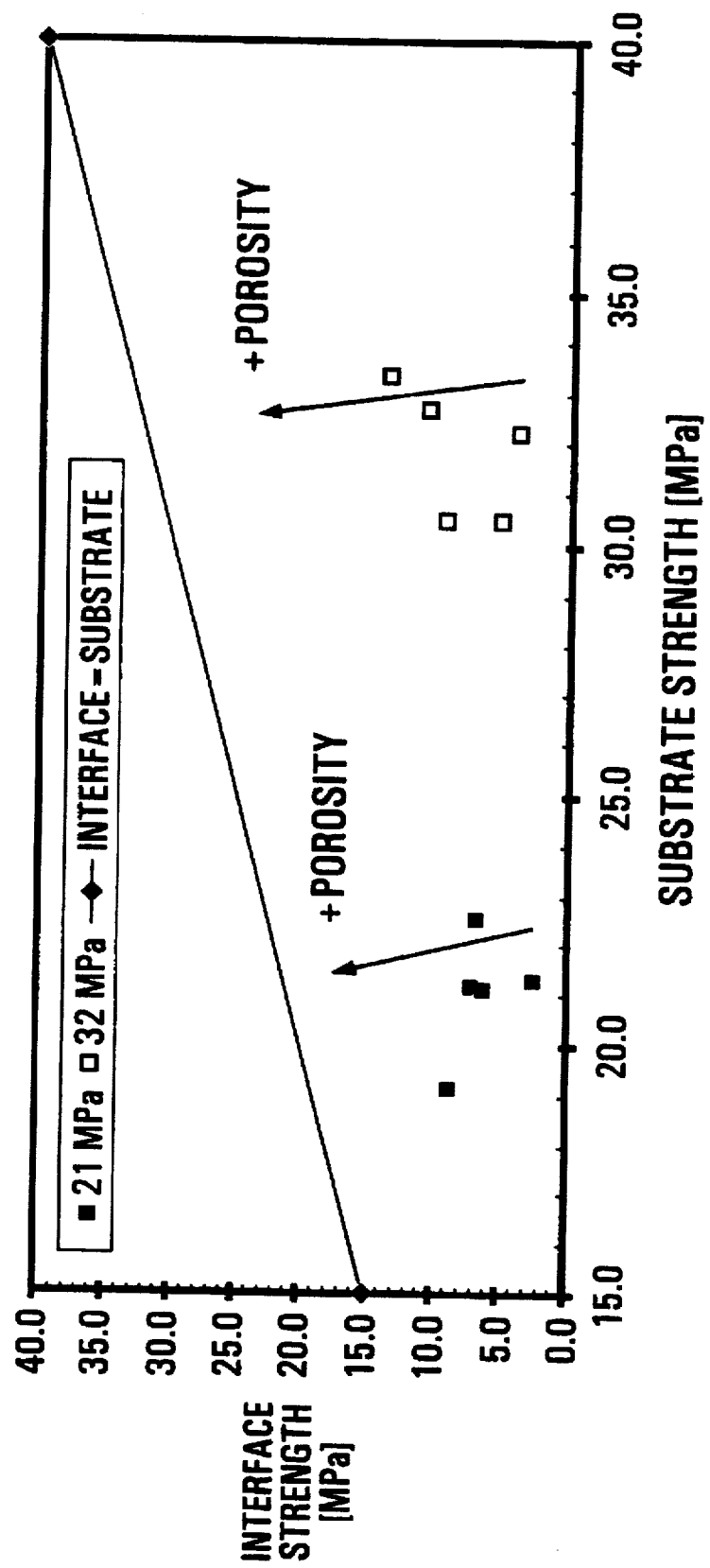
FIG. 14 is a graph comparing the interface strength to substrate strength for a high water content/low strength overlay applied to a dry substrate with a grout interface layer containing silica fume.

The results of the experiment are shown in the graph of FIG. 14 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The interface strength between the overlay and the substrate was less than the substrate strength for each overlay.

The direction of the arrows in FIG. 14 indicates the trend of increasing porosity of the substrates within each group. The adhesion was stronger for the more porous substrates than for the less porous substrates which indicates that the high water content/low strength overlay had a sufficient amount of water to enter into the capillary pores of the substrate and anchor the overlay.

EXAMPLE 10

The overlay of this example comprised a concrete overlay layer having a low water to cement ratio and an epoxy interface layer. The low water content/high strength overlay was applied to two groups of substrates, one substrate group had a strength of 21 MPa and the other group had a strength of 32 MPa. The porosity of each substrate was designed to be varied within each group from about 10% to about 18% by volume of the substrate. The substrate group having a strength of 21 MPa was saturated with an optimal amount of water while the substrate group having a strength of 32 MPa was not moistened.

Figure 15:
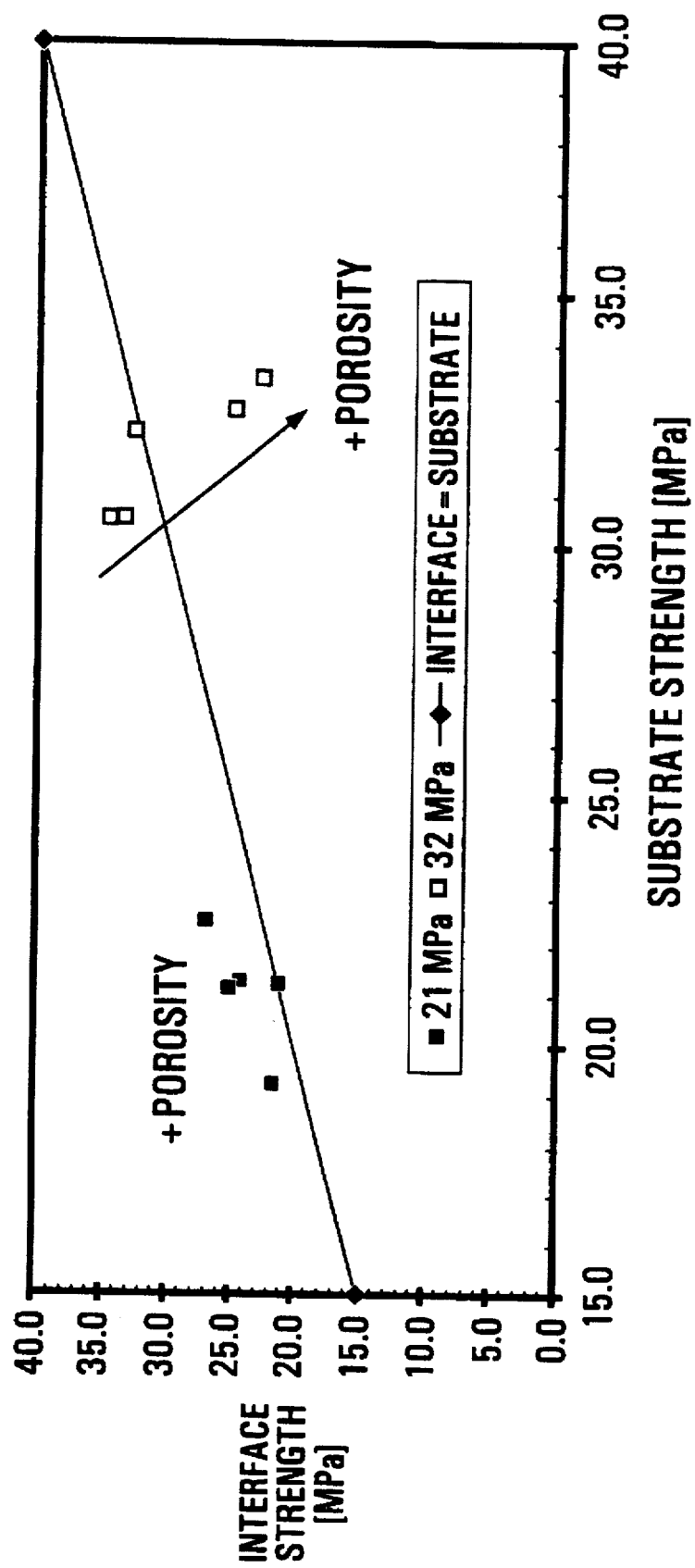
FIG. 15 is a graph comparing the interface strength to substrate strength for a low water content/high strength overlay applied to a dry substrate with an epoxy interface layer.

The results of the experiment are shown in the graph of FIG. 15 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The direction of the arrow in FIG. 15 indicates the trend of increasing porosity of the substrates within the dry group of substrates.

The interface strength of the bond between each overlay and each optimally water saturated substrate was equal to or greater than the substrate strength for each overlay while the interface strength of the bond between each overlay and each dry substrate also ranged below the substrate strength. The results indicate that a low water content/high strength overlay forms a stronger bond with an optimally water saturated substrate than with a dry substrate. The bonds having an interface strength equal to or exceeding the strength of the substrate strength will fracture at the interface in a compression test. The epoxy apparently has sufficient permeability for the optimal water saturation to effectively create capillary suction and anchor the overlay.

The interface strength decreased as the porosity increased for the substrates having a strength of approximately 32 MPa indicating that too much suction occurred due to the insufficient amount of water or that the insufficient amount of water minimized the entry into the capillary pores of the substrate.

EXAMPLE 11

The overlay of this example comprised a concrete overlay layer having a high water to cement ratio with an epoxy interface layer. The high water content/low strength overlay was applied to two groups of dry substrates, one substrate group had a strength of 21 MPa and the other group had a strength of 32 MPa.

Figure 16:
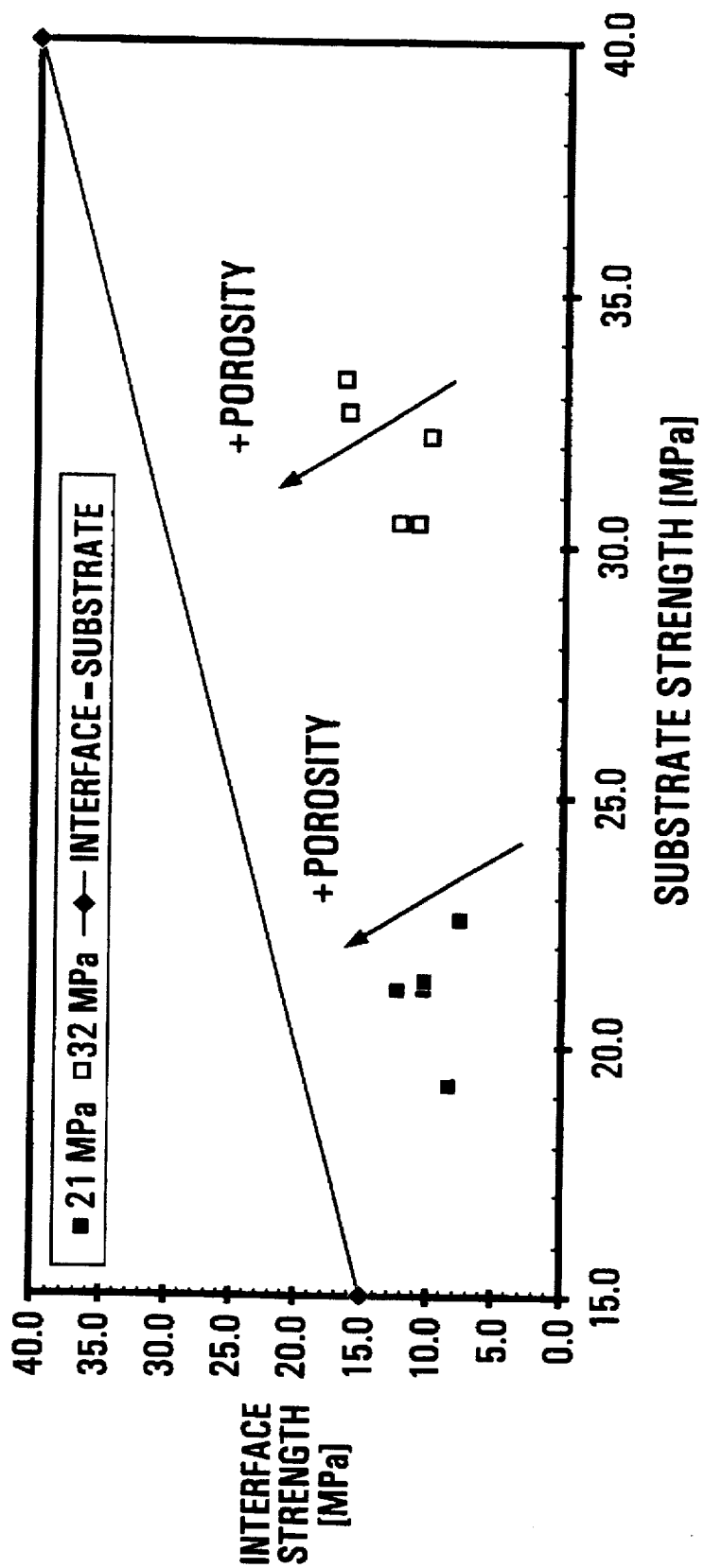
FIG. 16 is a graph comparing the interface strength to substrate strength for a high water content/low strength overlay applied to a dry substrate with an epoxy interface layer.

The results of the experiment are shown in the graph of FIG. 16 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The direction of the arrows in FIG. 16 indicates the trend of increasing porosity of the substrates within each group.

The interface strength increased as the porosity of the substrate increased which combined with the results of the experiments of Example 10 indicates that the epoxy had sufficient permeability to permit a degree of capillary suction.

EXAMPLE 12

The overlay of this example comprised a concrete overlay layer having a high water to cement ratio and no interface layer. The high water content/low strength overlay was applied to two groups of substrates, one substrate group had a strength of 21 MPa and the other group had a strength of 32 MPa. The porosity of each substrate was designed to be varied within each group from about 10% to about 18% by volume of the substrate. The substrate group having a strength of 21 MPa was saturated with an optimal amount of water while the substrate group having a strength of 32 MPa was moistened in increasing amounts.

Figure 17:
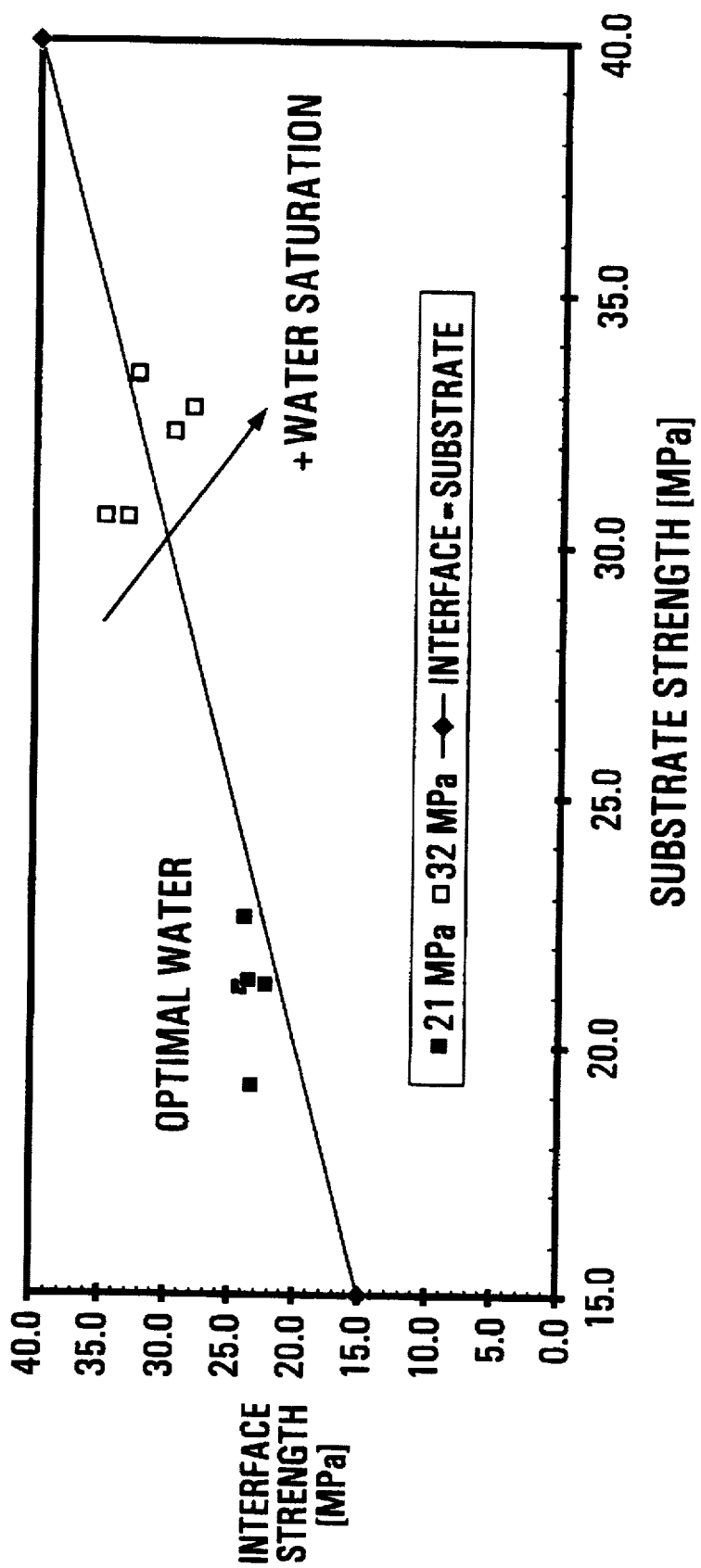
FIG. 17 is a graph comparing the interface strength to substrate strength for a low water content/high strength overlay applied to a wet substrate with no interface layer.

The results of the experiment are shown in the graph of FIG. 17 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The direction of the arrow in FIG. 17 indicates the trend of increasing water saturation of the substrates within the group of substrates having a strength of 32 MPa.

The interface strength of the bond between each overlay and each optimally water saturated substrate was equal to or greater than the substrate strength for each overlay while the interface strength of the bond between each overlay and each dry substrates also ranged below the substrate strength. The results indicate that a low water content/high strength overlay forms a stronger bond with an optimally water saturated substrate than with a wet substrate. The interface strength decreased as the water saturation increased for the substrates having a strength of approximately 32 MPa indicating that too much water was added and as a result the capillary suction was minimized.

EXAMPLE 13

The overlay of this example comprised a concrete overlay layer having a low water to cement ratio with no interface layer. The low water content/high strength overlay was applied to six substrates having varying strengths after the substrates had been optimally saturated with water.

Figure 18:
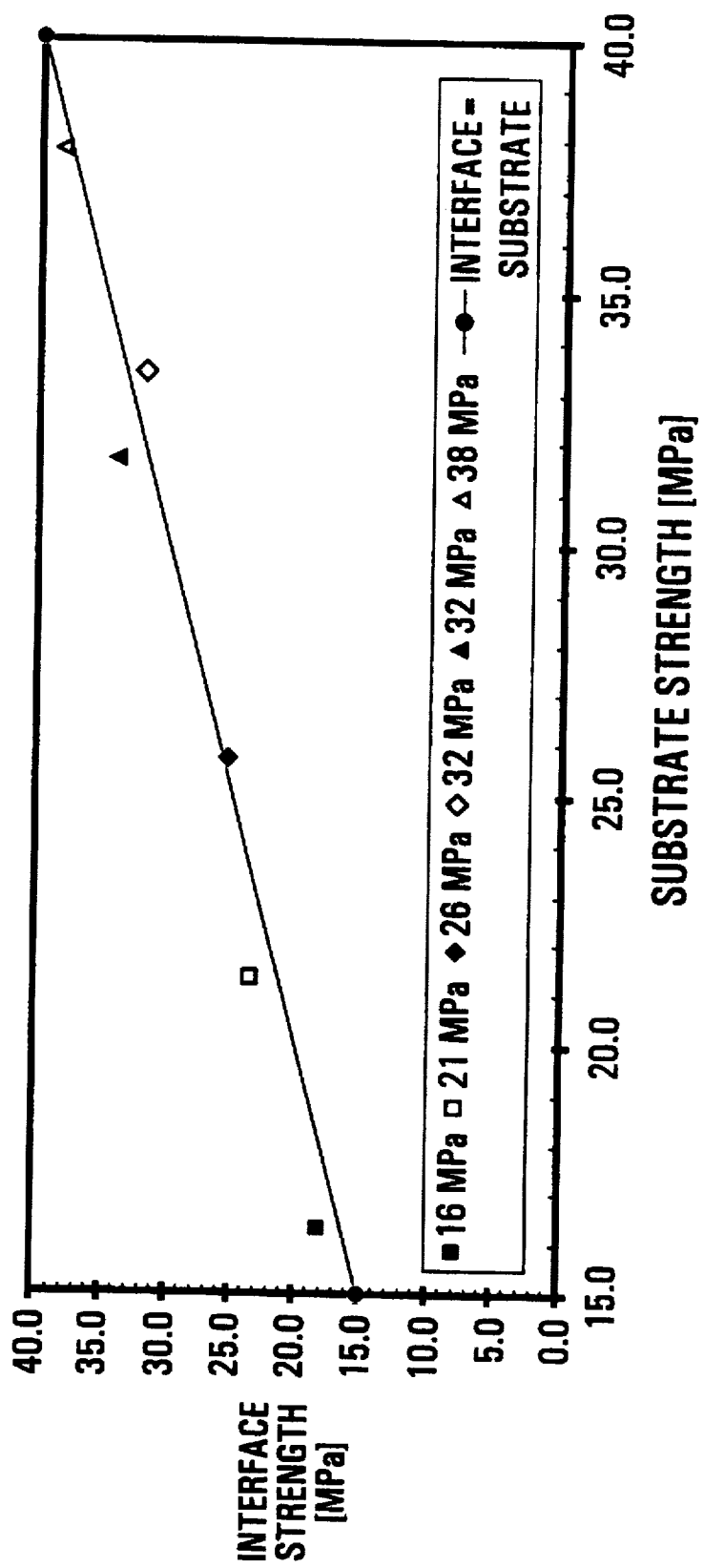
FIG. 18 is a graph comparing the interface strength to substrate strength for a low water content/high strength overlay applied to an optimally saturated substrate with no interface layer.

The results of the experiment are shown in the graph of FIG. 18 comparing the interface strength versus the substrate strength. FIG. 18 has a shaded square designating a wet substrate having a strength of 16 MPa, an unshaded square designating 21 MPa, a shaded diamond designating 26 MPa, an unshaded diamond designating 32 MPa, a shaded triangle designating 32 MPa, and an unshaded triangle designating 38 MPa. A line is shown depicting the points at which the substrate strength is equal to the interface strength. The interface strength between the overlay and each substrate was approximately the same as the substrate strength for each overlay.

The results provide proof that a low water content/high strength to cement overlay applied to an optimally water saturated substrate yields an interface bond having superior strength and in light of the results of the experiments of the previous examples, the capillary suction within the substrate is the primary factor in forming such a bond.

EXAMPLE 14

The overlay of this example comprised a concrete overlay layer having a high water to cement ratio with no interface layer. The high water content/low strength overlay was applied to two groups of substrates, one substrate group had a strength of 21 MPa and the other group had a strength of 32 MPa. The porosity of each substrate was designed to be varied within each group from about 10% to about 18% by volume of the substrate. The degree of water saturation was also increased within each substrate group.

Figure 19:
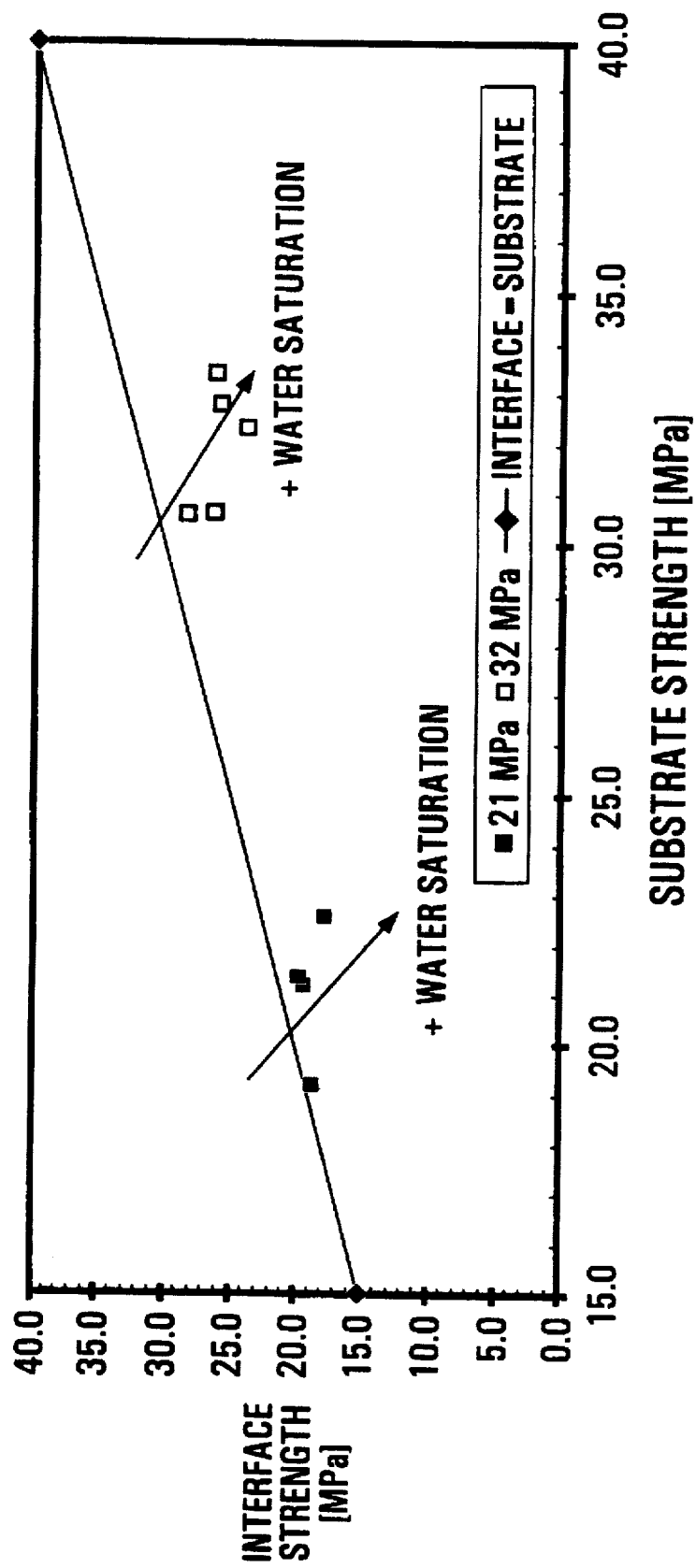
FIG. 19 is a graph comparing the interface strength to substrate strength for the high water content/low strength overlay applied to a wet substrate with no interface layer.

The results of the experiment are shown in the graph of FIG. 19 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The direction of the arrows in FIG. 19 indicates the trend of increasing water saturation of the substrates within each group of substrates.

The interface strength of the bond between each overlay and each substrate was approximately equal to or less than the substrate strength for each overlay. The trend in both substrate groups was a decrease in interface strength with an increase in water saturation indicating that the addition of excessive water minimizes the capillary suction necessary to anchor the overlay.

EXAMPLE 15

The overlay of this example comprised a concrete overlay layer having a high water to cement ratio with a latex interface layer. The low water content/high strength overlay was applied to six substrates having varying strengths after the substrates had been optimally saturated with water. The substrates having a strength of 16 MPa, 21 MPa and 26 MPa were saturated with an optimal amount of water while the substrates having a strength of 32 MPa were moistened in increasing amounts.

Figure 20:
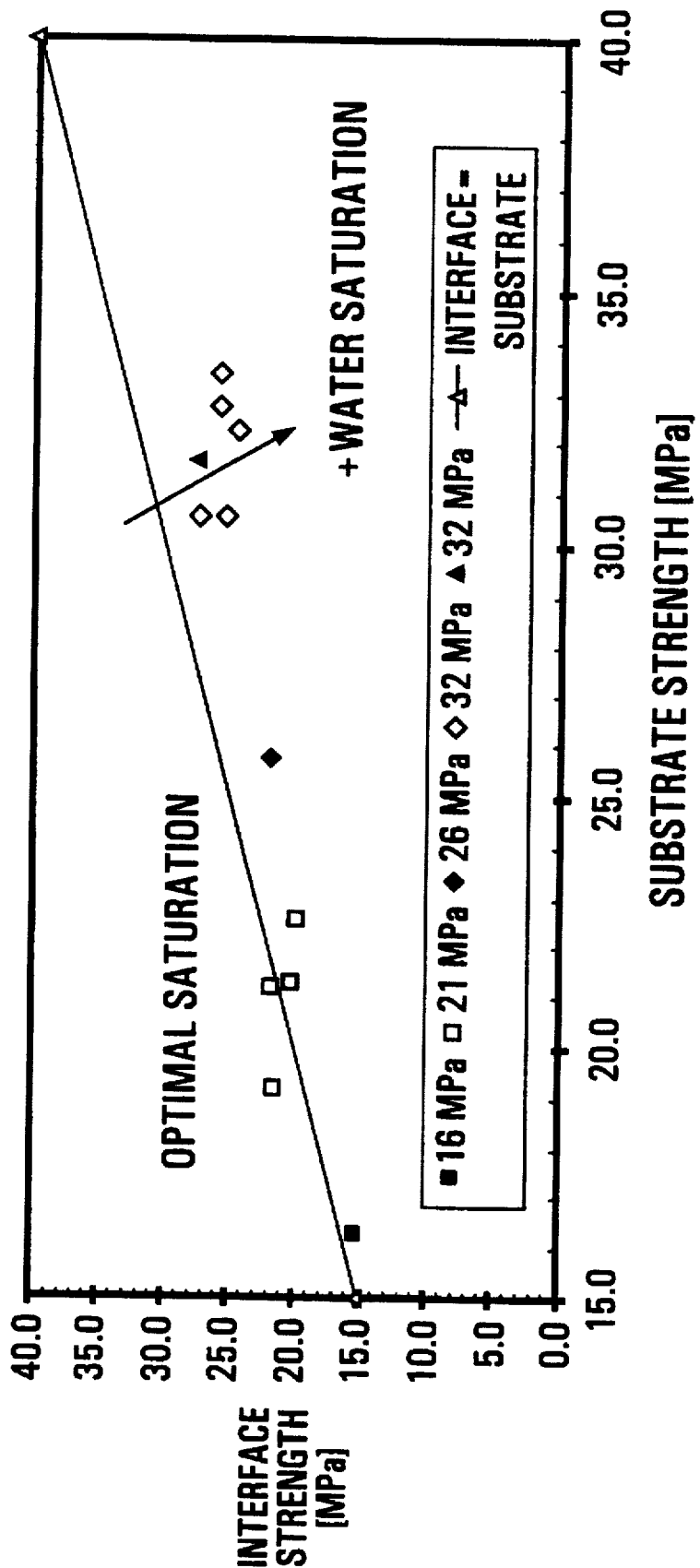
FIG. 20 is a graph comparing the interface strength to substrate strength for a low water content/high strength overlay applied to a wet substrate with a latex interface layer.

The results of the experiment are shown in the graph of FIG. 20 comparing the interface strength versus the substrate strength. FIG. 20 has a shaded square designating a wet substrate having a strength of 16 MPa, an unshaded square designating 21 MPa, a shaded diamond designating 26 MPa, an unshaded diamond designating 32 MPa, a shaded triangle designating 32 MPa, and an unshaded triangle designating 38 MPa. A line is shown depicting the points at which the substrate strength is equal to the interface strength. The direction of the arrow in FIG. 20 indicates the trend of increasing water saturation of the substrates within the group of substrates having a strength of 32 MPa.

The interface strength of the bond between each overlay and each optimally water saturated substrate was equal to or greater than the substrate strength for each overlay while the interface strength of the bond between the overlays and the substrates which received increasing amounts of moisture were below the substrate strength. The results indicate that a low water content/high strength overlay forms a stronger bond with an optimally water saturated substrate than with a substrate which has received too much water. The bonds having an interface strength equal to or exceeding the strength of the substrate strength will fracture at the interface in a compression test. The latex interface layer apparently had sufficient permeability for the optimal water saturation to effectively create capillary suction and anchor the overlay.

The interface strength decreased as the water saturation increased for the substrates having a strength of approximately 32 MPa indicating that the addition of excessive water minimizes the capillary suction necessary to anchor the overlay. The range of interface strengths resulting from increasing the water saturation was smaller than the range of interface strengths resulting from increasing the water saturation in the experiments of Example 14 wherein no interface layer was used. The range is smaller due to the latex interface layer which substantially blocks the flow of water and hydration products.

EXAMPLE 16

The overlay of this example comprised a concrete overlay layer having a low water to cement ratio with a grout interface layer containing silica fume. The low water content/high strength overlay was applied to six substrates having varying strengths after the substrates had been optimally saturated with water.

Figure 21:
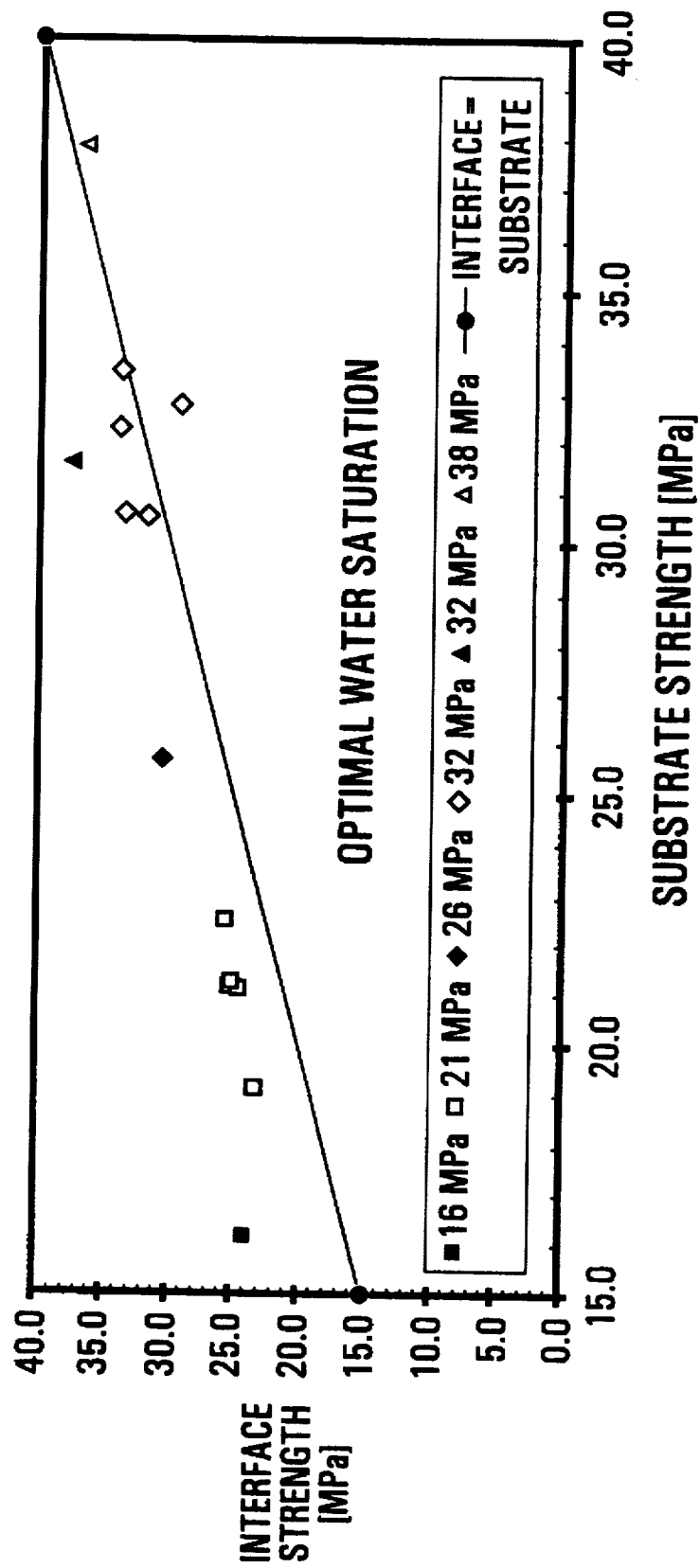
FIG. 21 is a graph comparing the interface strength to substrate strength for a low water content/high strength overlay applied to a wet substrate with a grout interface layer containing silica fume.

The results of the experiment are shown in the graph of FIG. 21 comparing the interface strength versus the substrate strength. FIG. 21 has a shaded square designating a wet substrate having a strength of 16 MPa, an unshaded square designating 21 MPa, a shaded diamond designating 26 MPa, an unshaded diamond designating 32 MPa, a shaded triangle designating 32 MPa, and an unshaded triangle designating 38 MPa. A line is shown depicting the points at which the substrate strength is equal to the interface strength. The strength of the interface bond between the overlay and each substrate was generally in excess of the substrate strength.

The results provide proof that a low water to cement overlay and an interface grout layer containing silica fume applied to an optimally water saturated substrate yields an interface bond having superior strength and in light of the results of the experiments of the previous examples, the capillary suction within the substrate is the primary factor in forming such a bond. Comparing the results of the experiments of this example to the results of the experiments of Example 13 indicates that utilizing an interface grout layer containing silica fume increases the strength of the interface bond. In the compression tests, the substrates fractured which provides proof that the capillary suction of the substrate causes the water and hydration products to enter the capillary pores of the substrate and form a network of root-like extensions which mechanically anchor the overlay.

EXAMPLE 17

The overlay of this example comprised a concrete overlay layer having a high water to cement ratio with a grout interface layer containing silica fume. The high water content/low strength overlay was applied to six substrates having varying strengths after the substrates had been optimally saturated with water.

Figure 22:
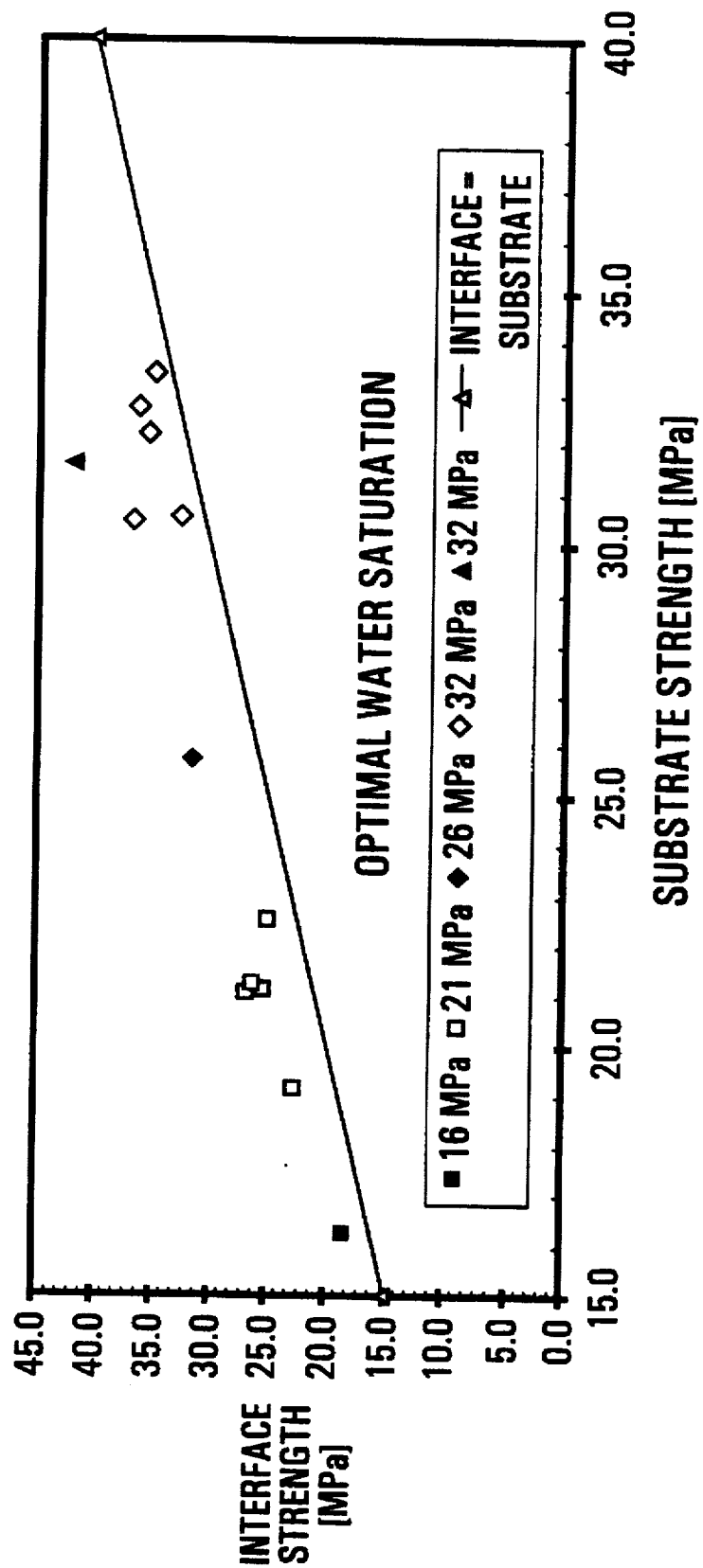
FIG. 22 is a graph comparing the interface strength to substrate total porosity for a high water content/low strength overlay applied to an optimally saturated substrate with a grout interface layer containing silica fume.

The results of the experiment are shown in the graph of FIG. 22 comparing the interface strength versus the substrate strength. FIG. 22 has a shaded square designating a wet substrate having a strength of 16 MPa, an unshaded square designating 21 MPa, a shaded diamond designating 26 MPa, an unshaded diamond designating 32 MPa, a shaded triangle designating 32 MPa, and an unshaded triangle designating 38 MPa. A line is shown depicting the points at which the substrate strength is equal to the interface strength. The strength of the interface bond between the overlay and each substrate was in excess of the strength of each corresponding substrate.

The results provide proof that a high water to cement overlay and an interface grout layer containing silica fume applied to an optimally water saturated substrate yields an interface bond having superior strength and in light of the results of the experiments of the previous examples, the capillary suction within the substrate is the primary factor in forming such a bond. Comparing the results of the experiments of this example to the results of the experiments of Example 13 indicates that utilizing an interface grout layer containing silica fume increases the strength of the interface bond. In the compression tests, the substrates fractured which provides proof that the capillary suction of the substrate causes the water and hydration products to enter the capillary pores of the substrate and form a network of root-like extensions which mechanically anchor the overlay.

EXAMPLE 18

The overlay of this example comprised a concrete overlay layer having a low water to cement ratio and an epoxy interface layer. The low water content/high strength overlay was applied to two groups of wet substrates, one substrate group had a strength of 21 MPa and the other group had a strength of 32 MPa. The porosity of each substrate was designed to be varied within each group from about 10% to about 18% by volume of the substrate.

Figure 23:
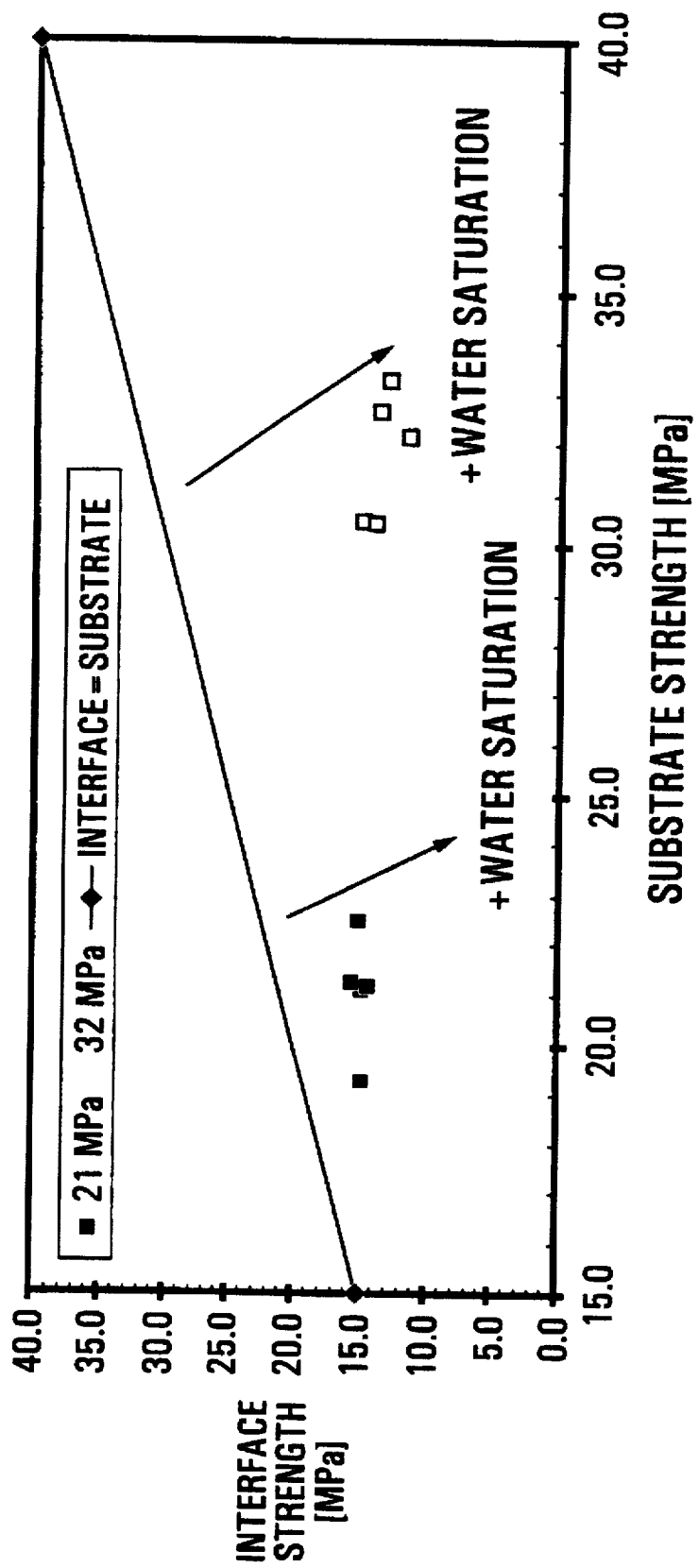
FIG. 23 is a graph comparing the interface strength to substrate strength for a low water content/high strength overlay applied to a wet substrate with an epoxy interface layer.

The results of the experiment are shown in the graph of FIG. 23 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The direction of the arrow in FIG. 23 indicates the trend of increasing water saturation of the substrates within each group of substrates.

The strength of each interface bond between each overlay and substrate was below each corresponding substrate strength and varied little in relationship to the amount of water added indicating that the capillary suction was not significant. The capillary suction was not significant as excess water minimizes the strength of the capillary suction and the epoxy interface layer forms a barrier to the capillary suction particularly when the suction is weak.

EXAMPLE 19

The overlay of this example comprised a concrete overlay layer having a high water to cement ratio and an epoxy interface layer. The high water content/low strength overlay was applied to two groups of wet substrates, one substrate group had a strength of 21 MPa and the other group had a strength of 32 MPa. The porosity of each substrate was designed to be varied within each group from about 10% to about 18% by volume of the substrate.

Figure 24:
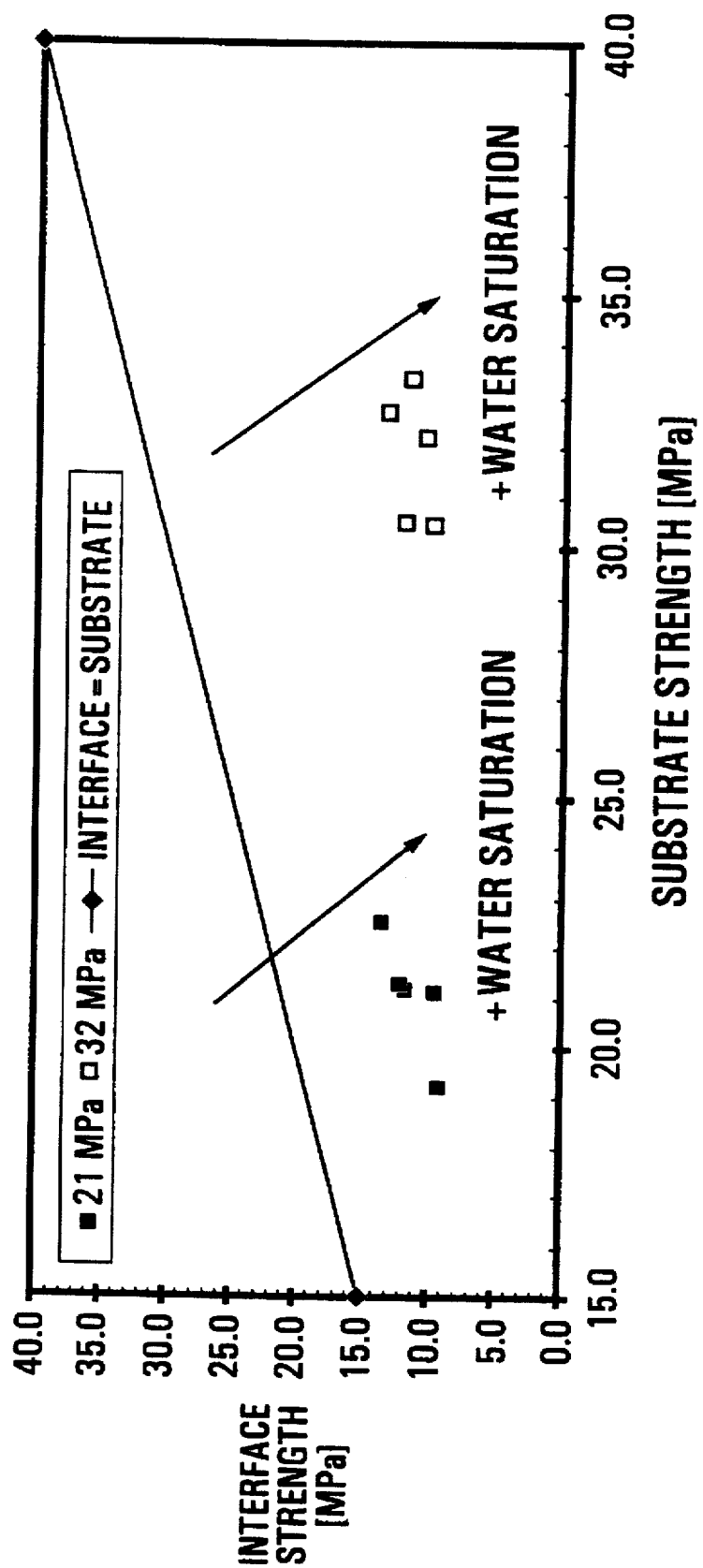
FIG. 24 is a graph comparing the interface strength to substrate strength for a high water content/low strength overlay applied to a wet substrate with an epoxy interface layer.

The results of the experiment are shown in the graph of FIG. 24 comparing the interface strength versus the substrate strength. The substrates having a strength of 21 MPa are designated by shaded squares and the substrates having a strength of 32 MPa are designated by unshaded squares. A line is shown depicting the points at which the substrate strength is equal to the interface strength. The direction of the arrow in FIG. 24 indicates the trend of increasing water saturation of the substrates within each group of substrates.

The strength of each interface bond between each overlay and substrate was below each corresponding substrate strength and varied little in relationship to the amount of water added indicating that the capillary suction was not significant. The capillary suction was not significant as excess water minimizes the strength of the capillary suction and the epoxy interface layer forms a barrier to the capillary suction particularly when the suction is weak. The interface strength for the experiments of this example were even lower than the interface strength of the experiments of Example 18 supporting the conclusion that excess water minimizes capillary suction.

EXAMPLE 20

An overlay was designed to have a high fracture energy by incorporating an optimal amount of air entraining agents into a cement-based mixture. Cement-based mixtures were formed with increasing amounts of air entraining agents then cast as an overlay and tested to determine the fracture energy. The amount of air entraining agents was incrementally increased by 0.01 weight percent of the the cement weight.

Figure 25:
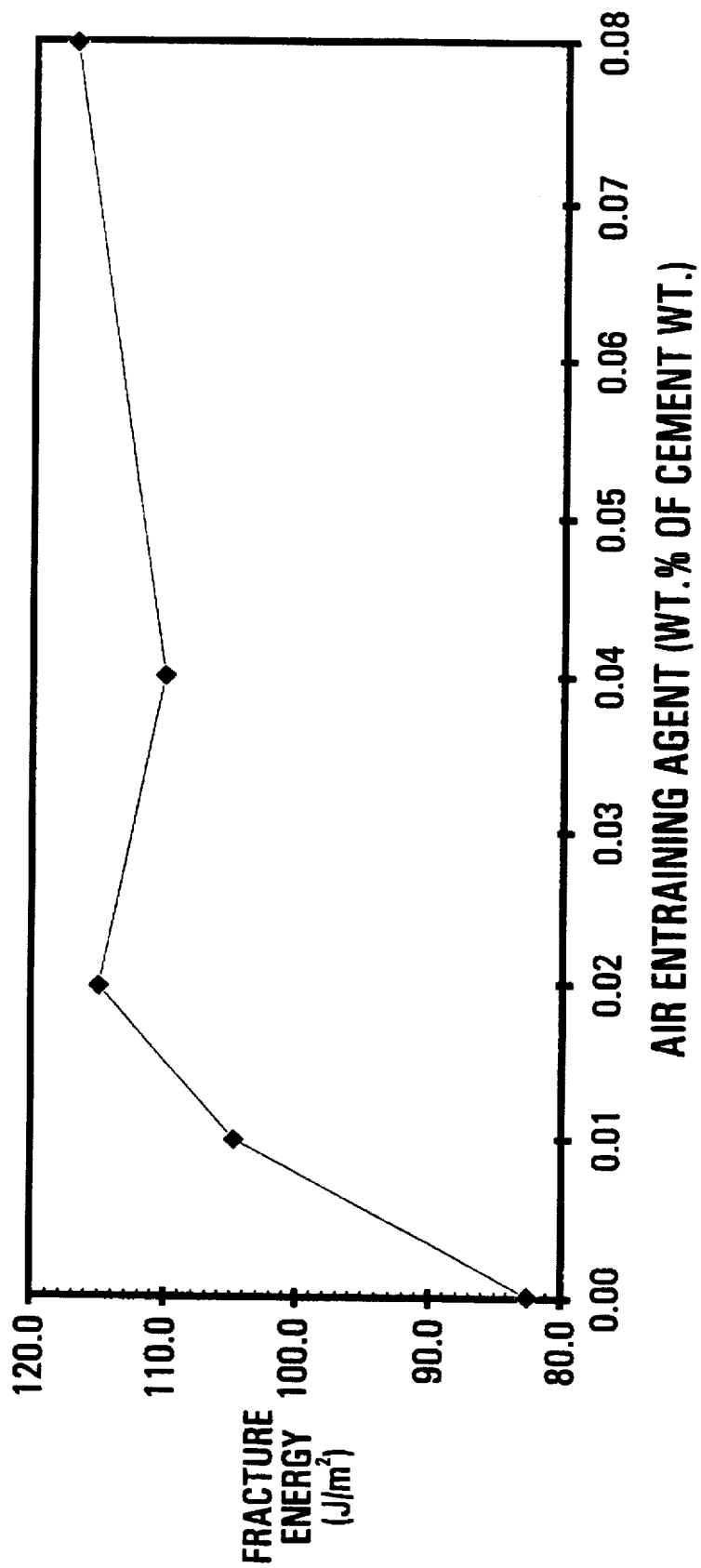
FIG. 25 is a graph demonstrating the relationship between fracture energy and the incorporation of increasing amounts of air entraining agent by weight percent of the cement weight in a cement-based mixture.

FIG. 25 is a graph of the test results which demonstrate the relationship between fracture energy and the incorporation of increasing amounts of air entraining agent by weight percent of the cement weight in a cement-based mixture. The maximum fracture energy was achieved by incorporating air entraining agents in an amount of about 0.08 weight percent of the cement weight.

The incorporation of air entraining agents resulted in increased toughness and improved elongation before fracture. It was also found that by incorporating sufficient air entraining agents to yield a fracture energy above 110 J/m$^2$ the freeze/thaw stability was improved. Mixtures utilizing air entraining agents to obtain an optimal fracture energy also improve the durability and life span of the overlay.

EXAMPLE 21

The optimal water to cement ratio for an overlay was imperically determined by varying the water to cement ratio ratio of overlay mixtures. Cores were removed from a substrate and saturated with water for a week then the concrete overlays were applied. Each overlay was formed from a mixture containing the following components:

| | |
|---|---|
| Portland Cement | 20.0 kg |
| Silica Fume Slurry | 8.0 kg |
| Dispersant | 0.960 kg |
| Sand | 40.0 kg |
| Air | 1.5% by volume |

The total water in each mixture was 5.0 kg, 6.0 kg, 7.0 kg, 8.0 kg, 9.0 kg, and 10.0 kg. The portland cement, silica fume slurry, sand, and water were mixed together in a high speed, high shear mixer for about 2 minutes for each mixture. The dispersant was then added and the mixture was mixed for an additional 6 minutes.

Compression testing of the strength of the bond interface determined that the mixture having 7.0 kg of total water had the highest interface bond strength. An additional mixture was formed having 6.9 kg of total water and the same components as the other mixtures. Compression testing of the bond strength between the mixture and the saturated substrate core indicated that the bond was higher than the bond resulting from the mixture with 7.0 kg of total water. Further testing indicated that the mixture having 6.9 kg of total water yield optimal interface bond strength.

EXAMPLE 22

The optimal degree of water saturation for a substrate was empirically determined utilizing the mixture from Example 21 having 6.9 kg of water. It was determined that the substrate needing repair had a porosity of 20%. Simulated samples of the substrate were prepared to have a similar mix design, strength, elasticity modulus and porosity. The simulated substrate samples were saturated with water to have a remaining porosity of 2%, 4%, 6% and 8%. Maximum adhesion resulted with the sample saturated to have 4% remaining porosity. The interface bond between the sample which was partially saturated until the level of 4% porosity was reached and the overlay having the optimal water to cement ratio had optimal strength.

EXAMPLE 23

A low strength overlay was designed and cast on cores cut from a substrate having a porosity of 16% by volume before water saturation. The porosity was incrementally varied on the cores by water saturation and then the low strength overlay was cast on the substrate. The low strength overlay included microsilica fume. The low strength overlay had a strength of 43 MPa and the strength of the substrate was 19 MPa. The overlay was allowed to harden for 28 days before being subjected to compression testing. The substrate could have also been simulated to obtain cores to imperically determine the optimal water saturation.

Figure 26:
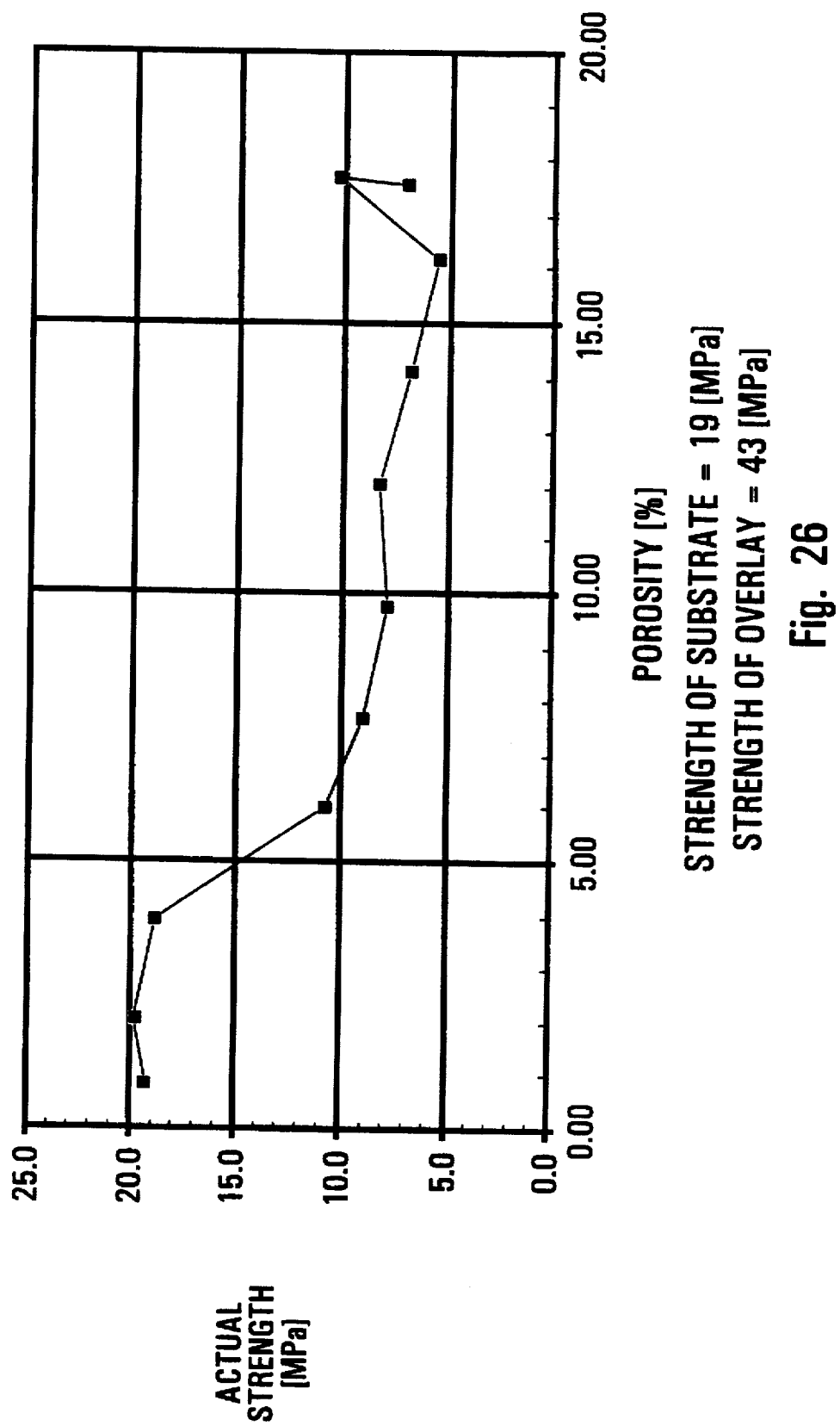
FIG. 26 is a graph demonstrating the relationship between the actual strength of the interface bond and the porosity of a substrate when the porosity is varied by water saturation.

FIG. 26 is a graph of the test results which demonstrate the relationship between the actual strength of the interface bond and the porosity of the substrate when varied by water saturation. The strength of the interface bond increased as the remaining porosity decreased due to increased water saturation. The maximum strength was obtained by saturating the substrate until the remaining porosity was only 2% by volume of the substrate.

EXAMPLE 24

The optimal water to cement ratio for an overlay to be applied to a dry substrate is empirically determined by varying the water to cement ratio ratio of overlay mixtures. Determining the optimal water to cement ratio for an overlay to be applied to a dry substrate is useful for application of the overlay in dry climatic conditions. Cores are removed from a substrate then the concrete overlays are applied. Each overlay is formed from a mixture containing the following components:

| Portland Cement | 20.0 kg |
| Silica Fume Slurry | 8.0 kg |
| Dispersant | 0.700 kg |
| Air | 2.0% by volume |

The total water in each mixture is 5.0 kg, 6.0 kg, 7.0 kg, 8.0 kg, 9.0 kg, and 10.0 kg. The portland cement, silica fume slurry, sand, and water are mixed together in a high speed, high shear mixer for about 2 minutes for each mixture. The dispersant is then added and the mixture is mixed for an additional 6 minutes. Compression testing of the strength of the bond interface determined that the mixture having 9.0 kg of total water have the highest interface bond strength.

EXAMPLE 25

The optimal water to cement ratio for an overlay to be applied to a saturated substrate is empirically determined by varying the water to cement ratio ratio of overlay mixtures. Determining the optimal water to cement ratio for an overlay to be applied to a saturated substrate is useful for application of the overlay in wet climatic conditions. Cores are removed from a substrate then the concrete overlays are applied. Each overlay is formed from a mixture containing the following components:

| Portland Cement | 20.0 kg |
| Silica Fume Slurry | 8.0 kg |
| Dispersant | 0.700 kg |
| Air | 2.0% by volume |

The total water in each mixture is 5.0 kg, 6.0 kg, 7.0 kg, 8.0 kg, 9.0 kg, and 10.0 kg. The portland cement, silica fume slurry, sand, and water are mixed together in a high speed, high shear mixer for about 2 minutes for each mixture. The dispersant is then added and the mixture is mixed for an additional 6 minutes. Compression testing of the strength of the bond interface determines that the mixture having 6.0 kg of total water has the highest interface bond strength.

EXAMPLE 26

Five hundred square feet of a concrete pavement approximately 20 years old are observed to have surface deterioration due to natural freeze-thaw cycles and vehicular traffic. The pavement was approximately 30 cm thick and is characterized by core samples as having a typical compressive strength of approximately 28 MPa. Some cracking had occurred in the surface due to settling.

The surface of the entire cement surface is washed with high pressure (2.0 bar) water and swept clean of surface debris, din, and other contaminates. A concrete overlay layer was formed from a mixture containing the following components:

| Portland Cement | 427.0 kg |
| Silica Fume Slurry | 171.0 kg |
| Total Water | 134.0 kg |
| Sand | 854.0 kg |
| Dispersant (WRDA-19) | 20.5 kg |
| Air | 5.0% by volume |

The portland cement, silica fume slurry, sand, and water are mixed together in a high speed, high shear mixer for about 2 minutes. The dispersant was then added and the mixture was mixed for an additional 6 minutes. The resulting overlay has a water to cement ratio of 0.23 and a test strength of 66 MPa.

Approximately 2.5 cm of the freshly mixed concrete (having a maximum aggregate size of less than 0.64 cm) is poured on top of the surface of the old cement. During pouring and spreading, careful attention is given to be sure that the fresh concrete overlay layer is in contact with the old surface; this is done by using a rake, squeegee, and/or brush. The new concrete overlay layer is then screened and finished to give a new surface.

After 28 days, the surface is cored and samples are prepared to determine the strength of the bond. The compressive strength of the samples are in all cases greater than 28 MPa, and at no point does the material fail at the bond interface. The samples are also broken in flexure; flexural strength is approximately 5 MPa. Again, at no point does any sample fail at the bond interface. Hence, the bond at the interface of the new cement and the old concrete pavement is deemed to be stronger than the old concrete pavement.

EXAMPLE 27

One thousand square feet of a concrete pavement approximately twelve years old is observed to have surface deterioration due to natural freeze-thaw cycles and vehicular traffic. The driveway is characterized by core samples as having a typical compressive strength of approximately 35 MPa and is approximately 30 cm thick. Some cracking had occurred in the surface due to settling.

The surface of the entire pavement is washed with high pressure (2.0 bar) water and swept clean of surface debris, dirt and other contaminates. Approximately 0.64 cm of freshly mixed concrete having a maximum aggregate size of less than 0.16 cm (20 mesh sand) is poured on top of the surface. During pouring and spreading, careful attention is given to be sure that the fresh concrete is in contact with the old surface. This is done by using a rake, squeegee, and/or brush. The new concrete is then screened and finished to give a new surface.

After 28 days, the surface is cored and samples are prepared to determine the strength of the bond. The compressive strength of the samples is in all cases greater than 35 MPa, and at no point does the material fail at the bond interface. The samples are also broken in flexure. Flexural strength is approximately 6 MPa. Again, at no point does any sample fail at the bond interface. Hence the bond at the interface of the new cement and the old cement is deemed to be stronger than either the new cement or the old concrete pavement.

EXAMPLE 28

A concrete road pavement approximately 25 years old is observed to have surface deterioration. The pavement is characterized by core samples as having a typical compressive strength of approximately 31 MPa and is approximately 3 0ncm thick. Some cracking has occurred in the surface due to settling.

The pavement surface is washed with water and swept clean of surface debris, dirt, and other contaminates. Approximately 9 cm of freshly mixed concrete having a maximum aggregate size of less than 2 cm and a design strength of approximately 31 MPa is poured on top of the surface. The concrete is prepared using a High Energy Mixer manufactured by Concrete Technology Corporation of Santa Barbara, Calif., to premix the paste fraction of the fresh concrete before combining with aggregates. During pouring, spreading, and screening, careful attention is given to be sure that the fresh concrete is then finished according to standard procedures to give a new surface.

After 28 days the surface is cored and samples prepared to determine the strength of the bond. The compressive strength of the samples is in all cases greater than 31 MPa, and at no point does the material fail at the bond interface. The samples are also broken in flexure. Flexural strength is approximately 5 MPa. Again, at no point does any sample fail at the bond interface. Hence, the bond at the interface of the new cement and the old concrete pavement is deemed to be stronger than either the new cement or the old concrete road pavement.

EXAMPLE 29

Five hundred square feet of a concrete driveway approximately 20 years old is observed to have surface deteriorization due to natural freeze-thaw cycles and vehicular traffic. The driveway is characterized by core samples as having a typical compressive strength of approximately 21 MPa and is approximately 10 cm thick. Some cracking has occurred in the surface due to settling.

The surface of the entire surface is washed with high pressure (2.0 bar) water and swept clean of surface debris, dirt, and other contaminates. A grout interface layer is formed from a mixture containing the following components:

| | |
|---|---|
| Portland Cement | 1285.0 kg |
| Silica Fume Slurry | 514.0 kg |
| Total Water | 444.0 kg |
| Dispersant (WRDA-19) | 45.0 kg |
| Air | 1.8% by volume |

The portland cement, silica fume slurry, and water are mixed together in a high speed, high shear mixer for about 2 minutes. The dispersant is then added and the mixture is mixed for an additional 6 minutes. The grout interface layer had a water to cement ratio of 0.25 and had a test strength of 66 MPa.

The 0.25 water/cement ratio premixed cement paste is "painted" over the entire surface in a very thin coating, and then flesh concrete is poured onto the paste coated surface. The fresh concrete layer is approximately 2.5 cm thick, the concrete having a maximum aggregate size of less than 0.64 cm and a design strength of approximately 21 MPa. During pouring, spreading, and screening, careful attention is given to be sure that the cement paste is in contact with the old surface. This is done by using a squeegee. The new concrete is then finished, screened, and troweled to give a new finish surface.

After 28 days, the surface is cored and samples prepared to determine the strength of the bond. The compressive strength of the samples is in all cases greater than 21 MPa, and at no point does the material fail at the bond interface. The samples are also broken in flexure. Flexural strength is approximately 5 MPa. Again, at no point does any sample fail at the bond interface. Hence, the bond at the interface of the new cement and the old concrete driveway is deemed to be stronger than either the new cement or the old concrete driveway.

EXAMPLE 30

A grout interface layer is prepared and applied as described in Example 29 with only thirty-three percent of the water utilized in Example 29. The overlay has zero slope and can be walked on after the overlay is placed on the driveway.

EXAMPLES 31–34

The experimental motivation for this example is to determine the effectiveness of various mix designs for use as an overlay materials, some of which were prepared by a high energy, high shear mixer of the type referred to hereinabove.

The concrete skirt of a driveway is cleaned with tap water and scrubbed. The skirt is divided into five sections of approximately equal area (2'×4') to five six different mix designs for use as a overlay.

The grout interface layers are prepared by high energy, high shear mixing. The grout interface layer mixtures have a 0.4 ratio of water to cement and are placed in a high energy, high shear mixer for about one minute. Initially, only water is present in the high energy, high shear mixer, but subsequently, cement is added to the water over a thirty second period. After the cement is completely added to the water, the 0.4 ratio of water to cement mixture is mixed by the high energy, high shear mixer for a period of about thirty seconds.

The concrete overlay layers are prepared by either a high energy, high shear mixer or a drum mixer. The concrete overlay layer mixtures have a water to cement ratio of 0.55. The cement is the "Continental" brand. Eight days after each overlay is applied, each section is tapped to test for bond adhesion. The overlay design are summarized as follows and are listed by qualitative bond effectiveness from best to worst:

| Example No. | Overlay Design |
|---|---|
| 31 | Concrete overlay layer and grout interface layer are each prepared in a high energy, high shear mixer and applied onto the driveway. |
| 32 | Concrete overlay layer is prepared in a high energy, high shear mixer and is applied to the driveway with no grout |

| Example No. | Overlay Design |
|---|---|
| | interface layer. |
| 33 | Concrete overlay layer is mixed entirely in a drum mixer and is applied to the driveway with no grout interface layer. |
| 34 | Concrete overlay layer is mixed entirely in a drum mixer and is applied to a grout interface layer mixed in a high energy, high shear mixer. |

It is to be noted that the two drum mixed concrete overlays have the lowest adhesion, while concrete overlays mixed in a high energy, high shear mixer provide superior adhesion. This indicates that the high energy, high shear mixer increases the interface bond strength.

EXAMPLES 35–41

The experimental motivation for these examples is to further determine the effectiveness of various mix designs for use as an overlay materials. A matrix is designed to test slant-shear bond strength, and evaluate the following variables of designing an overlay for application to a concrete surface seven days after casting:

1) a wet or dry surface; and
2) application of a concrete overlay layer having a water to cement ratio of 0.45 with no grout interface layer; a grout interface layer prepared in a high energy, high shear mixer and having a water to cement ratio of 0.40 and a grout interface layer prepared with microsilica in a high energy, high shear mixer and having a water to cement ratio of 0.40.

In the slant-shear test, typically a 7.6 cm diameter by 15.2 cm long concrete cylinder (i.e., the "old concrete") is cut in half diagonally along a sixty degree angle. The now dissected cylinder is then placed into a new 7.6 cm by 15.2 cm cylinder cup and fresh concrete is bonded to the old concrete.

After spending one day in the cylinder, the now bonded concrete halves are placed in a holding tank containing saturated lime water and later tested in compression at seven days. The shear strength of the bond is equal to the measured compressive strength multiplied by a geometric factor of 0.433.

The overlay design are summarized as follows and are listed by qualitative bond effectiveness from best to worst:

| Example No. | Compressive Strength | Overlay Design |
|---|---|---|
| 35 | 41 MPa | Wet concrete receives a grout interface layer containing microsilica prepared in a high energy, high shear mixer and a concrete overlay layer. |
| 36 | 39 MPa | A contiguous cylinder of concrete. (substrate) |
| 37 | 36 MPa | Dry concrete receives a grout interface layer containing microsilica prepared in a high energy, high shear mixer and a concrete overlay layer. |
| 38 | 34 MPa | Wet concrete receives a grout interface layer prepared in a high energy, high shear mixer and a concrete overlay layer. |
| 39 | 26 MPa | Wet concrete receives a concrete overlay layer. |
| 40 | 25 MPa | Dry concrete receives a grout interface layer prepared in a high energy, high |

| Example No. | Compressive Strength | Overlay Design |
|---|---|---|
| | | shear mixer and a concrete overlay layer. |
| 41 | 21 MPa | Dry concrete receives a concrete overlay layer. |

The use of both the grout interface layer and the concrete overlay layer yields a bond of unexpected high compressive strength, particularly when the substrate is wet and microsilica is incorporated into the grout interface layer mixture prepared in a high energy, high shear mixer. The application of a grout interface layer containing microsilica prepared in a high energy, high shear mixer to a wet concrete surface results in a bond having a compressive strength greater than the compressive strength of a contiguous cylinder of concrete which is the control in the experiment.

While the combination of the test factors results in a bond overlay having compressive strength which is superior to the concrete materials themselves each isolated factor makes a significant contribution. The application of a grout interface layer containing microsilica to a dry concrete surface results in a bond having a compressive strength similar to the compressive strength of the contiguous cylinder of concrete indicating that the rapid reaction rate of microsilica in water enables the microsilica to quickly penetrate into the capillary pores and anchor the overlay even when the substrate is dry. The moisture in the substrate is also significant in yielding a high compressive strength due to the capillary suction of the moisture in the substrate. Mixing in a high energy, high shear mixer also contributes to the strength by homogenizing the mixture which results in a bond of constant integrity.

EXAMPLES 42–49

The experimental motivation for these examples is to further determine the effectiveness of various mix designs for use as an overlay similar to Examples 35–41, but are examined for compressive strength after 28 days, instead of 7 days.

The mix designs of each example is summarized as follows:

| Example No. | Compressive Strength | Overlay Design |
|---|---|---|
| 42 | 58 MPa | A contiguous cylinder of concrete (substrate). |
| 43 | 51 MPa | A contiguous cylinder of concrete (overlay). |
| 44 | 59 MPa | Wet concrete receives a grout interface layer containing microsilica prepared in a high energy, high shear mixer and a concrete overlay layer. |
| 45 | 58 MPa | Dry concrete receives a grout interface layer containing microsilica prepared in a high energy, high shear mixer and a concrete overlay layer. |
| 46 | 43 MPa | Wet concrete receives a grout interface layer prepared in a high energy, high shear mixer and a concrete overlay layer. |
| 47 | 34 MPa | Wet concrete receives a concrete overlay layer. |
| 48 | 32 MPa | Dry concrete receives a grout interface layer prepared in a high energy, high shear mixer |

-continued

| Example No. | Compressive Strength | Overlay Design |
|---|---|---|
| 49 | 36 MPa | and a concrete overlay layer. Dry concrete receives a concrete overlay layer. |

The previous examples illustrated that even after 28 days, use of both a grout interface layer and a concrete overlay layer resulted in a bond overlay having an unexpected high compressive strength. The qualitative ranking of mix design bond effectiveness is similar to Examples 35–41 even after 28 days. Whereas the overlay design factors including (1) degree of moisture in the substrate, (2) use of a grout interface layer, (3) incorporation of microsilica in the grout interface layer, and (4) use of a high shear, high energy mixer were key to increasing the compressive strength of the overlay bond, as shown in example 41, the combination of these factors resulted in an overlay having compressive strength which is superior to the concrete materials themselves, even after 28 days.

EXAMPLE 50

One thousand square feet of asphalt pavement approximately twelve years old is observed to have surface deterioration due to natural freeze-thaw cycles and vehicular traffic. The driveway is approximately 10 cm thick. Some cracking had occurred in the surface due to settling.

The surface of the entire pavement is washed with high pressure (2.0 bar) water and swept clean of surface debris, dirt and other contaminates. The asphalt pavement is saturated to an optimal degree. Approximately 0.64 cm of freshly mixed concrete having a maximum aggregate size of less than 0.16 cm (20 mesh sand) is poured on top of the surface. During pouring and spreading, careful attention is given to be sure that the fresh concrete is in contact with the old surface. This is done by using a rake, squeegee, and/or brush. The overlay is then screened and finished to give a new surface.

After 28 days, the surface is cored and samples are prepared to determine the strength of the bond. At no point does any sample fail at the bond interface. Hence the bond at the interface of the overlay and the asphalt is deemed to be stronger than either the overlay or the asphalt pavement.

EXAMPLE 51

The surface of a brick is cleaned and then saturated with water to an optimal degree. During pouring and spreading, careful attention is given to be sure that the fresh concrete is in contact with the brick. After 28 days, the sample is tested to determine the strength of the bond. The sample does not fail at the bond interface. Hence the bond at the interface of the overlay and the brick is deemed to be stronger than either the overlay or the brick.

VI. Summary

From the foregoing, it will be appreciated that the present invention provides novel methods and compositions for bonding a newly hydrating cement-based overlay onto an existing cement-based substrate, such that a newly hydrating cement-based material may be placed adjacent or onto the surface of an existing cement-based substrate or an asphalt substrate such that an integral bond is formed therebetween.

The present invention also provides novel methods and compositions for bonding a newly hydrating cement-based material onto an existing cement-based substrate such that the strength and physical characteristics of the resulting structure is improved and may withstand greater stresses and loads than previously known in the art.

Additionally, the present invention provides novel methods and compositions for bonding a newly hydrating cement-based material onto an existing cement-based substrate without the use of latex, epoxies, or other organic binders.

Moreover, the present invention provides novel methods and compositions for bonding a newly hydrating cement-based material onto an existing cement-based substrate such that the hydrating cement-based overlay may be used for repairing defects such as spalls, cracks, or chips in the surfaces of existing concrete surfaces, like driveways, sidewalks, or roads.

In addition, the present invention also provides novel methods and compositions for bonding a newly hydrating cement-based materials onto an existing cement-based substrate such that laminate layers applied at different times will not result in the formation of a cold joint therebetween.

The present invention also provides novel methods and compositions for bonding a newly hydrating cement-based material onto an existing surface of cement-based substrates in a manner which is economically feasible for the large-scale repair of the national infrastructure, thereby enabling large areas to be quickly repaired and returned to their original strength and utility.

The present invention further provides novel compositions and processes for bonding a hydrating cement-based material onto an existing surface of cement-based substrates which result in a bond that is amorphous, noncrystalline material.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for bonding a hydrating cement-based overlay onto a surface of an existing porous cement-based substrate, the method comprising:

(a) preparing the surface of the existing porous cement-based substrate by applying an amount of water in order to control capillary suction within the pores of the cement-based substrate such that a portion of the hydrating cement-based overlay will be drawn into the pores of the existing cement-based substrate, the prepared surface of the cement-based substrate being substantially puddle-free;

(b) applying a hydrating cement-based overlay that is an interface grout onto the prepared surface of the cement-based substrate, the hydrating cement-based overlay comprising a hydraulic cement binder, water, and silica fume; and (c) allowing the hydrating cement-based overlay to harden in order to form a substantially integral bond between the hardened cement-based overlay and the existing cement-based substrate.

2. A method as defined in claim 1, further including the step of running a series of empirical tests to determine the amount of water that should be applied to the surface of the existing substrate in step (a) in order to achieve a level of capillary suction within the surface of the existing cement-based substrate that results in increased bond strength between the hardened cement-based overlay and the existing cement-based substrate.

3. A method as defined in claim 1, further including the step of empirically determining the composition of the existing cement-based substrate in order to design a second cement-based overlay that is applied over the hydrating cement-based overlay to have a composition that is substantially identical to the cement-based substrate.

4. A method as defined in claim 1, wherein at least a portion of the hydrating cement-based overlay further includes an aggregate.

5. A method as defined in claim 4, wherein at least a portion of the hydrating cement-based overlay is a concrete overlay.

6. A method as defined in claim 1, further including the step of applying a second hydrating cement-based overlay over the hydrating cement-based overlay, the second hydrating cement-based overlay comprising a hydraulic cement binder, water, and an aggregate.

7. A method as defined in claim 6, wherein the hydrating cement-based overlay is an interface grout and wherein the second hydrating cement-based overlay is a concrete overlay.

8. A method as defined in claim 7, wherein the interface grout has a thickness of about 2 mm or less.

9. A method as defined in claim 7, wherein the interface grout has a thickness of about 1 mm or less.

10. A method as defined in claim 7, wherein the concrete overlay has a thickness of about 1 cm or less.

11. A method as defined in claim 7, wherein the concrete overlay has a thickness of about 5 cm or less.

12. A method as defined in claim 7, wherein the concrete overlay has a thickness of about 2 cm or less.

13. A method as defined in claim 7, wherein the hydraulic cement binder is included within the hydrated cement-based overlay that becomes the interface grout in an amount in a range from about 900 kg/m$^3$ to about 1500 kg/m$^3$.

14. A method as defined in claim 7, wherein the hydraulic cement binder is included within the hydrating cement-based overlay that becomes the interface grout in an amount in a range from about 100 kg/m$^3$ to about 1400 kg/m$^3$.

15. A method as defined in claim 7, wherein the hydraulic cement binder is included within the hydrating cement-based overlay that becomes the interface grout in an amount in a range from about 110 kg/m$^3$ to about 1300 kg/m$^3$.

16. A method as defined in claim 7, wherein the hydraulic cement binder is included within the second hydrating cement-based overlay that becomes the concrete overlay in an amount in a range from about 300 kg/m$^3$ to about 600 kg/m$^3$.

17. A method as defined in claim 7, wherein the hydraulic cement binder is included within the second hydrating cement-based overlay that becomes the concrete overlay in an amount in a range from about 350 kg/m$^3$ to about 550 kg/m$^3$.

18. A method as defined in claim 7, wherein the hydraulic cement binder is included within the second hydrating cement-based overlay that becomes the concrete overlay in an amount in a range from about 400 kg/m$^3$ to about 500 kg/m$^3$.

19. A method as defined in claim 7, wherein the grout layer has a thickness of about 5 mm or less.

20. A method as defined in claim 6, wherein the aggregate includes a course aggregate having a maximum particle size dimension of about 10 mm and a fine aggregate having a maximum particle size dimension of about 3 mm.

21. A method as defined in claim 6, wherein the hydrating cement-based overlay is allowed to harden prior to applying the second hydrating cement-based overlay.

22. A method as defined in claim 6, wherein the second hydrating cement-based overlay is applied after the hydrating cement-based overlay has partially hardened.

23. A method as defined in claim 6, wherein the second hydrating cement-based overlay is applied while the hydrating cement-based overlay is in a green state.

24. A method as defined in claim 6, further including the step of mixing the second hydrating cement-based overlay using a high shear mixer in order to yield a substantially homogeneous material.

25. A method as defined in claim 6, further including adding a dispersant to the second hydrating cement-based overlay.

26. A method as defined in claim 6, further including adding a set accelerator to the second hydrating cement-based overlay.

27. A method as defined in claim 6, wherein the second hydrating cement-based overlay has a water to cement ratio in a range from about 0.1 to about 0.5.

28. A method as defined in claim 6, wherein the second hydrating cement-based overlay has a water to cement ratio in a range from about 0.15 to about 0.4.

29. A method as defined in claim 6, wherein the second hydrating cement-based overlay has a water to cement ratio in a range from about 0.2 to about 0.3.

30. A method as defined in claim 1, further including the step of mixing the hydrating cement-based overlay using a high shear mixer in order to yield a substantially homogeneous material.

31. A method as defined in claim 1, wherein the preparing step includes cleaning the surface of the existing cement-based substrate.

32. A method as defined in claim 1, wherein the preparing step includes cutting an expansion joint within the existing cement-based substrate.

33. A method as defined in claim 1, wherein the prepared surface of the existing cement-based substrate is saturated with water to a depth of at least about 2.5 cm and wherein the substrate surface is also substantially puddle-free.

34. A method as defined in claim 1, further including adding a dispersant to the hydrating cement-based overlay.

35. A method as defined in claim 1, further including adding a set accelerator to the hydrating cement-based overlay.

36. A method as defined in claim 1, wherein the hydrating cement-based overlay has a water to cement ratio in a range from about 0.1 to about 1.5.

37. A method as defined in claim 1, wherein the hydrating cement-based overlay has a water to cement ratio in a range from about 0.15 to about 0.4.

38. A method as defined in claim 1, wherein the hydrating cement-based overlay has a water to cement ratio in a range from about 0.2 to about 0.3.

39. A method as defined in claim 1, wherein the hydrating cement-based overlay is scrubbed onto the surface of the existing cement-based substrate.

40. A method as defined in claim 1, wherein the hydrating cement-based overlay is troweled onto the surface of the existing cement-based substrate.

41. A method as defined in claim 1, wherein the hydrating cement-based overlay is painted onto the surface of the existing cement-based substrate.

42. A method as defined in claim 1, wherein the hydraulic cement binder is a portland cement.

43. A method as defined in claim 1, wherein the hydraulic cement binder is selected from the group consisting of calcium aluminate cements, plasters, silicate cements, gypsum cements, phosphate cements, magnesium oxychloride cements, and mixtures thereof.

44. A method as defined in claim 1, further including the step of applying a curing compound to at least a portion of an exposed surface of the hydrating cement-based overlay.

45. A method as defined in claim 1, further including the step of placing a plastic cover over at least a portion of an exposed surface of the hydrating cement-based overlay.

46. A method for bonding a hydrating cement-based concrete overlay onto a surface of an existing porous cement-based substrate, the method comprising:
   (a) preparing the surface of the existing porous cement-based substrate with an amount of water such that existing cement-based substrate is saturated to a depth of at least about 2.5 cm, the prepared surface of the existing cement-based substrate being substantially puddle free;
   (b) applying a hydrating cement-based grout comprising a hydraulic cement binder, water, and silica fume onto the prepared surface of the cement-based substrate to form a layer of grout on the surface of the cement-based substrate, the grout layer having a thickness of about 5 mm or less;
   (c) applying a hydrating cement-based concrete overlay comprising a hydraulic cement binder, water, and an aggregate onto the layer of grout; and
   (d) allowing the hydrating cement-based concrete overlay to harden in order to form a substantially integral bond between the hardened cement-based concrete overlay and the existing cement-based substrate.

47. A method for bonding a hydrating cement-based concrete overlay onto a surface of an existing porous cement-based substrate, the method comprising:
   (a) preparing the surface of the existing porous cement-based substrate by applying an amount of water such that existing cement-based substrate is saturated to a depth of at least about 2.5 cm, the prepared surface of the existing cement-based substrate being substantially puddle free;
   (b) applying a hydrating cement-based overlay comprising a hydraulic cement binder, water, silica fume, and an aggregate onto the prepared surface of the existing cement-based substrate, wherein the hydrating cement-based overlay has a water to cement ratio in a range from about 0.1 to about 1.5; and
   (c) allowing the hydrating cement-based structural overlay to harden in order to form a substantially integral bond between the hardened cement-based concrete overlay and the existing cement-based substrate.

48. A method defined in claim 47, wherein the hydrating cement-based overlay comprises an interface grout.

49. A method defined in claim 47, wherein the hydrating cement-based overlay comprises a concrete overlay.

50. A method for bonding a hydrating cement-based overlay onto a surface of an existing porous cement-based substrate, the method comprising:
   (a) running a series of empirical tests to determine the amount of water which should be applied to the surface of the existing substrate in order to achieve a level of capillary suction within the surface of the existing cement-based substrate that results in increased bond strength between the hydrating cement-based overlay and the existing cement-based substrate;
   (b) preparing the surface of the existing porous cement-based substrate by applying an amount of water that is substantially similar to the amount of water determined in step (a);
   (c) empirically determining the composition of the existing cement-based substrate in order to design a hydrating cement-based overlay to have a composition that is substantially identical to the cement-based substrate;
   (d) applying a hydrating cement-based overlay comprising a hydraulic cement binder, water, aggregate, and silica fume and having a composition that is substantially identical to the composition of the existing cement-based substrate onto the prepared surface of the cement-based substrate; and
   (e) allowing the hydrating cement-based overlay to harden in order to form a substantially integral bond between the hardened cement-based overlay and the existing cement-based substrate.

51. A method for bonding a hydrating cement-based overlay onto a surface of an existing porous cement-based substrate, the method comprising:
   (a) empirically determining the composition of the existing cement-based substrate in order to design the hydrating cement-based overlay to have a similar composition;
   (b) preparing the surface of the existing porous cement-based substrate by applying an amount of water that will create capillary suction within the pores of the existing cement-based substrate such that a portion of the hydrating cement-based overlay will be drawn into the pores of the existing cement-based substrate, the prepared surface of the cement-based substrate being substantially puddle-free;
   (c) applying a hydrating cement-based overlay comprising a hydraulic cement binder, water, and silica fume and having a composition similar to the composition of the existing cement-based substrate onto the prepared surface of the cement-based substrate; and
   (d) allowing the hydrating cement-based overlay to harden in order to form a substantially integral bond between the hardened cement-based overlay and the existing cement-based substrate.

52. A method for bonding a hydrating cement-based overlay onto a surface of an existing porous cement-based substrate, the method comprising:

preparing the surface of the existing porous cement-based substrate by applying an amount of water such that the cement-based substrate is saturated with water to a depth of at least about 2.5 cm and wherein the substrate surface is substantially puddle-free in order to control capillary suction within the pores of the cement-based substrate such that a portion of the hydrating cement-based overlay will be drawn into the pores of the existing cement-based substrate;

applying a hydrating cement-based overlay comprising a hydraulic cement binder, water, and silica fume onto the prepared surface of the cement-based substrate;

allowing the hydrating cement-based overlay to harden in order to form a substantially integral bond between the hardened cement-based overlay and the existing cement-based substrate; and placing a plastic cover over at least a portion of an exposed surface of the hydrating cement-based overlay.

53. A method as defined in claim 52, wherein the hydrating cement-based overlay comprises a grout layer.

* * * * *

UNITED STATES PATENT AND TRADEMARK OFFICE
CERTIFICATE OF CORRECTION

PATENT NO. : 5,695,811                                       Page 1 of 3
DATED      : December 9, 1997
INVENTOR(S): Per Just Andersen; Simon K. Hodson;
             Hamlin M. Jennings; Anthony J. Kelzenberg It is certified that error appears in the above-identified patent and that said Letters Patent is hereby corrected as shown below:

Cover Page, Inventors, after "Hamlin" insert --M.--

Page 2, Left Column, Other Publications, line 4, change "Sox. Sump" to --Soc. Symp.--

Page 2, Left Column, Other Publications, line 12, after "*When*" change "*using*" to --*Using*--

Page 2, Right Column, Other Publications, line 13, after "No." change "376A" to --276A--

Page 2, Right Column, Other Publications, line 15, after "S" insert a period

Page 2, Right Column, Other Publications, line 17, after "pp." change "911-919" to --911-920--

Figure 23, in the key, before "32 MPa" insert a --□--

Col. 2, line 44, change "$3,000,000,000" to --$3,000,000,000,000--

Col. 9, line 42, after "substrate" change "total porosity" to --strength--

Col. 10, line 66, before "are" change ""Micropores",," to --"Micropores"--

Col. 18, line 56, after "in the" change "an" to --art--

Col. 27, line 32, before "Characterization" insert --IV.--

Col. 29, line 36, change "$3CaO.Al_2O_3$" to --$3CaO \cdot Al_2O_3$--

UNITED STATES PATENT AND TRADEMARK OFFICE
CERTIFICATE OF CORRECTION

PATENT NO. : 5,695,811

DATED : December 9, 1997

INVENTOR(S) : Per Just Andersen; Simon K. Hodson; Hamlin M. Jennings; Anthony J. Kelzenberg It is certified that error appears in the above-identified patent and that said Letters Patent is hereby corrected as shown below:

Col. 29, line 37, change "$4CaO.Al_2O_3.FeO$" to --$4CaO \cdot Al_2O_3 \cdot FeO$--

Col. 29, line 63, change "$2CaO.SiO_2$" to --$2CaO \cdot SiO_2$--

Col. 29, line 64, change "$3CaO.SiO_2$" to --$3CaO \cdot SiO_2$--

Col. 33, line 30, change "an unshaded" to --a shaded--

Col. 33, line 32, before "square" change "shaded" to --unshaded--

Col. 35, line 22, after "MPa," delete "and"

Col. 35, line 23, before "an" insert --and--

Col. 42, line 19, before "determined" change "imperically" to --emperically--

Col. 43, line 7, after "to" change "imperically" to --emperically--

Col. 44, line 12, after "debris," change "din" to --dirt--

Col. 45, line 16, before "thick" change "3 0ncm" to --30 cm--

Col. 45, line 51, after "swept" change "dean" to --clean--

Col. 50, line 17, after "cement-based" change "materials" to --material--

Col. 51, line 28, after "about" change "1" to --10--

Col. 51, line 39, after "about" change "100" to --1000--

UNITED STATES PATENT AND TRADEMARK OFFICE
CERTIFICATE OF CORRECTION

PATENT NO. : 5,695,811
DATED : December 9, 1997
INVENTOR(S) : Per Just Andersen; Simon K. Hodson; Hamlin M. Jennings; Anthony J. Kelzenberg It is certified that error appears in the above-identified patent and that said Letters Patent is hereby corrected as shown below:

Col. 51, line 43, after "about" change" "110" to --1100--

Signed and Sealed this

Twenty-sixth Day of January, 1999

Attest:

Attesting Officer

Acting Commissioner of Patents and Trademarks